(12) United States Patent
Kajino

(10) Patent No.: US 8,296,009 B2
(45) Date of Patent: Oct. 23, 2012

(54) SUSPENSION CONTROLLER

(75) Inventor: Hidenori Kajino, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 496 days.

(21) Appl. No.: 12/451,462

(22) PCT Filed: Nov. 7, 2008

(86) PCT No.: PCT/JP2008/070730
§ 371 (c)(1), (2), (4) Date: Nov. 13, 2009

(87) PCT Pub. No.: WO2009/063959
PCT Pub. Date: May 22, 2009

(65) Prior Publication Data
US 2010/0138108 A1 Jun. 3, 2010

(30) Foreign Application Priority Data
Nov. 13, 2007 (JP) ................. 2007-294014

(51) Int. Cl.
*B60G 17/016* (2006.01)
(52) U.S. Cl. ........... 701/38; 701/37; 280/5.5; 280/5.507
(58) Field of Classification Search ............ 701/36, 701/37, 38, 70, 440; 280/5.5, 5.507
See application file for complete search history.

(56) References Cited

U.S. PATENT DOCUMENTS

| | | |
|---|---|---|
| 4,714,271 A | 12/1987 | Buma et al. |
| 5,444,621 A | 8/1995 | Matsunaga et al. |
| 5,497,325 A | 3/1996 | Mine |
| 5,510,985 A | 4/1996 | Yamaoka et al. |
| 5,950,776 A | 9/1999 | Iwasaki et al. |
| 6,176,494 B1 | 1/2001 | Ichimaru et al. |
| 7,668,645 B2 * | 2/2010 | Lu et al. .......... 701/124 |

(Continued)

FOREIGN PATENT DOCUMENTS

EP 0 220 658 A2 5/1987

(Continued)

OTHER PUBLICATIONS

International Search Report for Application No. PCT/JP2008/070730, issued Apr. 14, 2009.

(Continued)

*Primary Examiner* — Gertrude Arthur Jeanglaude
(74) *Attorney, Agent, or Firm* — Oliff & Berridge, PLC

(57) ABSTRACT

A suspension controller for controlling, based on a value detected by at least one sensor which is provided in a vehicle and which is configured to detect a detected portion, a suspension provided for a wheel of the vehicle which is located on a rear side of the detected portion and which is distant from the detected portion by a longitudinal distance in a longitudinal direction of the vehicle, such that the suspension works in accordance with a control command value that is prepared based on the value detected by the at least one sensor. The suspension controller includes a gain determiner configured to determine a gain, for controlling the suspension based on the determined gain. The gain determiner is configured to determine the gain such that the determined gain is smaller when a previewable time is shorter than a threshold length of time, than when the previewable time is not shorter than the threshold length of time.

15 Claims, 37 Drawing Sheets

U.S. PATENT DOCUMENTS

2004/0098184 A1 * 5/2004 Ghoneim et al. ............... 701/70

FOREIGN PATENT DOCUMENTS

| JP | A-04-372411 | 12/1992 |
| --- | --- | --- |
| JP | A-5-262118 | 10/1993 |
| JP | A-06-072129 | 3/1994 |
| JP | A-07-081351 | 3/1995 |
| JP | A-7-186660 | 7/1995 |
| JP | A-7-205629 | 8/1995 |
| JP | A-7-237419 | 9/1995 |
| JP | B2-2845030 | 1/1999 |

OTHER PUBLICATIONS

Written Opinion of the International Searching Authority for Application No. PCT/JP2008/070730, issued Apr. 14, 2009.

Office Action issued in Japanese Patent Application No. 2007-294014 dated Jul. 5, 2011 (with translation).

* cited by examiner

FIG.10

| OPERATION MODE | MOTOR FORCE GENERATING DIRECTION | DETECTED SIGNALS OF HALL ELEMENTS | | | STATES OF SWITCHING ELEMENTS | | | | | |
|---|---|---|---|---|---|---|---|---|---|---|
| | | HA | HB | HC | WLC | VLC | ULC | WHC | VHC | UHC |
| CONTROLLED-POWER SUPPLYING MODE | CCW DIRECTION | H | L | H | 0 | 0 | 1* | 0 | 1 | 0 |
| | | H | L | L | 0 | 0 | 1* | 1 | 0 | 0 |
| | | H | H | L | 0 | 1* | 0 | 1 | 0 | 0 |
| | | L | H | L | 0 | 1* | 0 | 0 | 0 | 1 |
| | | L | H | H | 1* | 0 | 0 | 0 | 0 | 1 |
| | | L | L | H | 1* | 0 | 0 | 0 | 1 | 0 |
| | CW DIRECTION | H | L | H | 0 | 1* | 0 | 0 | 0 | 1 |
| | | H | L | L | 1* | 0 | 0 | 0 | 0 | 1 |
| | | H | H | L | 1* | 0 | 0 | 0 | 1 | 0 |
| | | L | H | L | 0 | 0 | 1* | 0 | 1 | 0 |
| | | L | H | H | 0 | 0 | 1* | 1 | 0 | 0 |
| | | L | L | H | 0 | 1* | 0 | 1 | 0 | 0 |
| STAND BY MODE | CCW DIRECTION | H | L | H | 0 | 0 | 0* | 0 | 1 | 0 |
| | | H | L | L | 0 | 0 | 0* | 1 | 0 | 0 |
| | | H | H | L | 0 | 0* | 0 | 1 | 0 | 0 |
| | | L | H | L | 0 | 0* | 0 | 0 | 0 | 1 |
| | | L | H | H | 0* | 0 | 0 | 0 | 0 | 1 |
| | | L | L | H | 0* | 0 | 0 | 0 | 1 | 0 |
| | CW DIRECTION | H | L | H | 0 | 0* | 0 | 0 | 0 | 1 |
| | | H | L | L | 0* | 0 | 0 | 0 | 0 | 1 |
| | | H | H | L | 0* | 0 | 0 | 0 | 1 | 0 |
| | | L | H | L | 0 | 0 | 0* | 0 | 1 | 0 |
| | | L | H | H | 0 | 0 | 0* | 1 | 0 | 0 |
| | | L | L | H | 0 | 0* | 0 | 1 | 0 | 0 |
| BRAKING MODE | | | | | 0 | 0 | 0 | 1 | 1 | 1 |
| FREE MODE | | | | | 0 | 0 | 0 | 0 | 0 | 0 |

1 : ON STATE (CLOSED STATE)  
0 : OFF STATE (OPEN STATE)  
H : DETECTED STATE  
L : NON-DETECTED STATE  
1* : UNDER DUTY CONTROL BY PWM  
0* : STATE IN WHICH PULSE-ON TIME IS 0 UNDER DUTY CONTROL BY PWM $$\Delta W_T = (R_r + \frac{W_T}{2}) - (R_f - \frac{W_T}{2})$$
$$= W_T - (R_f - R_r)$$
$$Lap = \frac{\Delta W_T}{W_T} = 1 - \frac{\Delta R}{W_T}$$

$$\begin{cases} R_f = \dfrac{L_w}{\sin \delta w} \times 10^{-3} \\ R_r = \dfrac{L_w}{\tan \delta w} \times 10^{-3} \end{cases}$$

$$\begin{cases} \Delta R_{in} \fallingdotseq (R_f - \dfrac{T_f}{2}) - (R_r - \dfrac{T_r}{2}) = R_f - (R_r + \dfrac{T_f - T_r}{2}) \\ \Delta R_{out} \fallingdotseq (R_f + \dfrac{T_f}{2}) - (R_r + \dfrac{T_r}{2}) = R_f - (R_r - \dfrac{T_f - T_r}{2}) \end{cases}$$

$L \cdot F_B = T_M$ $$R_{fv} = \frac{L_P + L_W}{\sin \delta w} \times 10^{-3}$$

$$R_f = \frac{L_W}{\sin \delta w} \times 10^{-3}$$

$$R_r = \frac{L_W}{\tan \delta w} \times 10^{-3}$$

$$T_s = T_f$$

$$\Delta R_{fin} = (R_{fv} - \frac{T_s}{2}) - (R_f - \frac{T_f}{2}) = R_{fv} - R_f$$

$$\Delta R_{rin} = (R_{fv} - \frac{T_s}{2}) - (R_r - \frac{T_r}{2}) = R_{fv} - (R_r + \frac{T_s - T_r}{2})$$

$$\Delta R_{fout} = (R_{fv} + \frac{T_s}{2}) - (R_f + \frac{T_f}{2}) = R_{fv} - R_f$$

$$\Delta R_{rout} = (R_{fv} + \frac{T_s}{2}) - (R_r + \frac{T_r}{2}) = R_{fv} - (R_r - \frac{T_s - T_r}{2})$$

$\Delta W_T = (R + \frac{W_T}{2}) - (R_{fv} - \frac{D}{2})$ $Lap = \frac{\Delta W_T}{W_T}$

SUSPENSION CONTROLLER

TECHNICAL FIELD

The present invention relates in general to a so-called preview control for a suspension of a vehicle.

BACKGROUND ART

JP-H05-262118A, JP-H07-237419A, JP-H07-186660A and JP-H07-205629A disclose examples of a suspension controller configured to perform a preview control. In the suspension controller disclosed in JP-H05-262118A, a road surface sensor is provided on a front side of a front wheel of the vehicle, for thereby controlling, based on a value detected by the road surface sensor, damping characteristics of shock absorbers provided for the front and rear wheels of the vehicle. This suspension controller outputs a control command upon elapse of a delay time that is a length of time determined depending on (a) a distance between the road surface sensor and each wheel associated with the shock absorber that is to be controlled, (b) a running speed of the vehicle, and (c) a response delay time.

In the suspension controller disclosed in JP-H07-237419A, a front-wheel vertical-behavior sensor is provided to detect a vertical behavior of a front wheel, for controlling, based on a value detected by the front-wheel vertical-behavior sensor, damping characteristics of a shock absorber provided for a rear wheel of the vehicle. The damping characteristics of the shock absorber for the rear wheel is controlled through a control signal that is prepared based on a detected-value-basis control signal obtained on the basis of the detected value and also on a preview control signal obtained by delaying phase of the detected-value-basis control signal. A ratio of the preview control signal to the detected-value-basis control signal is made high when a running speed of the vehicle is lower than a predetermined value, and is made low when the running speed is higher than the predetermined value. When the running speed is higher than the predetermined value, the ratio is reduced with increase of the running speed. Consequently, the prepared control signal can be changed at the same phase as an actual vertical behavior of the rear wheel, thereby making it possible to satisfactorily suppress a vertical behavior of a rear-wheel side portion of the vehicle. It is known that the phase of the vertical behavior of the rear wheel is not delayed relative to the phase of the vertical behavior of the front wheel by a certain length of time (dependent on, for example, the vehicle running speed), but is somewhat advanced relative to a delayed phase that is delayed relative to the phase of the vertical behavior of the front wheel by the certain length of time. This is because the vertical behavior of the rear wheel is influenced by the vertical behavior of the front wheel due to rigidity of a body of the vehicle. It is further known that the phase of the vertical behavior of the rear wheel is advanced relative to the above-described delayed phase by an amount that is made smaller when the vehicle running speed is high than when the running speed is low. Consequently, the prepared control signal can be changed at a phase close to that of the actual vertical behavior of the rear wheel, by making the above-described ratio of the preview control signal to the detected-value-basis control signal lower when the vehicle running speed is high than when the running speed is low.

In the suspension controller disclosed in JP-H07-186660A, a sprung-portion acceleration sensor is provided in a front-wheel side portion of the vehicle, and a control signal for the rear wheel is prepared based on a value detected by the sprung-portion acceleration sensor. In this arrangement, the control signal is prepared by filtering the detected value by using a selected one of various filters that are different in phase characteristic. The one of the various filters is selected based on running speed of the vehicle. Consequently, no matter whether the vehicle running speed is high or low, the phase of the control signal can be made close to the phase of the actual vertical behavior of the rear wheel.

In the suspension controller disclosed in JP-H07-205629A, a preview total gain is determined based on longitudinal acceleration, lateral acceleration and running speed of the vehicle. In this suspension controller, the preview gain is changeable as needed, for example, when there is a delay in control response during running of the vehicle at a high speed or when there is a difference between path of the front wheel and path of the rear wheel upon cornering of the vehicle, such that the control output is reduced.

DISCLOSURE OF INVENTION

Object to be Solved by the Invention

The present invention was made in the light of the background art discussed above. It is therefore an object of the invention to provide a suspension controller which is configured to perform a preview control and which is capable of satisfactorily suppressing vertical vibration even when a previewable time is shorter than a threshold length of time that is dependent on a response delay time. This object may be achieved according to either first or second aspect of the invention which are described below.

The first aspect of the invention provides a suspension controller for controlling, based on at least one value detected by at least one sensor which is provided in a vehicle and which is configured to detect a detected portion, a suspension provided for a wheel of the vehicle which is located on a rear side of the detected portion and which is distant from the detected portion by a longitudinal distance in a longitudinal direction of the vehicle, such that the suspension works in accordance with a control command value that is prepared based on the at least one value detected by the at least one sensor. The suspension controller includes a gain determiner configured to determine a gain, for controlling the suspension based on the determined gain. The gain determiner is configured to determine the gain such that the determined gain is smaller when a previewable time is shorter than a threshold length of time, than when the previewable time is not shorter than the threshold length of time, the previewable time being dependent on the longitudinal distance and a running speed of the vehicle, the threshold length of time being dependent on a response delay time by which initiation of working of the suspension in accordance with the control command value is to be retarded after output of the control command value supplied to the suspension.

The second aspect of the invention provides a suspension controller for controlling, based on a value detected by at least one sensor which is provided in a vehicle and which is configured to detect a detected portion, a suspension provided for a wheel of the vehicle which is located on a rear side of the detected portion and which is distant from the detected portion by a longitudinal distance in a longitudinal direction of the vehicle, such that the suspension works in accordance with a control command value that is prepared based on the at least one value detected by the at least one sensor. The suspension controller includes a gain determiner configured to determine a gain, for controlling the suspension based on the determined gain. The gain determiner is configured to determine the gain such that the determined gain is smaller when a running speed of the vehicle is higher than a threshold speed, than when the running speed is not higher than the threshold speed, the threshold speed being dependent on the longitudinal distance and a response delay time by which initiation of working of the suspension in accordance with the control command value is to be retarded after output of the control command value supplied to the suspension.

In the suspension controller constructed according to the first aspect of the invention, a so-called "preview control" is performed by controlling the suspension provided for the wheel that is located on a rear side of the detected portion, on the basis of the detected value detected by the at least one sensor that is provided in the vehicle. In the preview control, the suspension is controlled in accordance with the control command value that is prepared based on the detected value detected by the at least one sensor. The control command value may be outputted after a waiting time has elapsed from detection of the detected portion such that the control is performed precisely when an actual vertical behavior of the wheel corresponds to a behavior represented by the detected value. It is noted that the "waiting time" is a length of time that is obtained by subtracting the response delay time from the previewable time. It is further noted that the "suspension" will be referred also to as "damping-characteristic controlling device", "vertical force generator" or "controllable device" where appropriate.

However, when the running speed of the vehicle is considerably high, the previewable time (that is dependent on the running speed of the vehicle and the longitudinal distance between the detected portion and the wheel) is made so short that the control command value could not be outputted by a point of time by which the control command value should be outputted. That is, when the previewable time is considerably short, there is a case in which the control command value cannot be prepared or the detected value cannot be obtained by the point of time by the control command value should be outputted. In such a case, the control in accordance with the control command value could be carried out with a delay relative to an actual vertical behavior of the wheel, so that vertical vibration could not be satisfactorily suppressed and a ride comfort could be made even worse rather than being made better. In the suspension controller according to the first aspect of the invention, a gain used for controlling the suspension is made smaller when the previewable time is shorter than the threshold length of time, than when the previewable time is not shorter than the threshold length of time. Consequently, it is possible to avoid the ride comfort from being deteriorated by performance of the preview control. In this sense, the present suspension controller is advantageous especially where employed for controlling a suspension which requires a large length of time as the response delay time. It is noted that the gain (hereinafter referred to as "preview gain" where appropriate since it is used for performing the preview control) may be either gradually reduced or zeroed when the preview time is reduced.

The threshold length of time may be, for example, a length of time that causes the waiting time to be zeroed, namely, may correspond to an amount of the previewable time that is minimally required for enabling the control command value to be outputted by the above-described point of time. The threshold length of time may be as long as the response delay time, or may be either longer or shorter than the response delay time by a predetermined amount. In any of these cases, the threshold length of time is made longer where the response delay time is long than where the response delay time is short.

Each of the at least one sensor may be either a road surface sensor configured to detect projections and recesses on a road surface, or a sensor configured to detect a vertical behavior of a front-wheel side portion located on the side of a front wheel of the vehicle where the suspension provided for a rear wheel of the vehicle is to be controlled. Where the at least one sensor consists of a plurality of sensors, the plurality of sensors may include the road surface sensor and the above-described sensor configured to detect the vertical behavior of the front-wheel side portion, or the road surface sensor and a sensor configured to detect the vertical behavior of a portion to which the road surface sensor is attached.

Where the at least one sensor includes the road surface sensor, the detected portion is a subjected portion of the road surface that is to be subjected to the detection made by the road surface sensor, so that projections and recesses located in the subjected portion of the road surface are detected by the road surface sensor. In this arrangement, there are a case in which the subjected portion of the road surface is located in substantially the same position as the sensor attached portion (to which the road surface sensor is attached) in the longitudinal direction of the vehicle during standstill of the vehicle and a case in which the subjected portion of the road surface is located on front or rear side of the sensor attached portion in the longitudinal direction during standstill of the vehicle. In the former case, the previewable time is dependent on the vehicle running speed and a distance between the sensor attached portion and the wheel for which the controllable suspension is provided (more precisely, a distance between the sensor attached portion and an axis of axle of the wheel). In the latter case, the previewable time is dependent on the vehicle running speed and a distance between the detected portion and the wheel (for which the controllable suspension is provided) during standstill of the vehicle. Where the road surface sensor is provided on a front side of the front wheel of the vehicle, it is possible to control the suspension provided for the front wheel of the vehicle. Further, it is preferable that the road surface sensor is provided for each of right-side and left-side portions of the vehicle so that the at least one sensor includes a pair of road surface sensors, and that the detected portion (i.e., the subjected portion of the road surface) detected by a right-side road surface sensor as one of the pair of road surface sensors is located in substantially the same position as tires of the respective front right and rear right wheels in a width or lateral direction of the vehicle, while the detected portion detected by a left-side road surface sensor as the other of the pair of road surface sensors is located in substantially the same position as tires of the respective front left and rear left wheels in the lateral direction of the vehicle. Further, the at least one sensor may include two or more road surface sensors that cooperate with each other to detect projections and recesses located in a single detected portion (i.e., the same portion as the subjected portion of the road surface). In this arrangement in which the projections and recesses located in the single portion of the road surface are detected based on detected values detected by the two or more road surface sensors, it is possible to detect conditions of the projections and recesses, more accurately than where they are detected based on a detected value detected by a single road surface sensor.

Where the at least one sensor includes the sensor configured to detect the vertical behavior of the front-wheel side portion (that is located on the side of the front wheel), the detected portion is the front-wheel side portion or the front wheel per se. In this arrangement, the previewable time is dependent on the vehicle running speed and a wheel base of the vehicle, i.e., a distance between the front and rear wheels (more precisely, a distance between a line passing through axes of the respective axles of the front right and front left wheels and a line passing through axes of the respective axles of the rear right and rear left wheels). The at least one sensor may include a sensor configured to detect the vertical behavior of a portion of a sprung portion of the vehicle which is included in the front-wheel side portion, a sensor configured to detect the vertical behavior of a portion of an unsprung portion which is included in the front-wheel side portion, and/or a sensor configured to detect a vertical distance between the portions of the respective sprung and unsprung portions. Further, it is preferable that the sensor configured to detect the vertical behavior of the front-wheel side portion is provided for each of the front right and front left wheels.

It is noted that a state as defined in the first aspect of the invention in which the previewable time is shorter than the threshold length of time corresponds to a state as defined in the second aspect of the invention in which the running speed is higher than the threshold speed corresponding to the threshold length of time. In the same type of vehicle, the longitudinal distance between the wheel and the detected portion is a predetermined fixed value, so that the running speed and the previewable time have a one-to-one relationship that the previewable time is reduced with increase of the running speed. Therefore, the feature that the determined gain is smaller when the running speed is higher than the threshold speed than when the running speed is not higher than the threshold speed, corresponds to the feature that the determined gain is smaller when the previewable time is shorter than the threshold length of time, than when the previewable time is not shorter than the threshold length of time.

In the above-identified JP-H07-237419A, the ratio of the preview control signal (obtained by delaying the phase of the detected-value-basis control signal) to the detected-value-basis control signal is made small when the running speed of the vehicle is not lower than the predetermined value. The predetermined value of the running speed is a value that causes the detected-value-basis control signal to be coincident in phase with the vertical behavior of the rear wheel, namely, is a value that makes it possible to accurately estimate the vertical behavior of the rear wheel. This predetermined value is a value determined irrespective of a length of the response delay time, which is dependent of the suspension that is to be controlled, namely, which is a length of time from output of a control command value until initiation of working of the suspension. That is, this predetermined value is a value determined irrespective of the response delay time which is dependent on the suspension that is to be controlled.

On the other hand, each of the threshold speed described in the second aspect of the invention and the threshold length of time described in the first aspect of the invention is a value that is made smaller where the response delay time is long than where the response delay time is short. Thus, the threshold speed described in the second aspect of the invention and the threshold length of time described in the first aspect of the invention are values that are different from the predetermined value that is described in JP-H07-237419A. Further, the present invention is different from the invention described in JP-H07-237419A with respect to the object to be achieved. The object achieved by the invention of JP-H07-237419A is to cause the control signal to be coincident in phase with the actual vertical behavior of the rear wheel, namely, to accurately estimate the actual vertical behavior of the rear wheel. On the other hand, the object achieved by the present invention is to solve a problem caused in the event of failure to output the control command value by a point of time by which the control command value should be outputted, for example, when the running speed of the vehicle is high.

JP-H07-205629A teaches reducing the preview gain during a high speed running of the vehicle. However, JP-H07-205629A does not teach making the preview gain smaller when the previewable time is shorter than the threshold length of time dependent on the response delay time, than when the previewable time is not shorter than the threshold length of time. JP-H07-205629A does not teach making the preview gain smaller when the running speed is higher than the threshold speed dependent on the response delay time, than when the running speed is not higher than the threshold speed. That is, JP-H07-205629A does not suggest determining the preview gain in a manner that varies depending on whether the running speed is higher or lower than a threshold value that is determined depending on the response delay time.

MODES OF THE INVENTION

There will be described various modes of the invention deemed to contain claimable features for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be constructed in the light of the following descriptions of the various modes and preferred embodiments of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiments of the invention, and that the invention may be embodied with such a possible combination with respect to the same mode.

(1) A suspension controller for controlling, based on at least one value detected by at least one sensor which is provided in a vehicle and which is configured to detect a detected portion, a suspension provided for a wheel of the vehicle which is located on a rear side of the detected portion and which is distant from the detected portion by a longitudinal distance in a longitudinal direction of the vehicle, such that the suspension works in accordance with a control command value that is prepared based on the at least one value detected by the at least one sensor. The suspension controller includes a gain determiner configured to determine a gain, for controlling the suspension based on the determined gain. The gain determiner is configured to determine the gain such that the determined gain is smaller when a previewable time is shorter than a threshold length of time, than when the previewable time is not shorter than the threshold length of time, the previewable time being dependent on the longitudinal distance and a running speed of the vehicle, the threshold length of time being dependent on a response delay time by which initiation of working of the suspension in accordance with the control command value is to be retarded after output of the control command value supplied to the suspension.

(2) The suspension controller according to mode (1), wherein the gain determiner includes a constant-value setting portion by which the gain is set to a predetermined constant value when the previewable time is not shorter than the threshold length of time.

When the previewable time is not shorter than the threshold length of time, namely, when the control command value can be outputted by a point of time by which the control command value should be outputted, the vertical vibration can be satisfactorily suppressed by the preview control. Therefore, it is appropriate that the gain is set to a predetermined constant value such as 1 (one) as a maximum value when the previewable time is not shorter than the threshold length of time. When the previewable time is shorter than the threshold length of time, the gain may be set to a value that is reduced with reduction of the previewable time, as described below.

(3) The suspension controller according to mode (1) or (2), wherein the gain determiner includes a reduced-value setting portion by which the gain is set to a value that is reduced with reduction of the previewable time when the previewable time is shorter than the threshold length of time.

The value of the gain may be reduced either in a gradual or stepwise manner, with reduction of the previewable time. Where the value of the gain is gradually reduced, it may be either linearly or non-linearly reduced.

(4) The suspension controller according to any one of modes (1)-(3), wherein the gain determiner includes a zero setting portion by which the gain is set to zero when the previewable time is not longer than a second threshold length of time that is shorter than the threshold length of time as a first threshold length of time.

When the previewable time is shorter than the threshold length of time, even if the control command value were immediately outputted, the control of the suspension in accordance with the control command value would be carried out with a delay relative to the actual vertical behavior of the wheel. When the control of the suspension is carried out with a large degree of delay, the vertical vibration cannot be satisfactorily suppressed. However, when the control of the suspension is carried out with a small degree of delay, the vertical vibration can be effectively suppressed. In the suspension controller constructed according to this mode (4), the preview control is carried out when a vibration suppressing effect can be obtained in spite of the delay of the control, and is not carried out when the vibration suppressing effect cannot be obtained. Therefore, the second threshold length of time is set to a minimum value of the previewable time that enables the preview control to provide the vibration suppressing effect in spite of failure to output the control command value by a point of time by which the control command value should be outputted.

Meanwhile, it is known, from a simulation or an experiment using a real vehicle, that the vibration suppressing effect can be obtained even when the suspension control is carried out with a delay relative to the vertical vibration as long as an amount of the delay is not larger than one-eighth ($\frac{1}{8}$) cycle of the vibration. In view of this knowledge, the second threshold length of time may be set to a value of the previewable time that enables the suspension control to be carried out with an amount of the delay corresponding to one-eighth ($\frac{1}{8}$) cycle of the vibration (when the control command value is immediately outputted). Thus, when the previewable time is not shorter than the second threshold length of time, the preview control is carried out (namely, the preview control is effective) although the control in accordance with the control command value might be delayed. When the previewable time is shorter than the second threshold length of time, the preview control is not carried out. It is noted that the second threshold length of time may be set to a value larger than the above-described value.

(5) The suspension controller according to any one of modes (1)-(4), wherein the gain determiner includes a zero setting portion by which the gain is set to zero when the previewable time is shorter than the threshold length of time.

In the suspension controller according to this mode (5), the preview control is not carried out when the previewable time is shorter than the threshold length of time, namely, when the control in accordance with the control command value is delayed relative to the vibration of the wheel.

(6) The suspension controller according to any one of modes (1)-(5), including a preview controlling portion configured, when the previewable time is not shorter than the threshold length of time, to output the control command value, upon elapse of a given time from a point of time at which the at least one detected value is obtained, the given time being a length of time obtained by subtracting the response delay time from the previewable time.

In the suspension controller according to this mode (6), the control command value is outputted upon elapse of a waiting time (i.e., upon elapse of the given time obtained by subtracting the response delay time from the previewable time), so that a point of time at which the preview control is carried out in accordance with the control command value is coincident with a point of time at which the wheel exhibits the vertical behavior corresponding to the at least one value detected by the at least one sensor, whereby the vertical vibration can be satisfactorily suppressed.

(7) The suspension controller according to any one of modes (1)-(6), wherein the gain determiner includes a wheel-turning-angle-basis determining portion configured to determine the gain, such that the determined gain is smaller when an absolute value of a turning angle of a steerable wheel of the vehicle is large, than when the absolute value of the turning angle of the steerable wheel is small.

When the vehicle turns with a small turning radius, namely, with the absolute value of the turning angle of the steerable wheel being large, there could be a considerable difference between path of the front wheel and path of the rear wheel, so that the rear wheel is unlikely to pass over a portion of a road surface over which the front wheel has passed, or so that the rear wheel is likely to pass over a portion of the road surface which little overlaps with a portion of the road surface over which the front wheel has passed. Further, there is a case in which the rear wheel does not pass over a detected portion of the road surface which has been detected by the road surface sensor, or passes over a portion of the road surface which little overlaps with the detected portion of the road surface. If the preview control were carried out in such cases, the vertical vibration could not be satisfactorily suppressed or the ride comfort could be made even worse rather than being made better.

Therefore, in the suspension controller according to this mode (7), the gain is made smaller when the absolute value of the turning angle is large than when the absolute value of the turning angle of the steerable wheel is small. This arrangement is effective to avoid the ride comfort from being deteriorated by the preview control while satisfactorily suppressing the vertical vibration. It is noted that the gain may be zeroed when the absolute value of the turning angle is large.

A state in which the absolute value of the turning angle of the steerable wheel is large, a state in which the turning radius is small, a state in which an absolute value of an operating amount of a steering operation member is large (for example, an absolute value of a steering angle of a steering wheel is large), a state in which an absolute value of a lateral acceleration or a lateral force is large and a state in which an absolute value of a yaw rate is large, correspond to each other. The gain may be determined based on any one of these physical amounts representing a turning state of the vehicle.

(8) The suspension controller according to any one of modes (1)-(7), wherein the gain determiner includes a previewable-time-basis determining portion configured to determine the gain during straight running of the vehicle, such that the determined gain is smaller when the previewable time is shorter than the threshold length of time, than when the previewable time is longer than the threshold length of time, and wherein the gain determiner includes a wheel-turning-angle-basis determining portion configured to determine the gain during non-straight running of the vehicle, such that the determined gain is smaller when an absolute value of a turning angle of a steerable wheel of the vehicle is large, than when the absolute value of the turning angle of the steerable wheel is small.

During straight running of the vehicle, it is not so necessary to take account of a negative influence of the preview control, which could be caused during turning or non-straight running of the vehicle. Therefore, during straight running of the vehicle, the gain is determined based on the previewable time. On the other hand, during turning or non-straight running of the vehicle, the gain may be determined based on a turning state of the vehicle, or may be determined based on both of the turning state and the previewable time (or the running speed).

It is possible to determine whether the vehicle is running straight or turning, by comparing the absolute value of the turning angle of the steerable wheel with a predetermined value that permits the vehicle to be regarded to run straight. Specifically, it is determined that the vehicle is in a state of straight running when the absolute value of the turning angle of the steerable wheel is not larger than the predetermined value, and that the vehicle is in a state of turning or non-straight running when the absolute value of the turning angle of the steerable wheel is larger than the predetermined value. The determination as to whether the vehicle is in a state of straight running or in a state of non-straight running may be made based on at least one of the above-described physical amounts (such as the steering angle of the steering wheel, the operating amount of the steering operation member, the lateral acceleration, the lateral force, the yaw rate and the turning radius) representing the turning state of the vehicle.

(9) The suspension controller according to any one of modes (1)-(8), wherein the suspension is disposed between a sprung portion of the vehicle and an unsprung portion of the vehicle that holds the wheel, and which includes a vertical force generator configured to generate a vertical force. The suspension controller includes a vertical force controller configured to control the vertical force generator based on the at least one value detected by the at least one sensor and the gain determined by the gain determiner.

The vertical force generator is disposed between the sprung and unsprung portions, and is configured to generate the vertical force. The vertical force is a force acting in a direction containing a component of a vertical direction of the vehicle. Thus, the vertical force does not have to act precisely in the vertical direction, but may act in a direction somewhat inclined with respect to the vertical direction. The acting direction of the vertical force generated by the vertical force generator is dependent on, for example, construction for connection of the unsprung portion with the vehicle body and wheel and construction of connection of the vertical force generator with the unsprung portion. Where the unsprung portion is pivotable in the vertical direction and is unmovable (unpivotable) in the longitudinal direction and lateral direction of the vehicle, the generated force may be considered to act in the vertical direction. The vertical vibration can be satisfactorily suppressed by controlling the vertical force generator based on the gain and the at least one value detected by the at least one sensor. The vertical force may serve also as a damping force or an elastic force, as described below.

(10) The suspension controller according to mode (9), wherein the vertical force generator includes a damping force generator configured to generate a damping force, wherein the vertical force controller includes a target-damping-force determining portion and a damping-force controlling portion, wherein the target-damping-force determining portion is configured to estimate, based on the at least one detected value, at least one of an absolute vertical velocity of the sprung portion, an absolute vertical velocity of the unsprung portion and a relative vertical velocity of the sprung and unsprung portions, and to determine a target damping force based on the gain and the at least one of the vertical velocities, and wherein the damping-force controlling portion is configured to control the damping force generator such that the damping force generator outputs the target damping force determined by the target-damping-force determining portion.

The damping force is generated by controlling the vertical force generator, and the vertical vibration is suppressed by the generated damping force. An amount of the generated damping force may be an amount corresponding to the absolute velocity of the sprung portion, an amount corresponding to the relative velocity of the sprung and unsprung portions or an amount corresponding to the absolute velocity of the unsprung portion. At least two of these velocities may be taken into account upon determination of the amount of the damping force or determination of damping coefficient. Further, the vertical force generated by the vertical force generator may contain two or more of (i) the damping force whose amount is dependent on the absolute velocity of the sprung portion, (ii) the damping force whose amount is dependent on the relative velocity of the sprung and unsprung portions and (iii) the damping force whose amount is dependent on the absolute velocity of the unsprung portion. For example, the amount of the vertical force may be controlled such that the vertical force contains the damping force whose amount is dependent on the absolute velocity of the sprung portion and the damping force whose amount is dependent on the absolute velocity of the unsprung portion. The absolute velocity of the sprung portion, the absolute velocity of the unsprung portion or the relative velocity of the sprung and unsprung portions is obtained based on the at least one value detected by the at least one sensor, and the obtained velocity is not necessarily the same to the at least one value detected by the at least one sensor.

(11) The suspension controller according to mode (9) or (10), wherein the vertical force generator includes an elastic force generator configured to generate an elastic force, wherein the vertical force controller includes a target-elastic-force determining portion and an elastic-force controlling portion, wherein the target-elastic-force determining portion is configured to estimate, based on the at least one detected value, at least one of a vertical displacement of the sprung portion, a vertical displacement of the unsprung portion and a relative vertical displacement of the sprung and unsprung portions, and to determine a target elastic force based on the gain and the at least one of the vertical displacements, and wherein the elastic-force controlling portion is configured to control the elastic force generator such that the elastic force generator outputs the target elastic force determined by the target-elastic-force determining portion.

The elastic force is generated by controlling the vertical force generator, and the vertical vibration is suppressed by the generated elastic force. Further, the vertical force generated by the vertical force generator may contain two or more elastic forces. For example, the amount of the vertical force may be controlled such that the vertical force contains the elastic force dependent on displacement of the sprung portion and the elastic force dependent on displacement of the unsprung portion. Further, the amount of the vertical force may be controlled to become equal to a sum of the amount of the damping force and the amount of the elastic force.

(12) The suspension controller according to any one of modes (9)-(11), wherein the vertical force generator includes an elastic member having opposite end portions such that one of the opposite end portions is connected to the sprung portion while the other of the opposite end portions is connected to the unsprung portion, wherein the vertical force generator includes a drive source configured to elastically deform the elastic member against a restoring force of the elastic member, and wherein the vertical force controller includes an elastic-deformation-amount controlling portion configured to control an amount of elastic deformation of the elastic member by controlling the drive source, so as to control the vertical force.

(13) The suspension controller according to mode (12), wherein the elastic member is a generally L-shaped bar including a laterally extending portion extending in a lateral direction of the vehicle and a non-parallel portion that extending in a direction that is not parallel with the lateral direction, and wherein the drive source includes an electric motor configured to rotate one of the laterally extending and non-parallel portions about an axis thereof.

(14) The suspension controller according to mode (12) or (13), wherein the elastic member is a rod extending in a lateral direction of the vehicle or in a direction that is not parallel with the lateral direction, and wherein the drive source includes an electric motor configured to apply a bending moment to the rod.

The elastic member may be provided by either a member having a L shape as seen in the vertical direction or a member extending straight as seen in the vertical direction. In other words, the elastic member may have a vertically curved shape.

(15) The suspension controller according to any one of modes (9)-(14), wherein the vertical force generator includes a first elastic member disposed in parallel with a suspension spring that serves as a second elastic member, and wherein the suspension spring as well as the first elastic member is disposed between the sprung portion and the unsprung portion.

In the suspension controller according to this mode (15), the suspension spring as the second elastic member in addition to the elastic member of the vertical force generator as the first elastic member is disposed between the sprung and unsprung portions. The first elastic member included in the vertical force generator is elastically deformed by the drive source, whereby the vertical force is generated, while the suspension spring as the second elastic member is elastically deformed by, for example, a load applied to the wheel, rather than by a drive source. The load applied to the wheel is received by the first elastic member (included in the vertical force generator) and the second elastic member (provided by the suspension spring). However, in a state in which the drive source is not being activated so that the elastic member is not elastically deformed, the load is received by the second elastic member since substantially no force is applied to the first elastic member. This state is a reference state of the drive source of the vertical force generator. In the reference state, a distance between the sprung and unsprung portions is dependent on the load applied to the wheel, and is made smaller when the applied load is large than when the load is small.

For example, when an electric motor of the drive source is rotated in a certain direction from the reference state, the distance between the sprung and unsprung portions is increased. In this instance, the elastic force of the first elastic member (included in the vertical force generator) and the elastic force of the second elastic member (provided by the suspension spring) act in the same direction. When the elastic force of the second elastic member is reduced as a result of increase in the distance between the sprung and unsprung portions, the elastic force of the first elastic member is increased, so that a sum of the elastic forces of the first and second elastic members is held in an amount corresponding to the load.

When the electric motor is rotated in a direction opposite to the above-described certain direction from the reference state, the distance between the sprung and unsprung portions is reduced. In this instance, the elastic force of the first elastic member and the elastic force of the second elastic member act in respective directions that are opposite to each other. When the elastic force of the second elastic member is increased as a result of reduction in the distance between the sprung and unsprung portions, the elastic force of the first elastic member (acting in the direction opposite to the direction of the elastic force of the second elastic member) is increased.

Where the elastic member is the L-shaped bar, one (hereinafter referred to as "arm portion") of the laterally extending and non-parallel portions is pivoted by rotation of the other (hereinafter referred to as "shaft portion") of the laterally extending and non-parallel portions about its axis, whereby the distance between the sprung and unsprung portions is changed. Further, upon twisting deformation or torsion of the shaft portion, a torsional moment (that is a torque applied by the electric motor) applied to the shaft portion and a bending moment applied to the arm portion become equal to each other, so that the vertical force whose amount is dependent on the equalized moments is applied to the unsprung portion.

Where the elastic member is the straight rod, a torque and a bending moment applied to the rod by the electric motor become equal to each other, so that the vertical force whose amount is dependent on the equalized torque and moment is applied to the unsprung portion.

Irrespective of whether the elastic member is the L-shaped bar or the straight rod, the vertical force generator generates the vertical force whose amount is dependent on the equalized torque and moment to the elastic member (, provided that the torsional stress and the bending strength concurrently reach an allowable stress).

Where the elastic member is the L-shaped bar, the arm portion is pivoted by rotation of the shaft portion about its axis. Where the elastic member is the straight rod, the straight rod is rotated directly by the electric motor. Therefore, the arrangement with the elastic member provided by the L-shaped bar is advantageous over the arrangement with the elastic member provided by the straight rod, since the drive source can be provided in a portion of the vehicle body (i.e., sprung portion) which is more distant from the wheel in the former arrangement than in the latter arrangement.

(16) The suspension controller according to any one of modes (9)-l (15), wherein the at least one sensor includes (i) an acceleration sensor configured to detect a vertical acceleration of a portion of the sprung portion which is included in a front-wheel side portion of the vehicle located on a side of a front wheel of the vehicle, and (ii) a stroke sensor configured to detect a relative stroke of the portion of the front-wheel side portion and a portion of the unsprung portion which is included in the front-wheel side portion of the vehicle, and wherein the vertical force controller includes a sprung-portion-basis controlling portion configured to control the vertical force generator provided for a rear wheel of the vehicle, based on the gain, the detected vertical acceleration and the detected relative stroke.

It is not desirable that the at least one sensor is provided in the unsprung portion, because the at least one detected value is likely to contain an error if the sensor is provided in the unsprung portion. On the other hand, the vertical behavior of the unsprung portion can be accurately obtained based on the behavior of the sprung portion and the relative stroke of the sprung and unsprung portions.

(17) The suspension controller according to any one of modes (9)-(15), wherein the at least one sensor includes a road surface sensor configured to detect projections and recesses of a road surface, which are located on a front side of an axle of a front wheel of the vehicle during standstill of the vehicle, and wherein the vertical force controller includes at least one of (a) a road-surface-basis front-wheel-side controlling portion configured to control, based on the gain and the detected projections and recesses of the road surface, the vertical force generator provided for the front wheel, and (b) a road-surface-basis rear-wheel-side controlling portion configured to control, based on the gain and the detected projections and recesses of the road surface, the vertical force generator provided for a rear wheel of the vehicle.

The displacement and absolute velocity of the unsprung portion that holds the wheel can be obtained based on the projections and recesses on the road surface, which are detected by the road surface sensor.

(18) A suspension controller for controlling, based on a value detected by at least one sensor which is provided in a vehicle and which is configured to detect a detected portion, a suspension provided for a wheel of the vehicle which is located on a rear side of the detected portion and which is distant from the detected portion by a longitudinal distance in a longitudinal direction of the vehicle, such that the suspension works in accordance with a control command value that is prepared based on the at least one value detected by the at least one sensor. The suspension controller includes a gain determiner configured to determine a gain, for controlling the suspension based on the determined gain. The gain determiner is configured to determine the gain such that the determined gain is smaller when a running speed of the vehicle is higher than a threshold speed, than when the running speed is not higher than the threshold speed, the threshold speed being dependent on the longitudinal distance and a response delay time by which initiation of working of the suspension in accordance with the control command value is to be retarded after output of the control command value supplied to the suspension.

The technical features described in any one of above modes (1)-(17) are applicable to the suspension controller according to this mode (18). For example, the threshold speed corresponds to a value obtained by dividing the longitudinal distance (between the detected portion and the wheel) by the response delay time. Further, a value obtained by dividing the longitudinal distance by the second threshold length of time can be defined as a second threshold speed that is different from the above-described threshold speed as a first threshold speed. When the running speed is not lower than the second threshold speed, the gain may be set to zero.

(19) A controller for controlling, based on at least one value detected by at least one sensor which is provided in a vehicle and which is configured to detect a detected portion, a controllable device provided for a wheel of the vehicle which is located on a rear side of the detected portion and which is distant from the detected portion by a longitudinal distance in a longitudinal direction of the vehicle. The controller includes a gain determiner configured to determine a gain, for controlling the controllable device based on the determined gain. The gain determiner is configured to determine the gain such that the determined gain is smaller when a previewable time is shorter than a threshold length of time, than when the previewable time is not shorter than the threshold length of time, the previewable time being dependent on the longitudinal distance and a running speed of the vehicle, the threshold length of time being dependent on a response delay time by which initiation of working of the controllable device is to be retarded after output of command commanding the working of the controllable device.

The technical features described in any one of above modes (1)-(17) are applicable to the controller according to this mode (19). The preview control is applicable not only to control of the suspension but also to control of any controllable device installed in a vehicle.

(20) The controller according to mode (19), wherein the at least one sensor includes a lateral force sensor configured to detect a lateral force acting on a front wheel of the vehicle, which is turnable by operation of a steering operation member made by an operator of the vehicle, wherein the controllable device is a wheel-turning-angle control device configured to automatically control a turning angle of a steerable rear wheel of the vehicle. The controller includes a running-condition controlling portion configured, when a value of the detected lateral force relative to an operating amount of the steering operation member is not within a predetermined range, to control the wheel-turning-angle control device such that the vehicle is held in a running condition in accordance with the operating amount of the steering operation member. The gain determiner includes a smaller-value setting portion by which the gain is set to a value that is made smaller when the previewable time is shorter than the threshold length of time, than when the previewable time is not shorter than the threshold length of time.

For example, during running of the vehicle on a rutted road or a crossover road, there is a case in which a lateral force is applied to the front wheel even when the vehicle is commanded to run straight by operation of the steering operation member. In such a case, the controller according to this mode (20) makes it possible to control the turning angle of the steerable rear wheel.

(21) A suspension controller for controlling, based on at least one value detected by at least one sensor which is provided in a vehicle and which is configured to detect a detected portion, a suspension provided for a wheel of the vehicle which is located on a rear side of the detected portion. The suspension controller includes a gain determiner configured to determine a gain, for controlling the suspension based on the determined gain. The gain determiner is configured, during straight running of the vehicle, to determine the gain such that the determined gain is smaller when a running speed of the vehicle is high, than when the running speed is low. The gain determiner is configured, during non-straight running of the vehicle, to determine the gain such that the determined gain is smaller when an absolute value of a turning angle of a steerable wheel of the vehicle is large, than when the absolute value of the turning angle of the steerable wheel is small.

The technical features described in any one of above modes (1)-(20) are applicable to the suspension controller according to this mode (21).

BRIEF DESCRIPTION OF DRAWINGS

The above and other objects, features, advantages and technical and industrial significance of the present invention will be better understood by reading the following detailed description of presently preferred embodiments of the invention, when considered in connection with the accompanying drawings, in which:

FIG. 10 is a table showing operational states of respective switching elements of the inverter in each operational mode of the electric motor;

BEST MODE FOR CARRYING OUT THE INVENTION

There will be described embodiments of the present invention, by reference to the accompanying drawings. It is to be understood that the present invention is not limited to the following embodiments, and may be otherwise embodied with various changes and modifications, such as those described in the foregoing "MODES OF THE INVENTION", which may occur to those skilled in the art.

Figure 1:
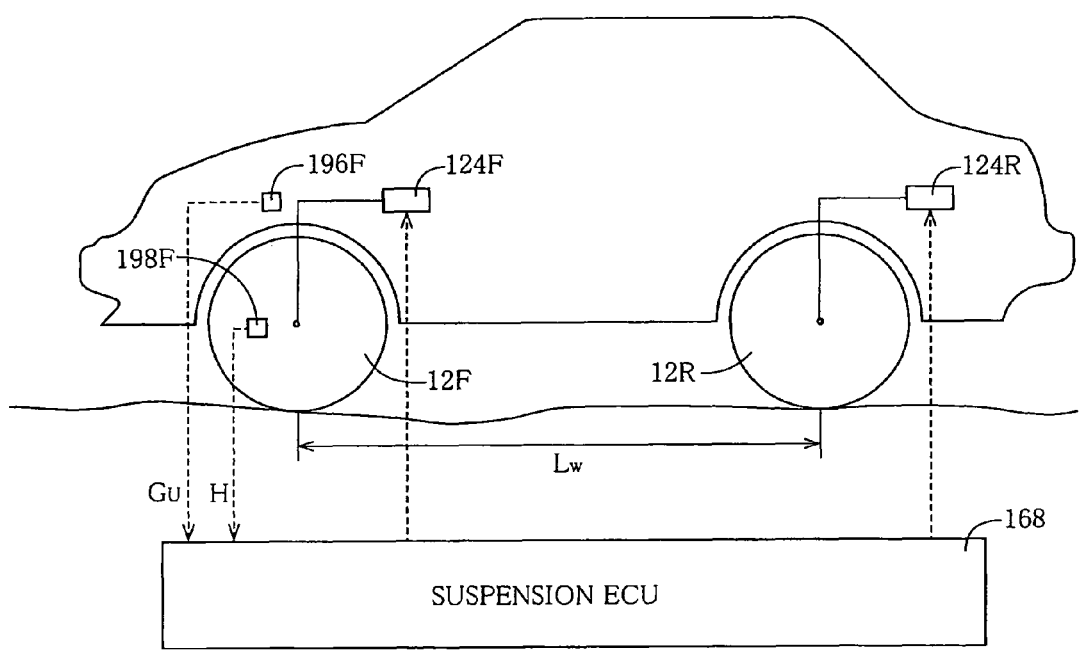
FIG. 1 is a view conceptually showing an entirety of a vehicle equipped with a suspension controller that is constructed according to an embodiment of the invention.
Figure 2:
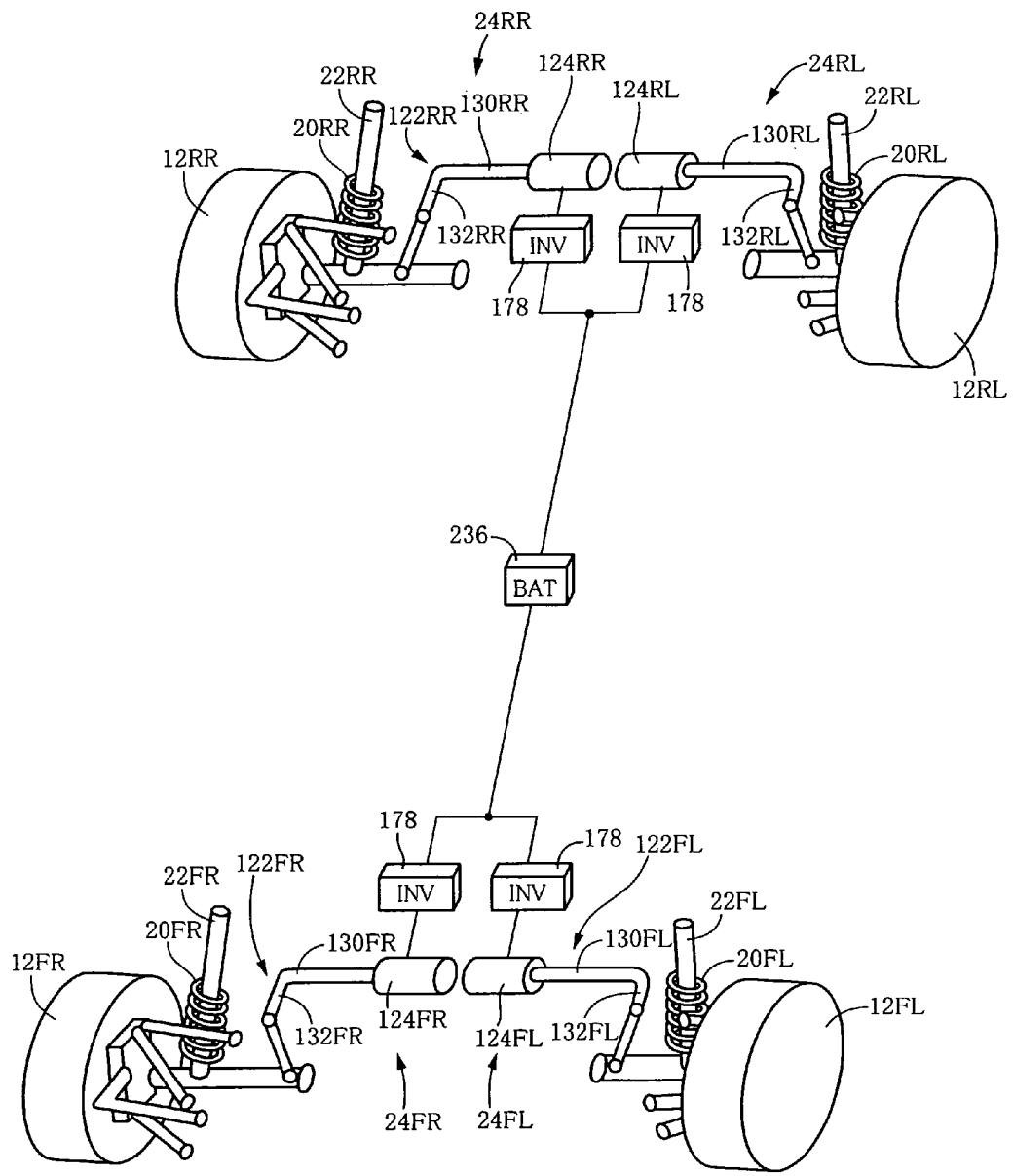
FIG. 2 is a view conceptually showing an entirety of a suspension system including the suspension controller.
Figure 3:
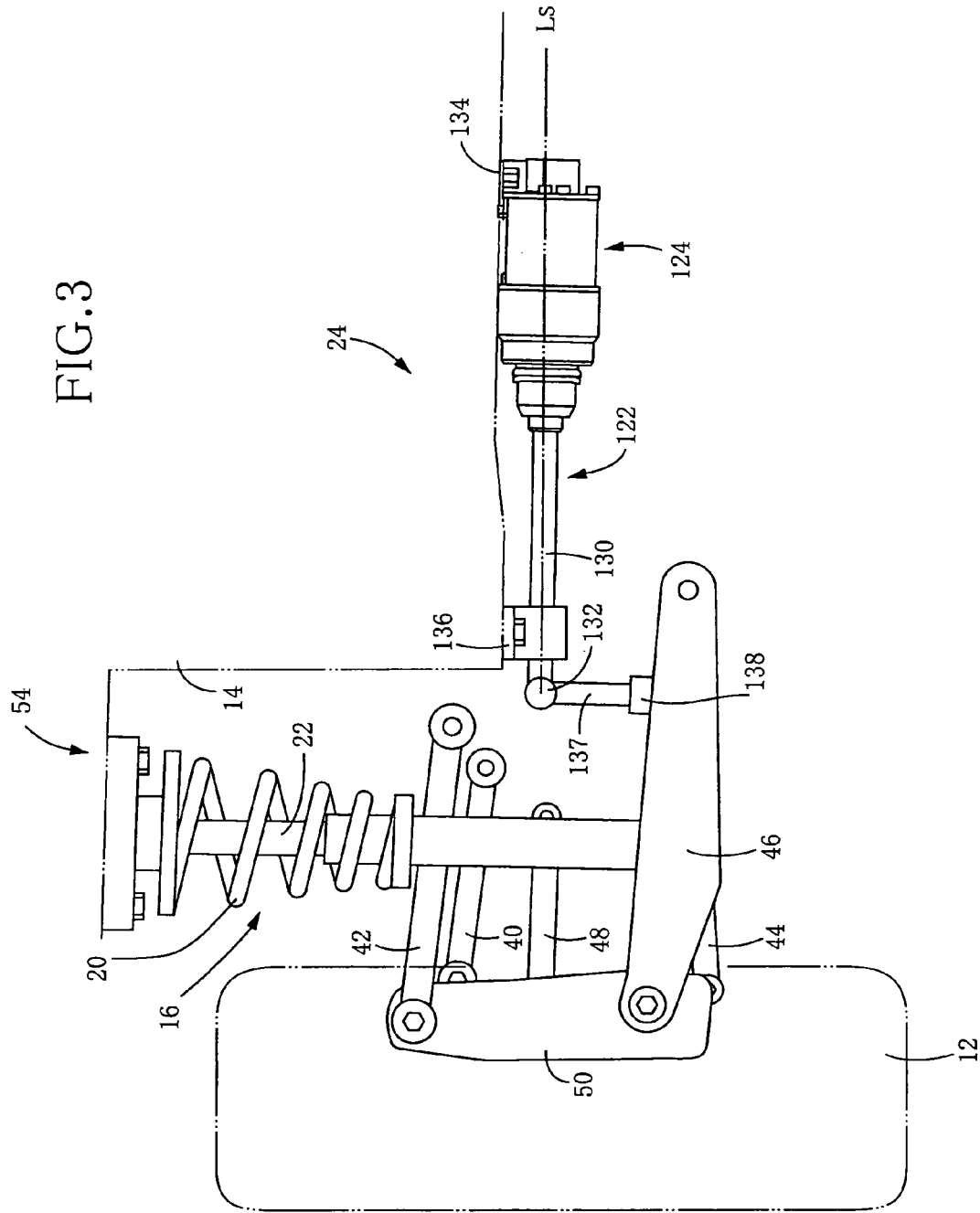
FIG. 3 is a side view of a vertical force generator included in the suspension system.

Referring first to FIGS. 1-33, there will be described a suspension controller which is constructed according to an embodiment of the invention and which is included in a suspension system of a vehicle. As shown in FIGS. 2 and 3, a suspension 16 is provided between a vehicle body 14 as a sprung portion of the vehicle and each of front right, front left, rear right and rear left wheels 12FR, 12FL, 12RR, 12RL of the vehicle. The suspension 16 includes a coil spring 20 as a suspension spring, a shock absorber 22 and a vertical force generator 24. In the following description, each of the wheel 12, coil spring 20, shock absorber 22 and vertical force generator 24 will be referred together with, as a suffix, one of reference signs FR, FL, RR, RL indicative of the respective front right, front left, rear right and rear left wheels, where it should be clarified which one of the four wheels the referred coil spring 20, shock absorber 22 or vertical force generator 24 corresponds to. Further, each of the wheel 12, coil spring 20, shock absorber 22 and vertical force generator 24 is referred together with, as another suffix, reference sign in indicative of a certain one of the front right, front left, rear right and rear left wheels, where it should be clarified that the referred coil spring 20, shock absorber 22 or vertical force generator 24 corresponds to the certain one of the wheels.

As shown in FIG. 3, the suspension 16 is a multi-link suspension, and is equipped with an arm assembly that includes a total of five suspension arms, i.e., a first upper arm 40, a second upper arm 42, a first lower arm 44, a second lower arm 46 and a toe control arm 48. Each of the five suspension arms 40, 42, 44, 46, 48 is connected at one of its longitudinal end portions to the vehicle body 14, pivotably relative to the vehicle body 14, and is connected at the other longitudinal end portion to an axle carrier 50 by which the wheel 12 is relatively rotatably held. Owing to its connection with the five suspension arms 40, 42, 44, 46, 48, the axle carrier 50 is vertically displaceable relative to the vehicle body 14 along a predetermined locus.

Figure 4:
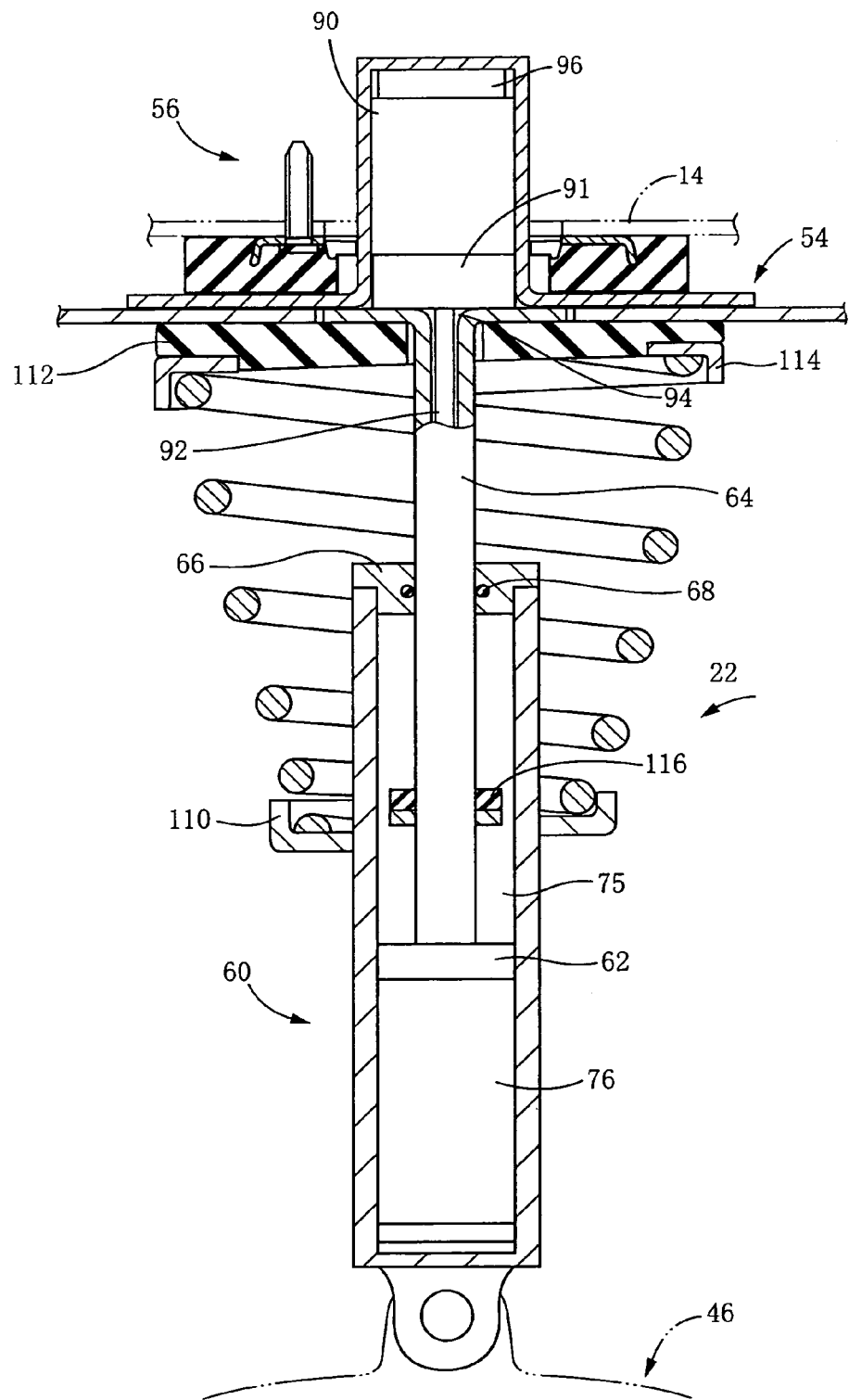
FIG. 4 is a cross sectional view of a shock absorber included in the suspension system.
Figure 5:
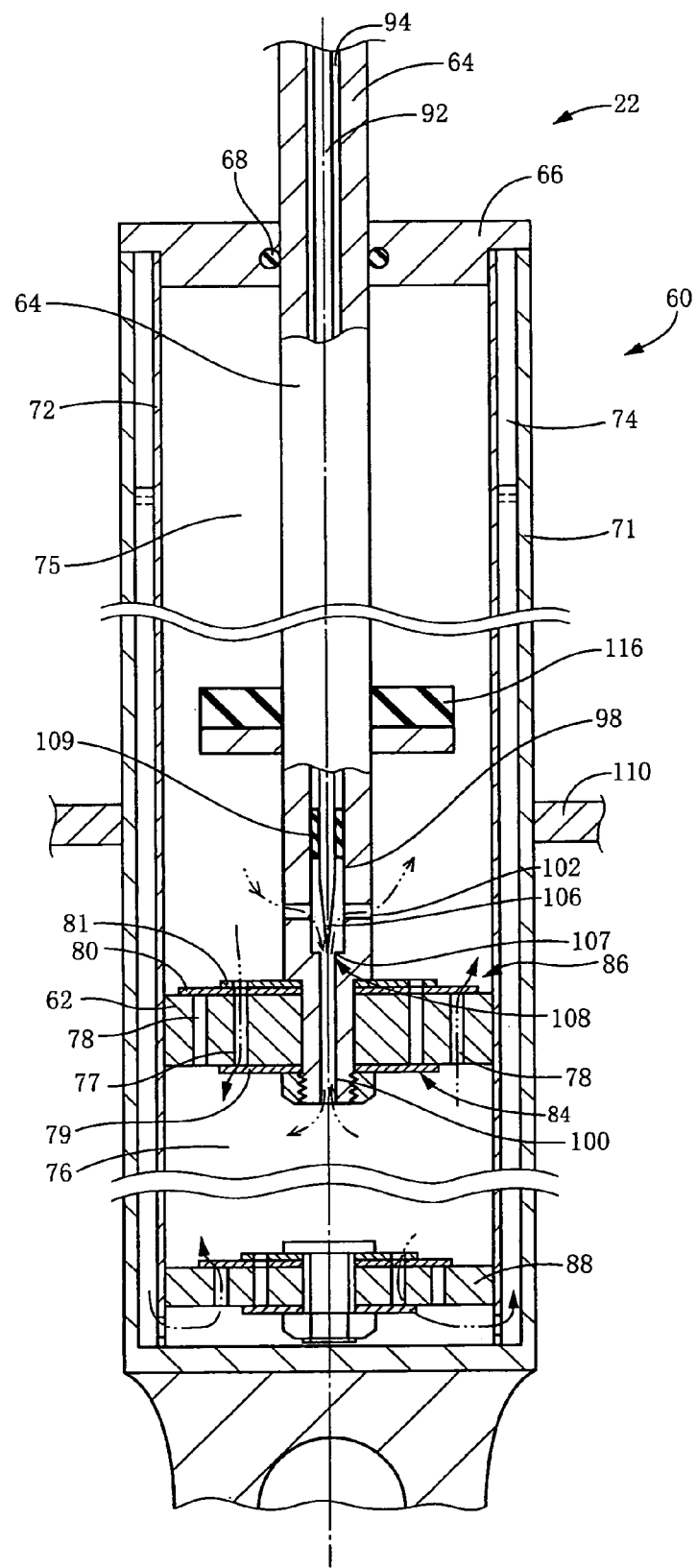
FIG. 5 is a cross sectional view of a part of the shock absorber.

As shown in FIG. 4, the shock absorber 22 is disposed between the vehicle body 14 as the sprung portion and the second lower arm 46 as a part of an unsprung portion of the vehicle, such that, in principle, the shock absorber 22 is vertically unmovable relative to the vehicle body 14 and the second lower arm 46, and is rockable relative to the vehicle body 14 and the second lower arm 46. The shock absorber 22 includes a damping-characteristic controlling device 56 by which a damping characteristic of the shock absorber 22 is continuously controllable. The shock absorber 22 includes a housing 60 and a piston 62. The housing 60 is connected to the second lower arm 46, while the piston 62 has a piston rod 64 that is connected through a mount portion 54 of the vehicle body 14. A seal 68 is disposed in a groove formed in an inner circumferential surface of a cap portion 66 of the housing 60. The piston rod 64 is in slidable contact at its intermediate portion with the seal 68 and the inner circumferential surface of the cap portion 66. As shown in FIG. 5, the housing 60 includes an outer cylinder 71 and an inner cylinder 72 such that a buffer chamber 74 is defined between the outer and inner cylinders 71, 72. The piston 62 is fluid-tightly and slidably fitted in an inner circumferential surface of the inner cylinder 72, and an inside space of the inner cylinder 72 is divided by the piston 62 into an upper chamber 75 and a lower chamber 76.

The piston 62 has a plurality of communication passages 77, 78 which allow communication between the upper and lower chambers 75, 76 therethrough. FIG. 5 illustrates two of the communication passages 77 and two of the communication passages 78. The communication passages 77 are arranged on a circle while the communication passages 78 are arranged on another circle, such that the two circles are coaxial with each other. A lower valve plate 79 is disposed on a lower surface of the piston 62, and is gripped between the lower surface of the piston 62 and a nut that is in thread engagement with the piston rod 64. First and second upper valve plates 80, 81 are disposed on an upper surface of the piston 62, and are gripped between the upper surface of the piston 62 and a shoulder portion of the piston rod 64. The lower valve plate 79 does not cover openings of the respective communication passages 78 that are located on a radially outer side of the communication passages 77, but has a size enabling the valve plate 79 to cover openings of the respective communication passages 77 that are located on a radially inner side of the communication passages 78. When a difference between a fluid pressure in the upper chamber 75 and a fluid pressure in the lower chamber 76 is increased to a predetermined value, namely, when a force acting on the lower valve plate 79 is increased to a valve opening value, the lower valve plate 79 is deflected thereby allowing flow of a working fluid from the upper chamber 75 to the lower chamber 76. The lower valve plate 79 cooperates with the openings of the respective communication passages 77, so as to constitute at least a part of a leaf valve 84. The first and second upper valve plates 80, 81 are vertically superposed on each other. The openings of the respective communication passages 78 are closed by the first upper valve plate 80, while the openings of the respective communication passages 77 are not covered by the first and second upper valve plates 80, 81 due to openings formed through portions of the valve plates 80, 81 which are aligned with the openings of the respective communication passages 78. When a difference between the fluid pressure in the lower chamber 76 and the fluid pressure in the upper chamber 75 is increased to a predetermined value, namely, when a force acting on the first upper valve 80 is increased to a valve opening value, the first upper valve plate 80 is deflected thereby allowing flow of the working fluid from the lower chamber 76 to the upper chamber 75. The first and second upper valve plates 80, 81 cooperate with the openings of the respective communication passages 78, so as to constitute at least a part of a leaf valve 86. Between the lower chamber 76 and the buffer chamber 74, there is provided a base valve body 88 that is equipped with leaf valves.

As shown in FIG. 4, the damping-characteristic controlling device 56 includes an electric motor 90, a motion converter 91 configured to convert a rotary motion of the electric motor 80 into a linear motion, and an adjusting rod 92 disposed in a through-hole 94, which is formed in the piston rod 64 and extends in an axial direction of the piston rod 64. The adjusting rod 92 is connected at its upper end portion to an output member of the motion converter 91, and is linearly moved relative to the piston rod 64 by rotation of the electric motor 90. A rotational angle of the electric motor 90 is detected by a rotational angle sensor 96. As shown in FIG. 5, the through-hole 94 is a stepped hole, and has a large diameter portion 98 and a small diameter portion 100 that are provided by its upper and lower portions, respectively. The small diameter portion 100 is held in communication with the lower chamber 76, while the large diameter portion 98 is held in communication with the upper chamber 75 through communication passages 102. The upper and lower chambers 75, 76 are held in communication with each other via the through-hole 94 and the communication passages 102.

Meanwhile, an intermediate portion of the adjusting rod 92 has an outside diameter that is smaller than an inside diameter of the large diameter portion 98 of the through-hole 94 and is larger than an inside diameter of the small diameter portion 100 of the through-hole 94. A lower end portion 106 of the adjusting rod 92 has an outside diameter that is gradually reduced as the lower end portion 106 extends downwardly. The lower end portion 106 of the adjusting rod 92 may be provided by, for example, a tapered portion. The adjusting rod 92 is positioned relative to the piston rod 64 such that the intermediate portion is positioned in the large diameter portion 98 of the through-hole 94 while the lower end portion 106 of the adjusting rod 92 is positioned in the vicinity of a stepped portion between the large diameter portion 98 and small diameter portion 100. The lower end portion 106 of the adjusting rod 92 has an outer circumferential surface that cooperates with a radially inner end 107 of the stepped portion to define therebetween an annular clearance. An area of the annular clearance is continuously changed with change of a position of the adjusting rod 92 relative to the piston rod 64. The relative position of the adjusting rod 92 can be detected through the rotational angle of the electric motor 90. That is, an opening area of a variable restrictor (flow control valve) 108 is controlled by controlling the electric motor 90, so that the lower end portion 106 of the adjusting rod 92 and an inner circumferential surface of the through-hole 94 (including the above-described radially inner end 107) constitute at least a part of the variable restrictor (flow control valve) 108. A seal member 109 is provided on an upper side of a portion of the through-hole 94 at which the through-hole 94 is connected to the communication passages 102, such that a fluid tightness between the inner circumferential surface of the through-hole 94 and the outer circumferential surface of the adjusting rod 92 is established by the seal member 109.

The fluid pressure in the lower chamber 76 is increased, for example, when the vehicle body 14 and the second lower arm 46 (i.e., the wheel 12) are forced to be displaced toward each other, namely, when the piston 62 is forced to be downwardly displaced relative to the housing 60. When the fluid pressure in the lower chamber 76 is increased, a part of the working fluid in the lower chamber 76 flows into the upper chamber 75 via the variable restrictor 108 of the through-hole 94. When the force acting on the upper valve plates 80, 81 based on the fluid pressure difference becomes equal to or larger than the valve opening value, the leaf valve 86 is switched into its open state whereby the working fluid is made to flow into the upper chamber 75 via the communication passages 78. Further, a part of the working fluid in the lower chamber 76 flows into the buffer chamber 74 via the leaf valve of the base valve body 88. The damping characteristic of the shock absorber 22 is principally dependent on the opening area of the variable restrictor 108. A resistance, which acts on the working fluid flowing through the variable restrictor 108, is increased with reduction of the opening area of the variable restrictor 108, as long as a flow rate of the working fluid is not changed. In the present embodiment, the opening area of the variable restrictor 108 is controlled by controlling the electric motor 90 such that a desired value of damping coefficient is established in an entirety of the shock absorber 22.

The fluid pressure in the upper chamber 75 is increased, for example, when the vehicle body 14 and the second lower arm 46 (i.e., wheel 12) are forced to be displaced away from each other, namely, when the piston 62 is forced to be upwardly displaced relative to the housing 60. When the fluid pressure in the upper chamber 75 is increased, a part of the working fluid in the upper chamber 75 flows into the lower chamber 76 via the variable restrictor 108 of the through-hole 94. When the force acting on the lower valve plate 79 becomes equal to or larger than the valve opening value, the leaf valve 84 is switched into its open state whereby the working fluid is made to flow into the lower chamber 76 via the communication passages 77. Further, a part of the working fluid in the buffer chamber 74 flows into the lower chamber 76 via the leaf valve of the base valve body 88. The damping characteristic is controlled by controlling the opening area of the variable restrictor 108. The damping force is changed by controlling the damping characteristic (damping coefficient) as long as a rate of displacement of the piston 62 or a rate of flow of the working fluid through the variable restrictor 108 is not changed. In this sense, the control of the damping characteristic can be considered to be the same as the control of the damping force.

As shown in FIG. 4, the coil spring 20 is interposed between a lower retainer 110 and an upper retainer 114. The lower retainer 110 is mounted on an intermediate portion of the housing 60 of the shock absorber 22, while the upper retainer 114 is attached to the mount portion 54 through a rubber vibration isolator 112. The housing 60 is supported by the second lower arm 46 while the piston rod 64 is attached through the mount portion 54 to the vehicle body 14, so that the coil spring 20 is disposed in parallel with the shock absorber 22 between the vehicle body 14 and the second lower arm 46. An annular elastic member 116 is mounted on a portion of the piston rod 64, which is located inside the housing 60. The elastic member 116 is to be brought into contact at its upper surface with a lower surface of the cap portion 66 of the housing 60, for thereby limiting displacement of the vehicle body 14 relative to the wheel 12 in a rebound direction, i.e., in a direction that increases a vertical distance between the wheel 12 and the vehicle body 14. Further, the cap portion 66 of the housing 60 is to be brought into contact at its upper surface with a lower surface of the rubber vibration isolator 112, for thereby limiting displacement of the vehicle body 14 relative to the wheel 12 in a bound direction, i.e., in a direction that reduces the vertical distance between the wheel 12 and the vehicle body 14. The elastic member 116 constitutes or the elastic member 116 cooperates with the lower surface of the cap portion 66 to constitute a stopper for limiting the displacement in the rebound direction. The rubber vibration isolator 112 constitutes or the rubber vibration isolator 112 cooperates with the upper surface of the cap portion 66 to constitute a stopper for limiting the displacement in the bound direction.

Figure 6:
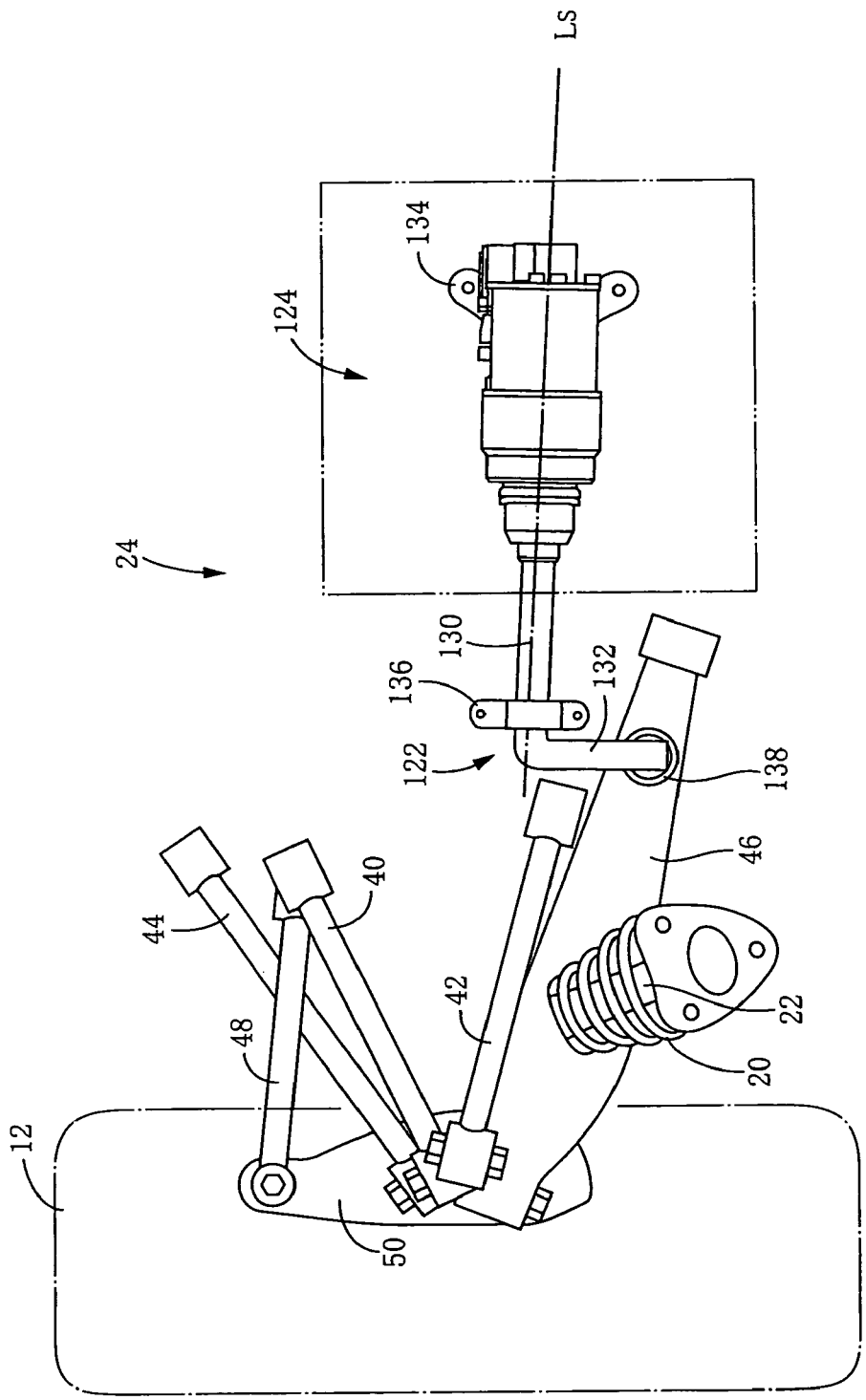
FIG. 6 is a plan view of the vertical force generator included in the suspension.

As shown in FIGS. 3 and 6, the vertical force generator 24 includes an elastic member in the form of a L-shaped bar 122 having a generally L shape as seen in its plan view and a drive source in the form of an actuator 124 configured to rotate the L-shaped bar 122 about an axis Ls. The L-shape bar 122 includes a laterally extending portion in the form of a shaft portion 130 which extends substantially in a width or lateral direction of the vehicle, and a non-parallel portion in the form of an arm portion 132 which is contiguous to the shaft portion 130 and which extends in a direction not parallel to the shaft portion 130, e.g., substantially in a rearward direction of the vehicle. The L-shaped bar 122 is formed of a single bar that is, for example, suitably bent, so that a force can be integrally transmitted through the bar 122. The actuator 124 is attached at its attached portion 134 to the vehicle body 14. The shaft portion 130 of the L-shaped bar 122 is connected, at one of its opposite end portions which is remote from the arm portion 132, to the actuator 124, whereby the L-shaped bar 122 is held by the vehicle body 14. The shaft portion 130 is held, at the other end portion which is close to the arm portion 132, by a retainer 136 that is fixed to the vehicle body 14, such that the shaft portion 130 is rotatable about the axis Ls. Meanwhile, the arm portion 132 is connected, at one of its opposite end portions which is remote from the shaft portion 130, to the second lower arm 46 via a link rod 137. A link-rod connection portion 138 is provided on the second lower arm 46, so that the link rod 137 is rockably connected at its opposite end portions to the link-rod connecting portion 138 and the arm portion 132 of the L-shaped bar 122, respectively.

Figure 7:
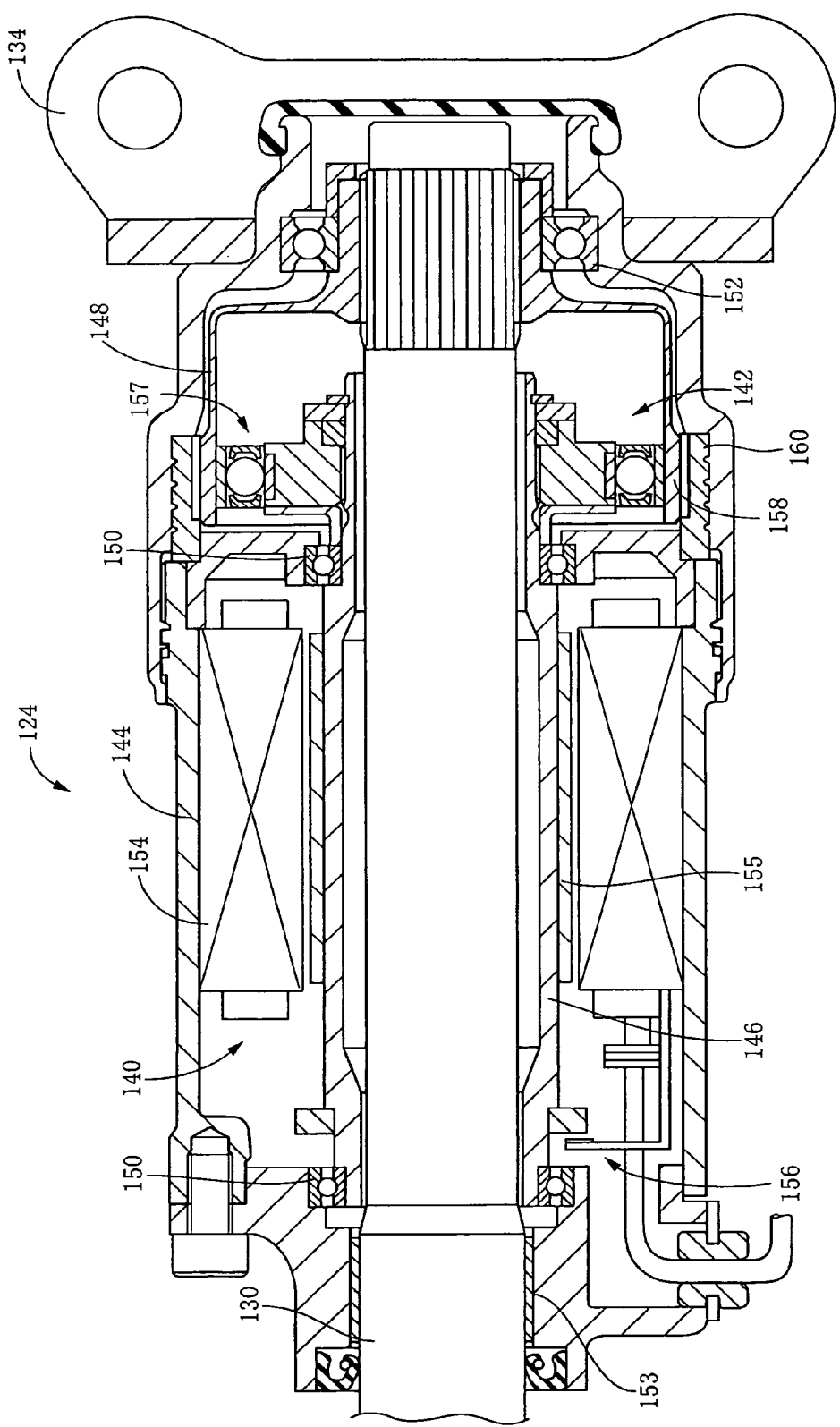
FIG. 7 is a cross sectional view of an actuator of the vertical force generator.

As shown in FIG. 7, the actuator 124 of the vertical force generator 24 includes an electric motor 140 and a speed reducer 142. The shaft portion 130 of the L-shaped bar 122 is connected to an output shaft 146 of the electric motor 140 via an output shaft 148 of the speed reducer 142, so that the rotation of the electric motor 140 is transmitted to the shaft portion 130 while a speed of the rotation is reduced. The electric motor 140 and the speed reducer 142 are arranged in series with each other within a housing 144. The output shaft 146 of the electric motor 140 and the output shaft 148 of the speed reducer 142 are held by the housing 144 via respective bearings 150, 152, so as to be rotatable relative to the housing 144. The shaft portion 130 is introduced in the output shafts 146, 148 each provided by a hollow member, and is held by the housing 144 through a bearing bushing 153 so as to be rotatable relative to the housing 144. The electric motor 140 is provided by a three-phase DC brushless motor, and includes, in addition to the output shaft 146, a plurality of coils 154 that are disposed on an inner surface of the housing 144 and a plurality of permanent magnets 155 disposed on or embedded in an outer circumferential surface of the output shaft 146. A rotational angle sensor 156 is provided in the housing 144, so as to detect a rotational angle of the output shaft 146, i.e., a rotational angle (angular position) of the electric motor 140. The speed reducer 142 is provided by a harmonic gear set, and includes a wave generator 157, a flexible gear (flexspline) 158 and a ring gear (circular spline) 160. The wave generator 157 includes an elliptic cam and a ball bearing fitted on an outer circumferential surface of the elliptic cam, and is fixed to an end portion of the motor output shaft 146. The flexible gear 158 is provided by a cup-shaped member having a circumferential-wall portion that is elastically deformable, and a plurality of teeth (e.g., a total of 400 teeth in the present embodiment) formed on its outer circumferential surface. The shaft portion 130 of the L-shaped bar 122 is fitted in a hole that is formed through a bottom wall portion of the cup-shaped flexible gear 156, so as to be rotatable together with the flexible gear 156. The ring gear 160 is provided by a generally ring-shaped member fixed to the housing 144, and has a plurality of teeth (e.g., a total of 402 teeth in the present embodiment) formed on its inner circumferential surface. The flexible gear 158 is fitted at its circumferential wall portion on the wave generator 157, and is elastically deformed to have an elliptic shape. The flexible gear 158 meshes, at two portions thereof that lie substantially on a long axis of the elliptic shape, with the ring gear 160, while not meshing at the other portions thereof with the ring gear 160.

In the speed reducer 142 constructed as described above, while the wave generator 157 is rotated by one rotation (by 360°), namely, while the output shaft 146 of the electric motor 140 is rotated by one rotation, the flexible gear 158 and the ring gear 160 are rotated relative to each other by an amount corresponding to two teeth, i.e., a difference therebetween with respect to the number of teeth, so that the speed reducer 142 has a speed reduction ratio of 1/200. In the present embodiment, the output shaft 148 of the speed reducer 142 is constituted by a portion of the flexible gear 158 which is rotatable together with the shaft portion 130 of the L-shaped bar 122. Since the speed reduction ratio of the speed reducer 142 (i.e., a ratio of an actuation amount of the actuator 124 to a motion amount of the electric motor 140) is 1/200, which is relatively low, a rotational speed of the output shaft 148 of the speed reducer 142 is considerably low relative to a rotational speed of the electric motor 140, thereby resulting in a large length of response delay time of the actuator 124, i.e., a large length of time from output of a control command value until initiation of application of torque to the shaft portion 130.

There will be described an efficiency of the actuator 124, which is categorized into a positive efficiency and a negative efficiency. The positive efficiency $\eta_P$ corresponds to a parameter representing an amount of the motor force minimally required to cause the shaft portion 130 of the L-shaped bar 122 to be rotated against an external force acting on the actuator 124. More specifically, the positive efficiency $\eta_P$ is defined as a ratio of an amount of the external force, to the amount of the motor force minimally required to cause the rotation of the shaft portion 130. On the other hand, the negative efficiency $\eta_N$ corresponds to a parameter representing an amount of the motor force minimally required to inhibit the rotation of the actuator 124 that could be caused by the external force acting on the actuator 124. More specifically, the negative efficiency $\eta_N$ is defined as a ratio of the amount of the motor force minimally required to inhibit the rotation of the actuator 124 caused by the external force, to an amount of the external force. The positive efficiency $\eta_P$ and the negative efficiency $\eta_N$ can be expressed by respective expressions as follows:

Positive efficiency $\eta_P = Fa/Fm$

Negative efficiency $\eta_N = Fm/Fa$

In the above expressions, "Fa" represents an actuator force, i.e., the external force applied to the actuator 124, and can be considered as an actuator torque. Meanwhile, "Fm" represents the motor force-generated by the motor 140, and can be considered as a motor torque.

For producing the same amount of the actuator force Fa, the motor force amount $Fm_P$ of the motor 140 required under the positive efficiency characteristic is different from the motor force amount $Fm_N$ of the motor 70 required under the negative efficiency characteristic ($Fm_P > Fm_N$). Further, a positive/negative efficiency product $\eta_P \cdot \eta_N$, which is defined as a product of the positive efficiency $\eta_P$ and the negative efficiency $\eta_N$, can be considered as a ratio ($Fm_N/Fm_P$) of an amount of the motor force minimally required to inhibit an actuation of the actuator caused by a certain amount of the external force, to an amount of the motor force minimally required to cause the actuation of the actuator against the certain amount of the external force. Therefore, a low value of the positive/negative efficiency product $\eta_P \cdot \eta_N$ indicates that a low ratio of the motor force amount $Fm_N$ required under the negative efficiency characteristic to the motor force amount $Fm_P$ required under the positive efficiency characteristic. That is, a low value of the positive/negative efficiency product $\eta_P \cdot \eta_N$ indicates that the actuator is hard to be actuated by the external force. In the present embodiment in which the positive/negative efficiency product $\eta_P \cdot \eta_N$ is low, there is a technical advantage that a force applied to the L-shaped bar 122 can be held even by supply of a small amount of electric current to the motor 140.

As described above, between the second lower arm 46 as a part of the unsprung portion and the vehicle body 14 as the sprung portion, the coil spring 20, shock absorber 22 and L-shaped bar 122 as the elastic member are disposed in parallel with each other. Therefore, a load applied to the wheel 12 is received by cooperation of the coil spring 20, shock absorber 22 and L-shaped bar 122. However, in a state in which the electric current is not being supplied to the electric motor 140, the load is received by the coil spring 20 and the shock absorber 22, since no force is not being applied to the L-shaped bar 122 without the electric current being supplied to the motor 140. In the present embodiment, the electric motor 140 is in a reference angular position (the actuator 124 is placed in a reference state) in this state. Since the load is received mainly by the coil spring 20 in this state, it will be described that the load is received by the coli spring 20 in the following description.

When the electric motor 140 is driven from the reference angular position, a torque is applied to the shaft portion 130 of the L-shaped bar 122, and the arm portion of the L-shaped bar 122 is pivoted whereby the shaft portion 130 is twisted. It is noted that there is a one-to-one relationship between the rotational angle of the electric motor 140 and the rotational angle of the actuator 124. It is further noted that the control command value represents a deviation of an actual rotational angle of the motor 140 from a target rotational angle of the motor 140.

Figure 8A:
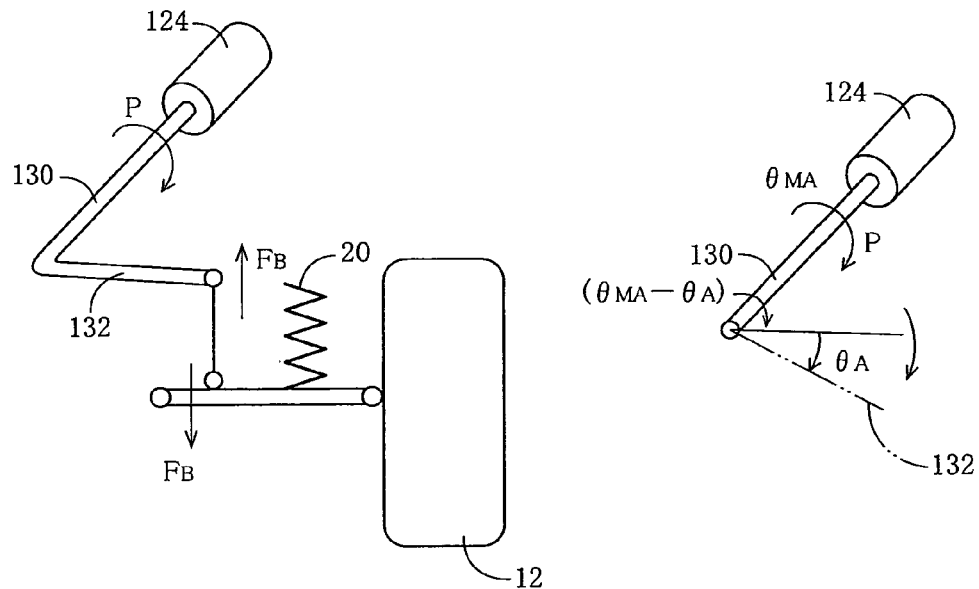
FIGS. 8A and 8B are views showing activation of the vertical force generator.

As shown in FIG. 8A, when the actuator 124 is rotated by an angle $\theta_{MA}$ in a direction P, the arm portion 132 is pivoted by an angle $\theta_A$ in the direction P whereby a vertical distance between the sprung and unsprung portions is increased. That is, when the arm portion 132 is pivoted by the pivot angle $\theta_A$ in the direction P, the vertical distance between the sprung and unsprung portions is increased by an amount corresponding to the angle $\theta_A$ (sin $\theta_A$), and an elastic force generated by the coil spring 20 is reduced by an amount corresponding to the increase of the vertical distance. In this instance, the shaft portion 130 is twisted by an angle ($\theta_{MA}-\theta_A$) that is obtained by subtracting the pivot angle $\theta_A$ of the arm portion 132 from the rotational angle $\theta_{MA}$ of the actuator 124. Since a torsional moment $T_M$ (i.e., a torque applied by the actuator 124) applied to the shaft portion 130 is equal to a bending moment acting on the arm portion 132, the torsional moment $T_M$ can be expressed by the following expression:

$$T_M = F_B \cdot L \qquad (1)$$

In the above expression, "L" represents a length of the arm portion 132, and "$F_B$" represents a force applied to the arm portion 132, i.e., a reaction force against a force applied to the second lower arm 46, so that "$F_B \cdot L$" represents the bending moment acting on the arm portion 132. The force applied to the second lower arm 46 is a downward force that acts in a direction containing a component of a downward direction. Meanwhile, the torsional moment $T_M$ of the shaft portion 130 is expressed by the following expression:

$$T_M = G_S \cdot I_P \cdot (\theta_{MA} - \theta_A) \qquad (2)$$

In the above expression, "$G_S$" represents a shearing modulus, and "$I_P$" represents polar moment of inertia of area. From the above expressions (1), (2), there is established the following expression:

$$F_B = G_S \cdot I_P (\theta_{MA} - \theta_A)/L \qquad (3)$$

The expression (3) indicates that the force $F_B$ applied to the second lower arm 46 (corresponding to a vertical force and a force applied to the arm portion 132) is proportional in amount to the twisted angle ($\theta_{MA}-\theta_A$). Further, there is a predetermined relationship between the rotational angle $\theta_{MA}$ of the actuator 124 and the pivot angle $\theta_A$ of the arm portion 132 (i.e., amount of change of a vehicle height).

As described above, the amount of change of the distance between the sprung and unsprung portions and the force $F_B$ applied to the second lower arm 46 are determined by determining the rotational angle $\theta_{MA}$ of the actuator 124 (or the electric motor 140). In the present embodiment, the rotational angle $\theta_M$ of the electric motor 140 is controlled such that the vertical force applied to the second lower arm 46 by the L-shaped bar 122 becomes equal to a desired amount. It is not necessary to take account of bending of the shaft portion 130, since the shaft portion 130 is held at its portion close to the arm portion 132 by the vehicle body 14, as described above. Further, in the present embodiment in which the elastic member is provided by the L-shaped bar 122, the actuator 124 can be provided in a portion of the vehicle body 14 which is more distant from the wheel 12, than in an arrangement in which the elastic member is provided by a straight rod. This is effective to increase a degree of freedom in designing a portion in the vicinity of the wheel 12.

Figure 8B:
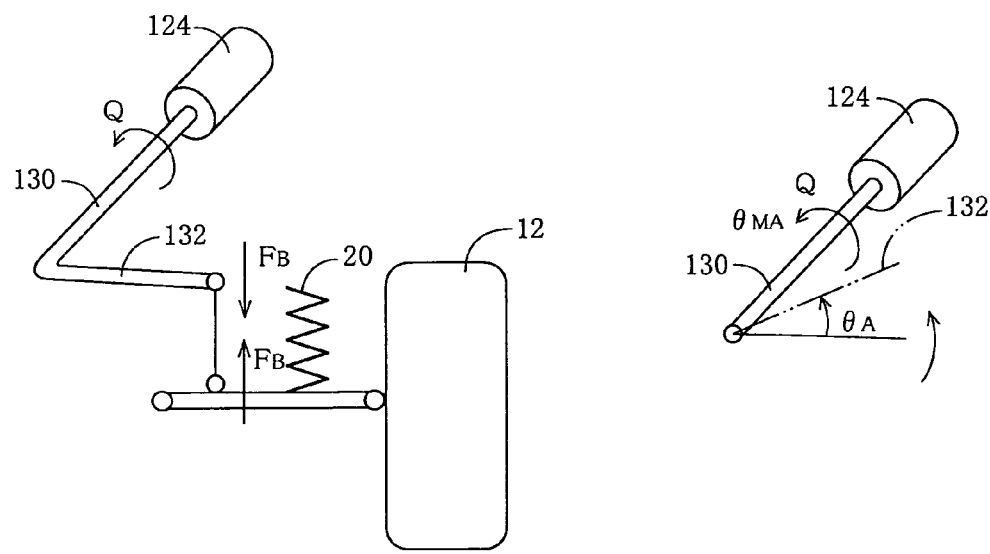

As shown in FIG. 8B, when the actuator 124 is rotated by the angle $\theta_{MA}$ in a direction Q, the arm portion 132 is pivoted by the angle $\theta_A$ in the direction Q whereby the vertical distance between the sprung and unsprung portions is reduced, so that the elastic force generated by the coil spring 20 is increased. The shaft portion 130 is twisted by the angle ($\theta_{MA}-\theta_A$) in the direction Q, and the vertical force applied to the second lower arm 46 acts in a direction that reduces the distance between the sprung and unsprung portions. Thus, the force applied to the second lower arm 46 by the L-shaped bar 122 acts in the direction that is opposite to a direction in which the force applied to the second lower arm 46 by the coil spring 20 acts. In this instance, too, the vertical force applied to the second lower arm 46 can be controlled by controlling the rotational angle $\theta_M$ of the electric motor 140. As is apparent from FIGS. 8A and 8B, the direction of the vertical force is dependent on the direction of rotation of the electric motor 140, and the amount of the vertical force and the distance between the sprung and unsprung portions (or the amount of change of the distance between the sprung and unsprung portions) are dependent on a value (hereinafter referred to as "absolute value" where appropriate) of the rotational angle $\theta_M$ of the electric motor 140. It is noted that, in FIGS. 8A and 8B, posture of the L-shaped bar 122 is illustrated in a manner that facilitates understanding of relationship among the rotation of the electric motor 140, pivot movement of the arm portion 132 and pivot movement of the second lower arm 46 so that the illustrated posture is different from a real posture of the L-shaped bar.

Figure 11:
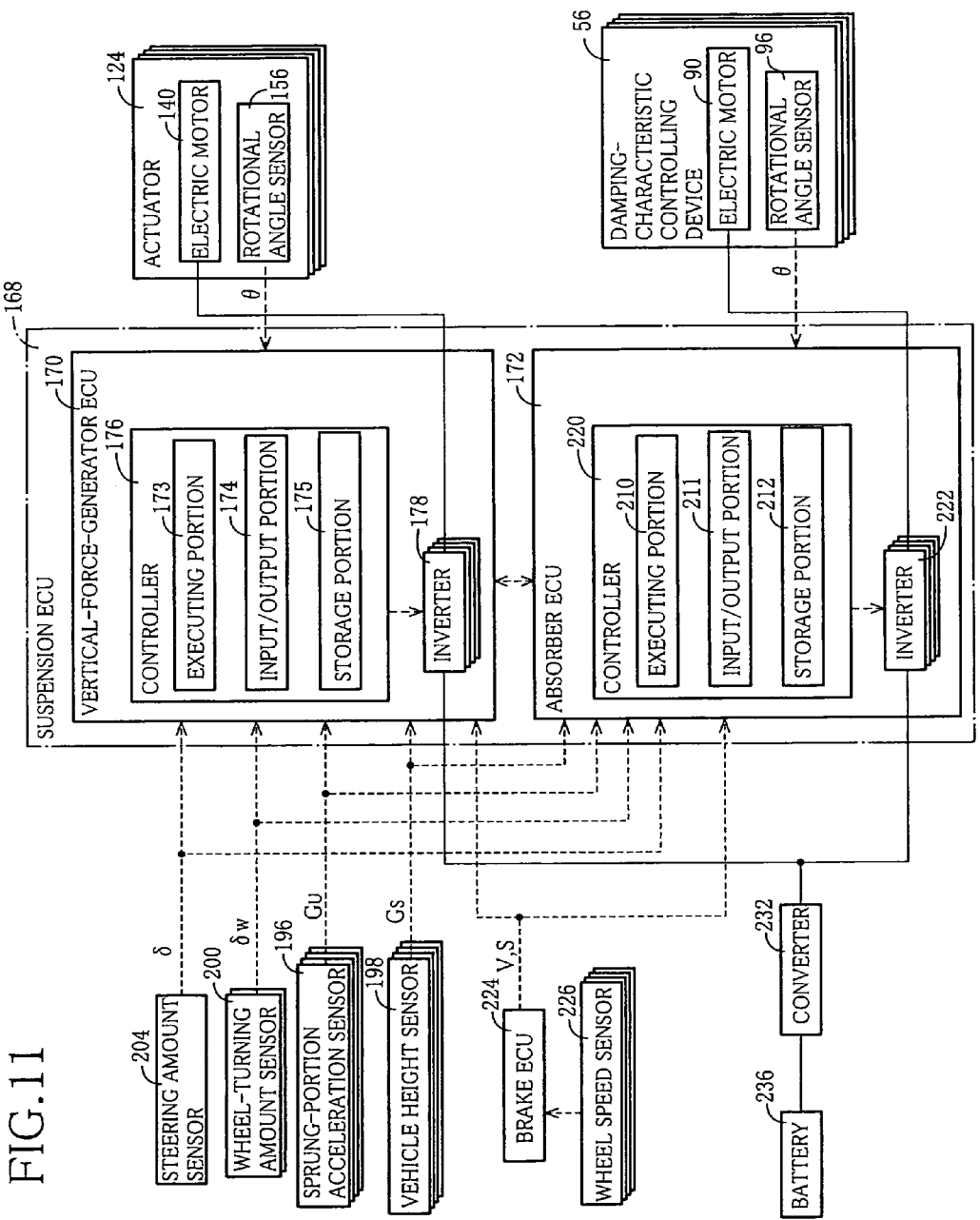
FIG. 11 is a block diagram showing various functional portions of a suspension control unit and other elements included in the suspension system.

In the present embodiment, at least the shock absorber 22 and the vertical force generator 24 are controlled by the suspension control unit 168 as shown in FIG. 11. The suspension control unit 168 includes a vertical-force-generator control unit (ECU) 170 and an absorber control unit (ECU) 172. The vertical-force-generator control unit 170 is configured to control the vertical force applied to the second lower arm 46 by the L-shaped bar 122. The absorber control unit 172 is configured to control the damping force generated by the shock absorber 22. The vertical-force-generator control unit 170 includes a controller 176 and inverters 178 as drive circuits. The controller 176 is constituted principally by a computer including an executing portion 173, an input/output portion 174 and a storage portion 175. To the input/output portion 174, there are connected the inverters 178, angular position sensors 156, sprung-portion acceleration sensors 196, vehicle height sensors 198, wheel-turning amount sensors 200 and an operating-amount sensor 204 that is configured to detect an operating amount of a steering operation member, i.e., a steering angle of a steering wheel (not shown). The wheel-turning amount sensors 200 are provided for respective front right and left wheels (steerable wheels) 12FR, 12FL, such that a turning amount of each of the front right and left wheels 12FR, 12FL is detected by a corresponding one of the wheel-turning amount sensors 200. The sprung-portion acceleration sensors 196 are provided for the respective mount portions 54 which correspond to the respective four wheels 144, such that a vertical acceleration of each of portions of the vehicle body 14 is detected by a corresponding one of the sprung-portion acceleration sensors 196. Each of the vehicle height sensors 198 is provided for detecting a vertical displacement of a corresponding one of the portions of the vehicle body 14 relative to a corresponding one of the second lower arms 46, i.e., the distance between the corresponding portion of the vehicle body 14 as the sprung portion and the corresponding one of the second lower arms 45 as the unsprung portion. The storage portion 175 stores therein, for example, a plurality of tables and programs.

Similarly, the absorber control unit 172 includes a controller 220 and inverters 222 as drive circuits. The controller 220 is constituted principally by a computer including an executing portion 210, an input/output portion 211 and a storage portion 212. To the input/output portion 211, there are connected the inverter 222, sprung-portion acceleration sensors 196, vehicle height sensors 198, wheel-turning amount sensors 200, operating-amount sensor 204 and angular position sensors 96. A brake control unit 224 also includes a controller constituted principally by a computer. To the brake control unit 224, there are connected wheel speed sensors 226 each configured to detect a rotational speed of a corresponding one of the wheels 12FR, 12FL, 12RR, 12RL, for thereby obtaining a running speed and a slipping state of the vehicle, based on detected values detected by the respective wheel speed sensors 226. The vertical-force-generator control unit 170, absorber control unit 172 and brake control unit 224 are connected to each other via CAN (Car Area Network), so that information obtained by the brake control unit 224 and representing the vehicle running speed and slipping states of the respective wheels 12FR, 12FL, 12RR, 12RL is supplied to the vertical-force-generator control unit 170 and absorber control unit 172.

In the present embodiment, the controller 176 of the vertical-force-generator control unit 170 and the controller 220 of the absorber control unit 172 are common to the four wheels 12 (four inverters 178 or inverters 222). However, the controllers 176, 220 may be provided for each wheel 12 (each inverter 178 or inverter 222).

Figure 9:
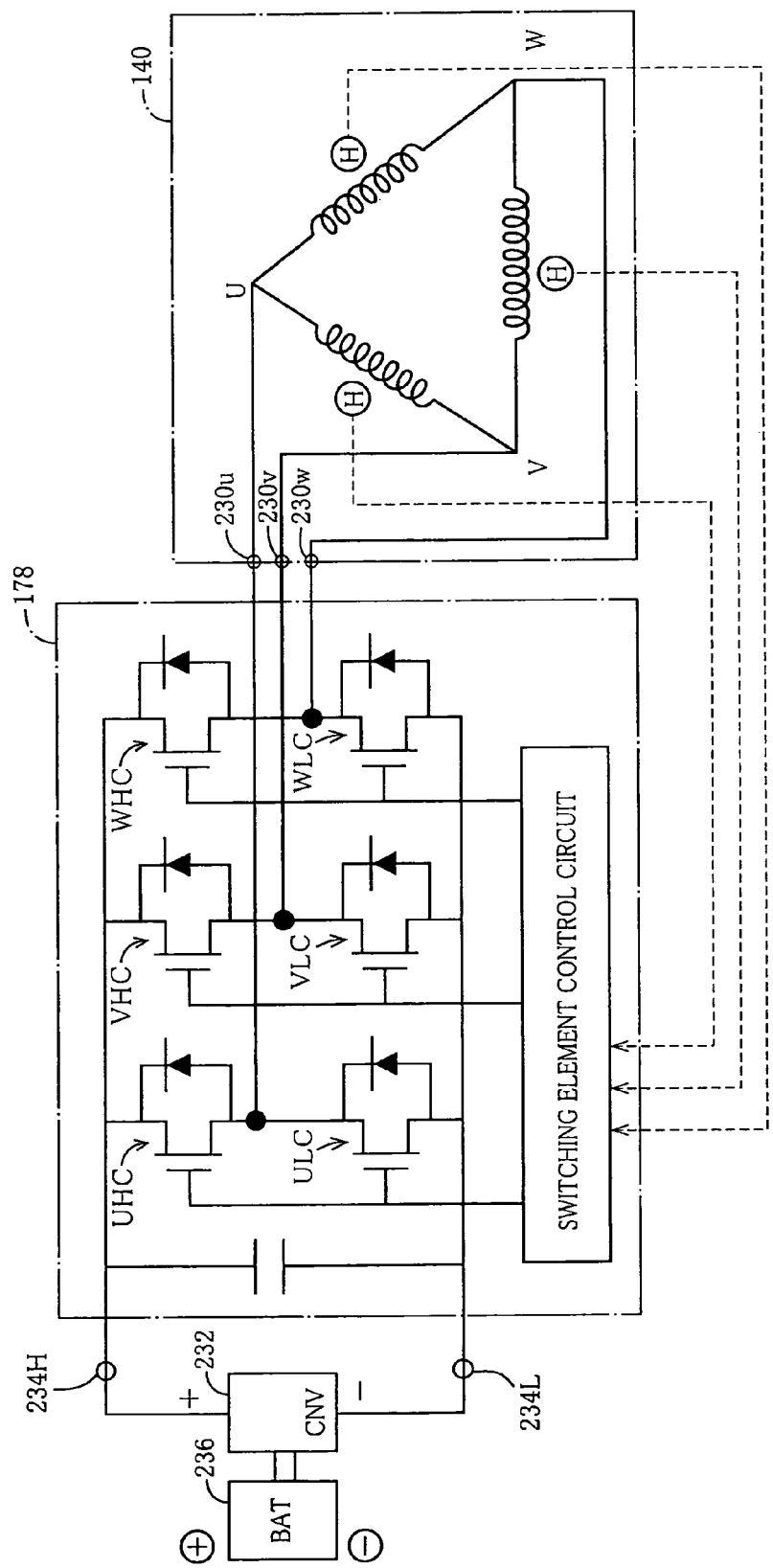
FIG. 9 is a circuit diagram of an inverter for controlling an electric motor of the actuator.

As shown in FIG. 9, the electric motor 140 is a three-phase delta-connected DC brushless motor, and has terminals 230u, 230v, 230w (hereinafter generally referred to as "terminals 230" where appropriate) that correspond to respective phases (U, V, W). The inverter 178 has a total of six switching elements UHC, ULC, VHC, VLC, WHC, WLC that are disposed between the electric motor 140 and a power source. The switching element UHC is disposed between a high-level voltage terminal 234H of the power source and the terminal 230u, such that the high-level voltage terminal 234H and the terminal 230u are selectively connected to and disconnected from each other by operation of the switching element UHC. The switching element ULC is disposed between a low-level voltage terminal 234L of the power source and the terminal 230u, such that the low-level voltage terminal 234L and the terminal 230u are selectively connected to and disconnected from each other by operation of the switching element ULC. The switching element VHC is disposed between the high-level voltage terminal 234H and the terminal 230v, such that the high-level voltage terminal 234H and the terminal 230v are selectively connected to and disconnected from each other by operation of the switching element VHC. The switching element VLC is disposed between the low-level voltage terminal 234L and the terminal 230v, such that the low-level voltage terminal 234L and the terminal 230v are selectively connected to and disconnected from each other by operation of the switching element VLC. The switching element WHC is disposed between the high-level voltage terminal 234H and the terminal 230w, such that the high-level voltage terminal 234H and the terminal 230w are selectively connected to and disconnected from each other by operation of the switching element WHC. The switching element WLC is disposed between the low-level voltage terminal 234L and the terminal 230w, such that the low-level voltage terminal 234L and the terminal 230w are selectively connected to and disconnected from each other by operation of the switching element WLC. A switching element control circuit of the inverter 178 is operable to determine the angular position (electrical angle) of the electric motor 140 based on signals detected by respective three Hall elements $H_A$, $H_B$, $H_C$ (each indicated by reference "H" in FIG. 9) provided in the electric motor 140, and to control the switching elements UHC, ULC, VHC, VLC, WHC, WLC such that each switching element is placed in one of ON and OFF states that is selected based on the determined angular position of the electric motor 140. It is noted that the inverter 178 is connected to a battery 236 via a converter 232 that is cooperates with the battery 236 to constitute the power source.

Since each of the electric motors 140 is driven by a constant voltage that is controlled by the converter 232, an amount of electric power supplied to each electric motor 140 is changed by changing an amount of electric current supplied to each electric motor 140. That is, the motor force generated by each electric motor 140 is dependent on the amount of the supplied electric current, which can be changed by a PWM (pulse width modulation) control performed by the corresponding inverter 178. In the PWM control, each inverter 178 suitably controls a duty ratio, i.e., a ratio of pulse ON time to a sum of the pulse ON time and pulse OFF time. The electric motor 140 is placed in a selected one of a plurality of operational modes, and the selected operational mode of the electric motor 140 is changed by controlling an operational state of the inverter 178. In the present embodiment, the plurality of operational modes of the electric motor 140 consists of a controlled-power supplying mode, a standby mode, a braking mode and a free mode. In the controlled-power supplying mode, the electric power is supplied to the electric motor 140 from the battery 236. In each of the standby mode, braking mode and free mode, the electric power is not supplied to the electric motor 140.

In this controlled-power supplying mode, the ON/OFF state of each of the switching elements UHC, ULC, VHC, VLC, WHC, WLC is changed based on the detected angular position of the electric motor 140 in a so-called 120° rectangular-wave drive system, as shown in FIGS. 9 and 10. In the present embodiment, only the three switching elements ULC, VLC, WLC (that are connected to the low-level voltage terminal 234L of the power source) are subjected to a duty-ratio control, and the amount of electric current supplied to the electric motor 140 is changed by changing the duty ratio. In FIG. 10, "1*" indicates that the switching element in question is subjected to the duty-ratio control. It is noted that combination of selected operational states of the switching elements varies depending on which one of opposite directions the electric motor 140 is rotated in. In FIG. 10, one of the opposite directions is referred to as "CW DIRECTION" while the other of the opposite directions is referred to as "CCW DIRECTION", for convenience of the description. Thus, in the controlled-power supplying mode, the electric power supplied to the motor 140 is controlled whereby a direction and an amount of the torque are controlled.

In the standby mode, the electric power is not supplied from the battery 236 to the electric motor 140 even when the ON/OFF state of each switching element is changed. The ON/OFF state of each of the switching elements UHC, VHC, WHC (that are connected to the high-level voltage terminal 234H of the power source) is changed like in the controlled-power supplying mode. However, unlike in the controlled-power supplying mode, any one of the three switching elements ULC, VLC, WLC (that are connected to the low-level voltage terminal 234L of the power source) is not subjected to the duty-ratio control. In other words, each of the three switching elements ULC, VLC, WLC is subjected to the duty-ratio control, such that the duty ratio is held 0 (zero). That is, each of the three switching elements ULC, VLC, WLC is practically held in the OFF state (open state) due to absence of pulse ON time, so that the electric power is not supplied to the electric motor 140 in this standby mode. In FIG. 10, "0*" indicates that the switching element in question is placed in the state with the duty ratio of 0 (zero). Thus, in this standby mode, since only one of the switching elements UHC, VHC, WHC is placed in the ON state (closed state), there is established an electric continuity between the high-level voltage terminal 234H of the power source and one of the three terminals 230 of the electric motor 140. This standby mode, in which the ON/OFF state of each switching element is thus changed, can be considered as a kind of specific-motor-terminal/power-supply-terminal connecting mode. It is noted that combination of selected operational states of the switching elements varies in the standby mode, too, depending on the direction of rotation of the electric motor 140, namely, depending on whether the electric motor 140 is rotated in the CW direction or CCW direction.

The braking mode, in which the terminals 122*u*, 122*v*, 122*w* of the electric motor 70 are electrically connected to one another by predetermined ON/OFF states of the switching elements, can be considered as a kind of motor-terminals interconnecting mode. In this braking mode, three of the switching elements which are connected to the one of the high-level and low-level voltage terminals 234H, 234L are all held in the ON states while three of the switching elements which are connected to the other of the high-level and low-level voltage terminals 234H, 234L are all held in the OFF states. In the present embodiment, the switching elements UHC, VHC, WHC (that are connected to the high-level voltage terminal 234H of the power source) are all held in the ON states while the switching elements ULC, VLC, WLC (that are connected to the low-level voltage terminal 234L of the power source) are all held in the OFF states. Owing to the switching elements UHC, VHC, WHC held in the ON states, the electric motor 140 is placed in a state in which as if the phases of the electric motor 140 were short-circuited to one another. In this state, the rotation of the electric motor 140 is braked by the short circuit.

In the free mode, the switching elements UHC, VHC, WHC, ULC, VLC, WLC are all held in the OFF states so that the electric motor 140 is placed in a free state.

The activation of the electric motor 140 (actuator 124) is controlled by changing the ON/OFF state of each switching element of the inverter 178, as described above, whereby the vertical force $F_B$ applied to the second lower arm 46 as a part of the unsprung portion is controlled by the L-shaped bar 122. In the present embodiment, the vertical force $F_B$ is controlled such that the direction of the vertical force $F_B$ is opposite to the direction of vertical displacement of the second lower arm 46 and such that the amount of the vertical force $F_B$ corresponds to an absolute velocity of the second lower arm 46. Thus, the vertical force $F_B$ is controlled to act as a damping force. The direction of the vertical force $F_B$ is dependent on a direction in which the electric motor 140 has been rotated from its reference angular position. The amount of the vertical force $F_B$ is dependent on an amount of the rotation of the electric motor 140 from its reference angular position. Since there is a predetermined relationship between the rotational angle $\theta_M$ of the motor 140 and the vertical force $F_B$, as described above, it is possible to determine a target rotational angle $\theta_M^*$ (that represents both target rotational direction and amount) based on the predetermined relationship such that the vertical force $F_B$ acts in a desired direction by a desired amount.

An amount of the electric current supplied to the motor 140 corresponds to a deviation $\Delta\theta$ ($=\theta_M^*-\theta$) of the actual rotational angle $\theta$ from the target rotational angle $\theta_M^*$. In the present embodiment, PI control is performed, and the amount of the supplied electric current is determined according to the following expression:

$$i = K_P \cdot \Delta\theta + K_I \cdot Int(\Delta\theta)$$

In the above expression, "$K_P$", "$K_I$" represent proportional and integral gains, respectively, and "$Int(\Delta\theta)$" represents an integral value of the rotational angle deviation $\Delta\theta$. When the absolute value of the rotational angle deviation $\Delta\theta$ is large, the supplied electric current i is made large for causing the actual rotational angle $\theta_M$ to rapidly become close to the target rotational angle $\theta_M^*$.

In the present embodiment, when an absolute value of a target value $F_B^*$ of the vertical force is to be increased, the duty ratio for energizing the electric motor 140 is determined based on an amount (absolute value) of the supplied electric current i. A sign (indicative of positive or negative) of the supplied electric current i represents a direction in which the motor 140 is to be rotated or a direction in which the torque of the motor 140 is to act. When the inverter 178 receives the control command value representing the duty ratio and the rotation direction, each of the switching elements is controlled in accordance with the control command value in the inverter 178. In this case, the supplied electric current i* corresponds to the control command value. On the other hand, when the absolute value of the target value $F_B^*$ of the vertical force is to be held unchanged or reduced, there is outputted a control command value indicating switching of the operational state of the electric motor 140 into the braking mode or free mode, rather than the control command value indicating the duty ratio or rotational direction.

In the present embodiment, the supplied electric current i is determined according to the PI control rule. However, the electric current i can be determined according to PID control rule, too. The determination according to PID control rule is made with the following expression:

$$i = K_P \cdot \Delta\theta + K_I \cdot Int(\Delta\theta) + K_D \Delta\theta'$$

In a right side of the above expression, "$K_D$" represents a derivative gain, and the third term represents a derivative term component.

In the present embodiment, the vertical force generator 24F provided for each front wheel is subjected to an ordinary control. Meanwhile, the vertical force generator 24R provided for each rear wheel is mainly subjected to a preview control. However, there is a case in which the vertical force generator 24R is subjected to the ordinary control when the vertical vibration cannot be effectively suppressed by the preview control. The ordinary control is a control that is performed to control the vertical force that is to be generated by the vertical force generator 24 provided for each wheel, based on the vertical behavior of the same wheel which is detected by the sensors 196, 198. The ordinary control can be referred also to as an ordinary suspension control. In the following description, a term "controlled wheel" is used to refer to the wheel for which the controlled vertical force generator 24 (whose vertical force is to be controlled in the ordinary or preview control) is provided, and a term "detected wheel" is used to refer to the wheel whose vertical behavior is to be detected in the ordinary or preview control.

In the ordinary control, an absolute velocity $V_L$ of the second lower arm 46 (hereinafter referred to as unsprung-portion absolute velocity) provided for the controlled wheel 12$ij$ (that is also the detected wheel) is obtained, and the vertical force generator 24$ij$ (that is provided for the same wheel 12$ij$) is controlled to generate the damping force that is dependent on the unsprung-portion absolute velocity $V_L$. In this instance, an absolute velocity $V_U$ of the vehicle body 14 (hereinafter referred to as a sprung-portion absolute velocity) is obtained as an integral of a detected value $G_U$, which is detected by the sprung-portion acceleration sensor 196 provided in a portion of the vehicle body 14 which corresponds to the controlled wheel 12$ij$, with respect to time. Meanwhile, a relative velocity $V_S$ of the above-described portion of the vehicle body 14 and one of the second lower arms 46 which is provided for the controlled wheel 12$ij$ (i.e., a rate of change of distance between the sprung and unsprung portions) is obtained as a derivative of a detected value, which is detected by the vehicle height sensor 198 provided in the above-described portion of the vehicle body 14, with respect to time. The unsprung-portion absolute velocity $V_L$ is obtained by subtracting the relative velocity $V_S$ of the sprung and unsprung portions, from the sprung-portion absolute velocity $V_U$, as expressed in the following expression:

$$V_L = V_U - V_S = V_U - (V_U - V_L)$$

The vertical force target value (target damping force) $F_B^*$ is obtained in accordance with the following expression:

$$F_B^* = -G_0 \cdot C \cdot V_L$$

In the above expression, "$G_0$" represents a gain of the ordinary control, which is a predetermined fixed value, "C" represents a damping coefficient, which is a predetermined fixed value, and "$V_L$" represents the unsprung-portion absolute velocity. The sign (−) means that the direction of the target damping force $F_B^*$ is opposite to the direction of the unsprung-portion absolute velocity, so that the target damping force $F_B^*$ is to act in a downward direction when the unsprung-portion absolute velocity is directed in an upward direction. The target rotational angle $\theta_M^*$ of the electric motor 140 is obtained in accordance with the following expression:

$$\theta_M^* = f(F_B^*)$$

In the above expression, "f" represents a predetermined function. As described above, the rotational angle deviation $\Delta\theta$ is obtained from the target rotational angle $\theta_M^*$ and the actual rotational angle $\theta$, and the supplied electric current i is obtained to correspond to the rotational angle deviation $\Delta\theta$, so that the control command value is prepared based on, for example, the supplied electric current i, and is then outputted. In the ordinary control, the control command value is outputted immediately after being prepared.

As described above, the actuator 124 has a poor responsiveness, namely, the length of response delay time of the actuator 124R is large. Therefore, when the actuator 124$ij$ provided for the wheel 12$ij$ is controlled based on the vertical behavior of the same wheel 12$ij$, there is a case in which the vibration cannot be satisfactorily suppressed and a ride comfort is made even worse rather than being made better. It is known, from a simulation or an experiment using a real vehicle, that the vibration can be suppressed even when initiation of the control is delayed relative to the actual vibration by one-eighth (⅛) cycle of the vibration. The response delay time, which is defined as a length of time from output of the control command value until initiation of actual application of torque of the electric motor 140 to the L-shaped bar 122, is dependent on, for example, construction of the actuator 124 and performance of the inverter 178. In the present embodiment, the suspension control is performed by carrying out the ordinary control of the actuator 124 $ij$ even when the control is initiated with a delay relative to the actual vibration if an amount of the delay is not larger than one-eighth (⅛) cycle of the vibration. The vibration, whose one-eighth (⅛) cycle corresponds to the response delay time $T_D$, has a frequency $f_D$ that is expressed by the following expression:

$$f_D = 1/(8 \cdot T_D)$$

Therefore, when the frequency f of the actual vertical vibration of the wheel 12 $ij$ is higher than the frequency $f_D$ (hereinafter referred to as "ordinarily-controllable maximum frequency") (f>$f_D$), the response delay time $T_D$ is longer than the one-eighth (⅛) cycle of the vibration. In this case, the damping force generated by the vertical force generator 24$ij$ is not controlled. On the other hand, when the actual frequency f is not higher than the ordinarily-controllable maximum frequency $f_D$, the response delay time $T_D$ is not longer than the one-eighth (⅛) cycle of the vibration, so that the vibration suppressing effect can be obtained. In this case, therefore, the damping force generated by the vertical force generator 24$ij$ is controlled.

In the preview control, each rear wheel corresponds to the controlled wheel while each front wheel corresponds to the detected wheel, namely, the detected portion detected by the sensors is provided by the front-wheel side portion of the vehicle. Described specifically, the vertical behavior of each of the front wheels 12FR, 12FL is detected, and the vertical force generators 24RR, 24RL provided for the respective rear wheels 12RR, 12RL are controlled such that each of the vertical force generators 24RR, 24RL is controlled based on the detected vertical behavior of a corresponding one of the front wheels 12FR, 12FL, which is located on the same side as the each of the vertical force generators 24RR, 24RL in a width or lateral direction of the vehicle. As shown in FIG. 1, when it is assumed that each of the rear wheels 12RR, 12RL passes over a portion of a road surface over which a corresponding one of the front wheels 12FR, 12FL has passed, each of the rear wheels 12RR, 12RL receives, from the road surface, the same input as applied to a corresponding one of the front wheels 12FR, 12FL, so that each of the rear wheels 12RR, 12RL has the same behavior as a corresponding one of the front wheels 12FR, 12FL, after a certain length of time has elapsed since the corresponding one of the front wheels 12FR, 12FL has had the same behavior. Therefore, where the vertical force generator 24R of the rear wheel 12R is controlled based on the vertical behavior of the second lower arm 46F provided for the front wheel 12F, it is possible to reduce or eliminate the response delay time of the vertical force generator 24R, thereby enabling the vertical vibration of the second lower arm 46R provided for the rear wheel 12R to be satisfactorily suppressed. In the present embodiment, the absolute velocity $V_L$ of the second lower arm 46F provided for the front wheel 12F is obtained, and then the target damping force $F_B^*$ corresponding to the obtained absolute velocity $V_L$ of the second lower arm 46F is obtained so that the control command value is prepared. The vertical force generator 24R is controlled to generate the damping force in accordance with the control command value such that the damping force is generated upon elapse of a predetermined length of time, namely, substantially in synchronization with the vertical behavior of the second lower arm 46R provided for the rear wheel 12R.

The target damping force $F_B{}^*$ is determined based on the unsprung-portion absolute velocity $V_L$ (i.e., absolute velocity $V_L$ of the second lower arm 46), and is obtained in accordance with the following expression:

$$F_B{}^* = -G \cdot C \cdot V_L$$

wherein "G" represents a preview gain used for the preview control.

The target rotational angle $\theta_M{}^*$ is obtained in accordance with the above expression $\theta_M{}^* = f(F_B{}^*)$, as described above. Then, the rotational angle deviation $\Delta\theta$ is obtained from the target rotational angle $\theta_M{}^*$ and the actual rotational angle $\theta$, and the supplied electric current i is obtained to correspond to the rotational angle deviation $\Delta\theta$, so that the control command value is prepared based on the supplied electric current i. The control command value is outputted, in principle, after a waiting time $T_Q$ has elapsed from detection of the vertical behavior of the front-wheel side portion, wherein the waiting time $T_Q$ is a length of time that is obtained by subtracting the response delay time $T_D$ from a previewable time $T_P$, as expressed in the following expression:

$$T_Q = T_P - T_D$$

It is noted that the previewable time $T_P$ is obtained by dividing a wheel base $L_W$ of the vehicle by the running speed V, as expressed in the following expression:

$$T_P = L_W / V$$

The previewable time $T_P$ is a length of time from a point of time at which the front wheel 12F passes over projections and recesses on a portion of the road surface until a point of time at which the rear wheel 12R passes over the projections and recesses on the same portion of the road surface. As shown in an upper one of graphs of FIG. 12A, the previewable time $T_P$ is reduced with increase of the running speed V of the same vehicle (as long as the wheel base $L_W$ is unchanged). When the previewable time $T_P$ is not shorter than the response delay time $T_D$, namely, when the waiting time $T_Q$ is not smaller than 0 (zero), the preview control can be effectively performed. Therefore, as shown in graph (b) of FIG. 12A, the preview gain is set to 1 (one) while the waiting time $T_Q$ is not smaller than 0. The state in which the waiting time $T_Q$ is not smaller than 0 corresponds to the state in which the previewable time $T_P$ is not shorter than the response delay time $T_D$, and corresponds to also the case in which the running speed V is not higher than a value $V_D$ ($=L_W/T_D$) obtained by dividing the wheel base $L_W$ by the response delay time $T_D(V \leq V_D)$. It is noted that the response delay time $T_D$ corresponds to a first threshold length of time.

On the other hand, when the previewable time $T_P$ becomes shorter than the response delay time $T_D$ as a result of increase of the running speed, the control of the vertical force generator 24R for the rear wheel 12R is delayed relative to the vertical behavior of the rear wheel 12R even if the control command value is outputted without the waiting time $T_Q$, so that the vertical vibration of the rear-wheel side portion of the vehicle is not likely to be satisfactorily suppressed and a ride comfort could be made even worse rather than being made better. In view of such a situation, in the present embodiment, when the previewable time $T_P$ becomes shorter than the response delay time $T_D$, the preview gain G is linearly and gradually reduced with increase of the running speed V, as indicated by solid line in the lower graph of FIG. 12A.

Figure 12A:
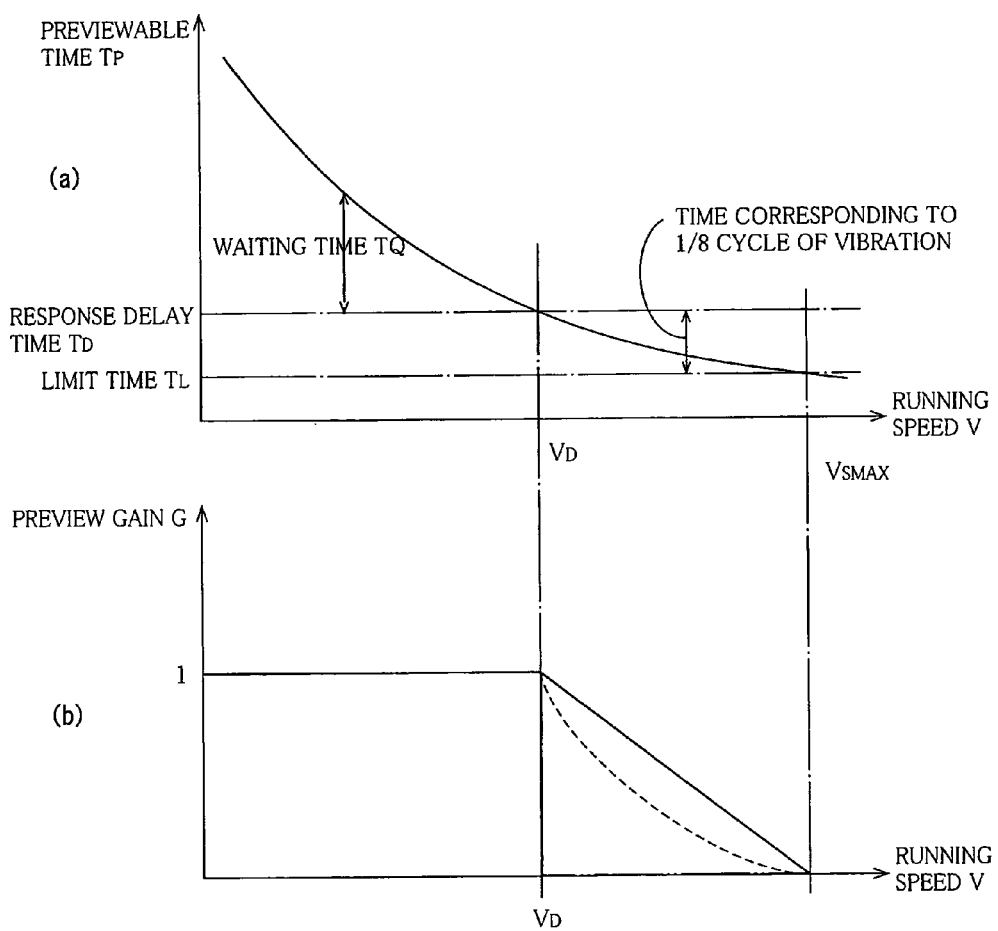
FIG. 12A is a set of graphs wherein the graph (a) shows a relationship between a running speed and a previewable time, and the graph (b) shows a map indicating a running-speed-basis preview-gain determining table that is stored in a storage portion of the suspension control unit.
Figure 12B:
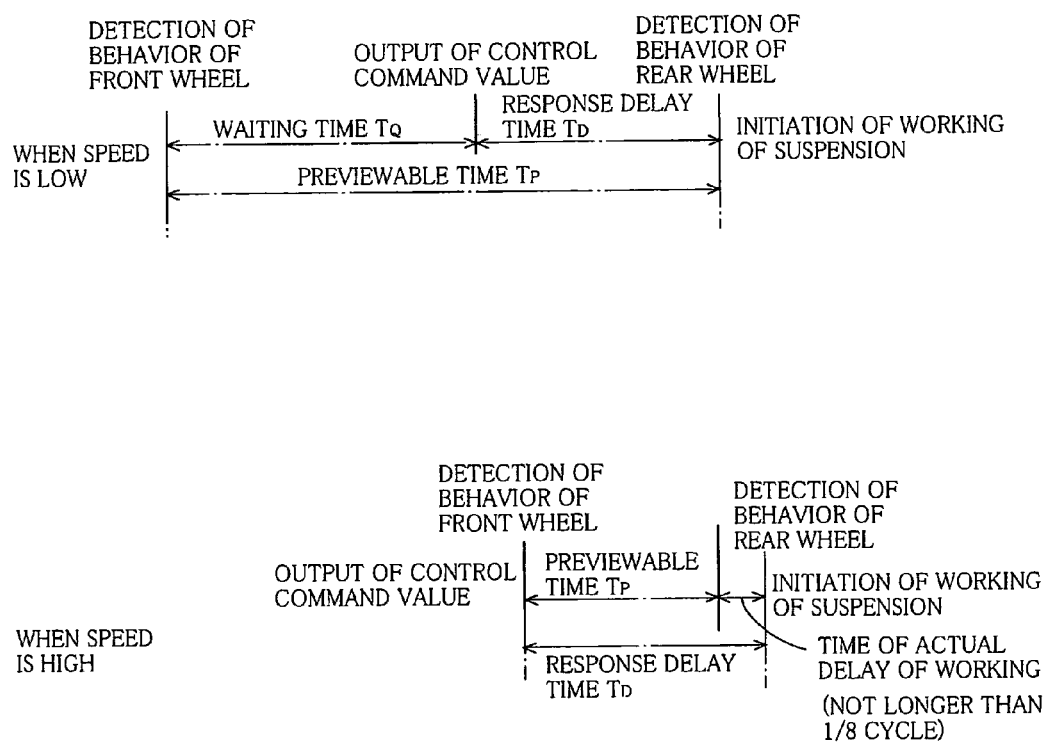
FIG. 12B is a view showing a relationship between the previewable time, response delay time and limit time.

When the previewable time $T_P$ becomes shorter than a limit time $T_L$ ($T_P < T_L$), the preview gain G is set to 0 (zero) so that the preview control is not carried out. As described above, it is known that the control can be effectively performed even if the control is delayed relative to the actual vibration as long as an amount of the delay is not larger than one-eighth (⅛) cycle of the vibration. Based on this fact, the limit time $T_L$ is a value of the previewable time which causes the control to be delayed relative to the actual vertical vibration of the rear wheel 12R by an amount corresponding to the one-eighth (⅛) cycle of the vibration even if the control command value is outputted without the waiting time, as shown in FIGS. 12A and 12B. In other words, the limit time $T_L$ is a length of time that is obtained by subtracting a one-eighth-cycle corresponding time $T_X$ from the response delay time $T_D$. The one-eighth-cycle corresponding time $T_X$ is a length of time corresponding to the one-eighth (⅛) cycle of the vibration, and is represented by [1/(8·N)sec]. In the present embodiment, the limit time $T_L$ corresponds to a second threshold length of time. As long as the response delay time $T_D$ is constant (namely, as long as the actuator 124 is not replaced by another actuator), the one-eighth-cycle corresponding time $T_X$ is increased with reduction of frequency N of the vibration, and is reduced with increase of the frequency N of the vibration. That is, when the frequency N of the vibration is low, the one-eighth-cycle corresponding time $T_X$ is long whereby the limit time $T_L$ is short. When the frequency N of the vibration is high, the one-eighth-cycle corresponding time $T_X$ is short whereby the limit time $T_L$ is long. In the present embodiment, the frequency N is 3 Hz, which is a relatively high frequency in vibration commonly caused in the vehicle and which is a maximum frequency that can be handled by the actuator 124. Consequently, it is possible to determine a maximum value of the limit time $T_L$ as a threshold value that enables the actuator 124 to be handled. Where the maximum frequency that can be handled by the actuator 124 is 3 Hz, the maximum value of the limit time $T_L$ as the threshold value is defined by ($T_D - \frac{1}{24}$). When the previewable time $T_P$ equals to the limit time $T_L$, the running speed V is expressed by $L_W/T_L$ that is a maximum value $V_{SMAX}$. The preview control is not carried out when the actual running speed V becomes higher than the maximum value $V_{SMAX}$. A relationship between the preview gain G and the previewable time $T_P$ is shown in the upper and lower graphs of FIG. 12A, and is stored as a table. It is noted that, in place of the relationship between the preview gain G and the previewable time $T_P$, a relationship between the preview gain G and the running speed V may be stored as the table.

When the previewable time $T_P$ is shorter than the response delay time $T_D$, the preview gain G may be gradually reduced in a curved manner as indicated by broken line in the lower graph of FIG. 12A, or may be zeroed as indicated by two-dot chain line in the lower graph of FIG. 12A. Further, the first threshold length of time does not have to be necessarily equal to the response delay time $T_D$, but may be either longer or shorter than the response delay time $T_D$. When the first threshold length of time is longer than the response delay time $T_D$, the first threshold length of time may be a certain length of time which is obtained by adding a certain value to the response delay time $T_D$, or which is obtained by multiplying the response delay time $T_D$ by a certain value larger than 1 (one). When the first threshold length of time is shorter than the response delay time $T_D$, the threshold length of time may be a certain length of time which is obtained by subtracting a certain value from the response delay time $T_D$, or which is obtained by multiplying the response delay time $T_D$ by a certain value smaller than 1 (one). Further, the vibration frequency may be obtained as needed, so that the second threshold length of time (limit time TL) or the maximum value $V_{SMAX}$ of the running speed for the preview control is determined and the gain is updated each time vibration frequency is obtained. For example, the preview gain G may be obtained in accordance with the following expression:

$$G=V/(V_{SMAX}-V_D)$$

where "V" represents an actual value of the running speed.

Figure 13A:
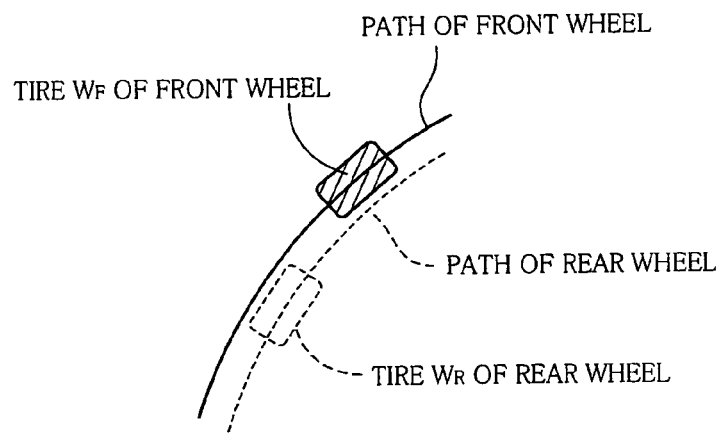
FIG. 13A is a view showing paths of respective wheels of a vehicle during turning of the vehicle.
Figure 13B:
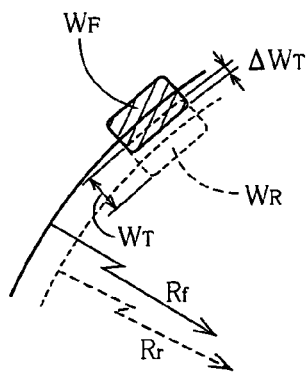
FIG. 13B is a view showing overlap of a portion of a road surface over which a front wheel of the vehicle has passed and a portion of the road surface over which a rear wheel of the vehicle is supposed to pass.

Upon cornering of the vehicle, the rear wheels 12RR, 12RL do not necessarily pass over same portions of the road surface over which the front wheels 12FR, 12FL have passed. When the rear wheels 12RR, 12RL do not at all pass over the same portions of the road surface over which the front wheels 12FR, 12FL have passed, the preview control could not be effectively performed. In the present embodiment, as shown in FIGS. 13A and 13B, an overlap ratio Lap is obtained based on a path difference ΔR and a tire width $W_T$, and then the preview gain G is made smaller when the overlap ratio Lap is small than when the overlap ratio Lap is large. Further, as shown in view (b) of FIG. 16, when the overlap ratio Lap is not larger than 0 (zero), the preview gain G is set to 0 (zero) so that the preview control is not carried out. The overlap ratio Lap is a value ($ΔW_T/W_T$) obtained by dividing an overlap width $ΔW_T$ by the tire width $W_T$. The overlap width $ΔW_T$ is a dimension of overlap, as measured in a vehicle lateral direction (i.e., a turning radius direction), between a first portion of the road surface over which a tire WF of each of the front wheels 12FR, 12FL has passed and a second portion of the road surface over which a tire WR of a corresponding one of the rear wheels 12RR, 12 RL is predicted or supposed to pass. The tire width $W_T$ is a dimension of each of the front and rear wheels 12F, 12R a measured in its width direction where the width dimensions of the front and rear wheels 12F, 12R are the same to each other. It is noted that the overlap width $ΔW_T$ may be defined also as a dimension of a portion, as measured in the vehicle lateral direction, which is common to the first and second portions of the road surface.

Figure 14:
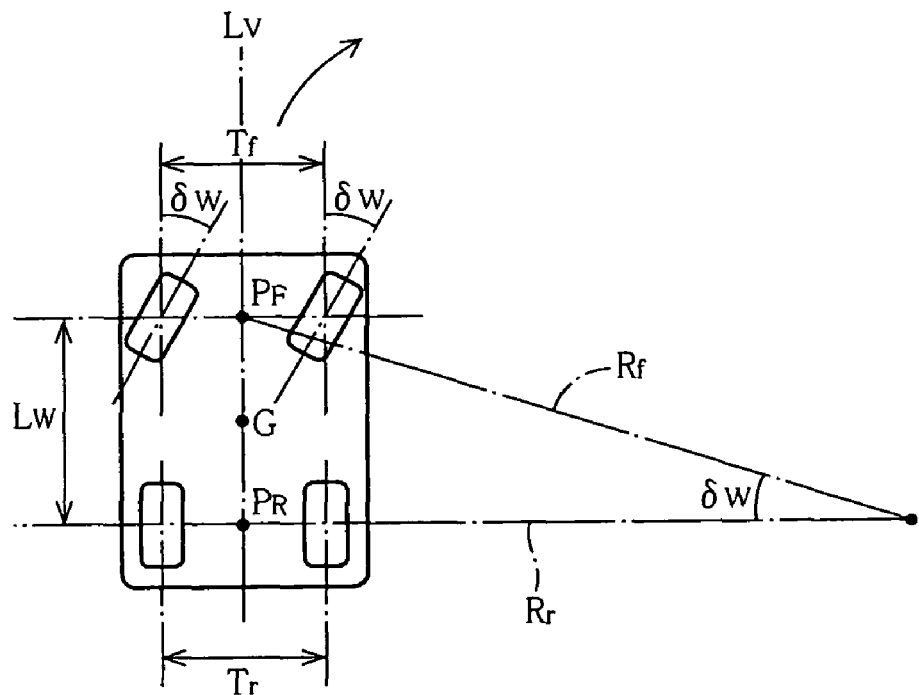
FIG. 14 is a view showing a relationship between a turning radius of each wheel of the vehicle and a turning angle of each front wheel of the vehicle during turning of the vehicle.

The path of each of the wheels 12FR, 12FL, 12RR, 12RL is represented by a continuous line. In the present embodiment, the path of each wheel is represented by a succession of points at which the wheel 12 (or tire) is in contact at its widthwise center with the road surface during running of the vehicle, and is defined by a turning radius R of the succession of the contact points. Further, a path intermediate between the path of the front right wheel 12FR and the path of the front left wheel 12FL can be defined as a path of the front wheels 12. The intermediate path may be represented by an average value of the turning radius of the front right wheel 12FR and the turning radius of the front left wheel 12FL, or may be represented by a path (turning radius) of a widthwise center point $P_F$ of a front-wheel side portion of the vehicle, as shown in FIG. 14. The center point $P_F$ is an intersection of a vertical surface containing a line $L_V$ (which passes a center G of gravity of the vehicle and extends in a longitudinal direction of the vehicle) and an axis common to axles of the respective front right and left wheels 12FR, 12FL (i.e., a line passing through centers of respective front right and left wheels 12FR, 12FL), during straight running of the vehicle on a horizontal road surface. The path of the center point $P_F$ may be also considered to consist of succession of points on the road surface, onto each of which the center point $P_F$ is projected. The path difference ΔR is a value obtained by subtracting the turning radius Rr of the rear wheel 12R from the turning radius Rf of the front wheel 12F. Specifically described, the path difference ΔR may be a difference between the turning radius of either one of the front wheels 12FR, 12FL and the turning radius of a corresponding one of the rear wheels 12RR, 12RL, which is located on the same side as the one of the front wheels 12FR, 12FL in the lateral direction of the vehicle, or may be a difference between the turning radii of the widthwise center points $P_F$, $P_R$ of the respective front-wheel side and rear-wheel side portions of the vehicle. Like the path of the center point $P_F$ of the front-wheel side portion, the path of the center point $P_R$ of the rear-wheel side portion may be represented by the turning radius Rr of an intersection of the vertical surface containing the line $L_V$ and an axis common to axles of the respective rear right and left wheels 12RR, 12RL (i.e., a line passing through centers of the respective rear right and left wheels 12RR, 12RL).

As shown in FIG. 14, it is known that a center of turning of the vehicle lies on an extension of the axis common to the axles of the respective rear right and left wheels 12RR, 12RL when a slipping amount of each of the wheels 12FR, 12FL, 12RR, 12RL is small, Therefore, the turning radius Rf of the center point $P_F$ of the front-wheel side portion and the turning radius Rr of the center point $P_R$ of the rear-wheel side portion can be expressed by the following expressions:

$$Rf=L_W/\sin δ_W \cdot 10^{-3}$$

$$Rr=L_W/\tan δ_W \cdot 10^{-3}$$

where "$L_W$" represents the wheel base, and "$δ_W$" represents an absolute value of turning angle of the steerable wheel (front wheel) 12F. In each of the above expressions, "$10^{-3}$" is a value for converting unit of length from "millimeter (mm)" to "meter (m)", since the wheel base $L_W$ is expressed in millimeter while the turning radii Rf, Rr are expressed in meter. In the present embodiment, the absolute value of the turning radius is used since a direction of the turning of the vehicle is not taken into consideration. The turning radii of the front wheel 12F and rear wheel 12R as inside wheels (each of which is positioned between the center of the turning of the vehicle and a corresponding one of outside wheels of the vehicle) can be expressed by the following expressions:

$$Rfin≈Rf-Tf/2$$

$$Rrin≈Rr-Tr/2$$

The turning radii of the front wheel 12F and rear wheel 12R as the outside wheels can be expressed by the following expressions:

$$Rfout≈Rf+Tf/2$$

$$Rrout≈Rr+Tr/2$$

In the above expressions, "Tf" represents a wheel tread between the front right and left wheels 12FR, 12FL, while "Tr" represents a wheel tread between the rear right and left wheels 12RR, 12RL.

Consequently, the turning radius difference ΔRin between the inside wheels 12F, 12R (i.e., the difference of the turning radii between the inside wheels 12F, 12R) and the turning radius difference ΔRout between the outside wheels 12F, 12R (i.e., the difference of the turning radii between the outside wheels 12F, 12R) are expressed by the following expressions:

$$ΔRin ≈ Rf - [Rr + (Tf - Tr)/2] \quad (4)$$
$$= (Rf - Rr) - (Tf - Tr)/2$$

$$ΔRout ≈ Rf - [Rr - (Tf - Tr)/2] \quad (5)$$
$$= (Rf - Rr) + (Tf - Tr)/2$$

Figure 15:
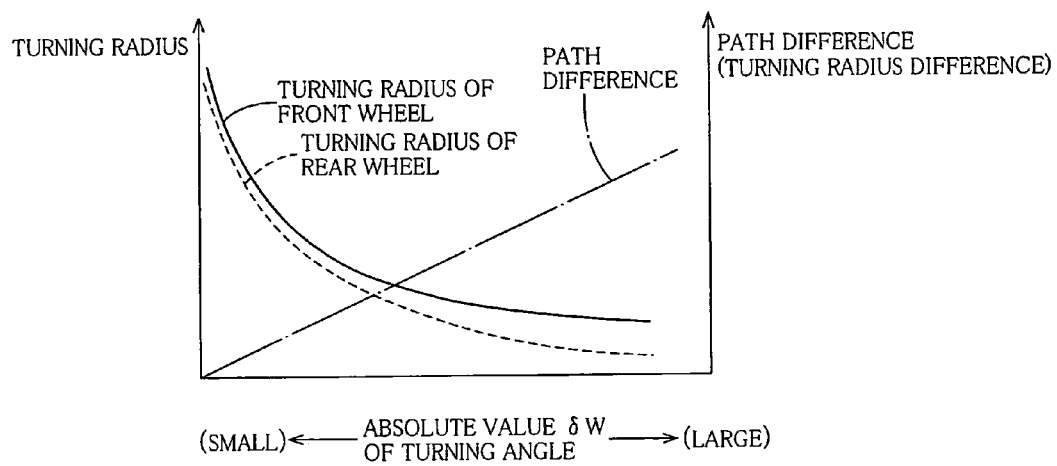
FIG. 15 is a view showing a relationship between turning radii of front and rear wheels of the vehicle and a difference of paths of the front and rear wheels.

Meanwhile, since the difference of the turning radii of the respective front-wheel side and rear-wheel side portions is expressed by the expression $\Delta R = Rf - Rr$, it is derived from the above expressions (4), (5) that the turning radius difference $\Delta Rin$ between the inside wheels 12F, 12R is smaller than the turning radius difference between the front-wheel side and rear-wheel side portions by one half ($\frac{1}{2}$) of a tread difference (Tf−Tr), and that the turning radius difference $\Delta Rout$ between the outside wheels 12F, 12R is larger than the turning radius difference between the front-wheel side and rear-wheel side portions by one half ($\frac{1}{2}$) of the tread difference (Tf−Tr). As shown in FIG. 15, it is derived from the above expressions that the turning radius Rf of the center point $P_F$ of the front-wheel side portion (the turning radius Rfin or Rfout of the front wheel 12 as the inside or outside wheel) is larger than the turning radius Rr of the center point $P_R$ of the rear-wheel side portion (the turning radius Rrin or Rrout of the rear wheel 12 as the inside or outside wheel), that the turning radius of each wheel is reduced with increase of the absolute value $\delta_W$ of the turning angle of each front wheel, and that the turning radius difference (i.e., the path difference) is increased with increase of the absolute value $\delta_W$ of the turning angle of each front wheel and with reduction of the turning radius R of each wheel.

Figure 24:
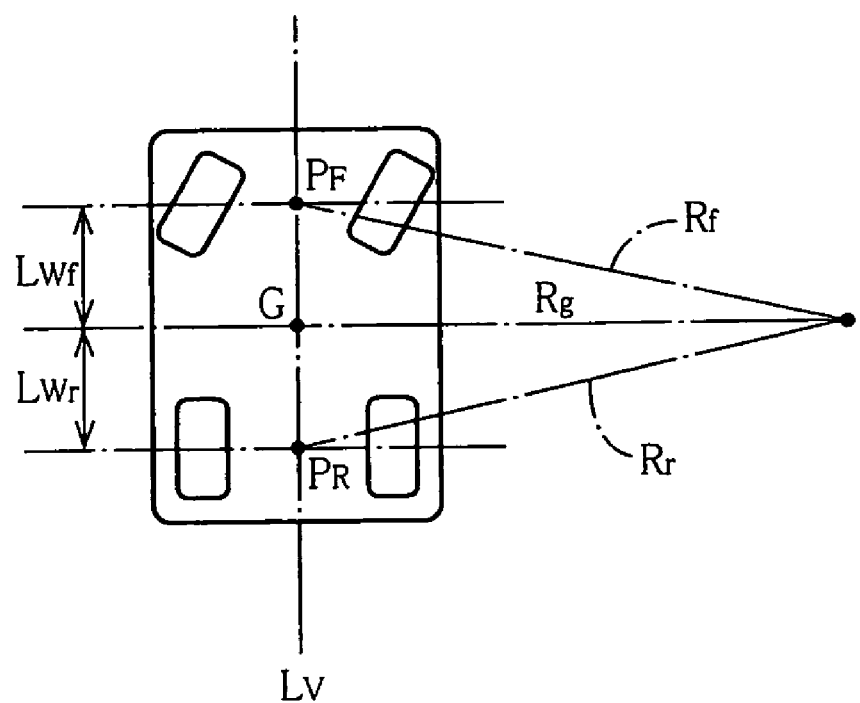
FIG. 24 is a view showing a relationship between a turning radius of each wheel of the vehicle and a turning angle of each front wheel of the vehicle during turning of the vehicle.

As shown in FIG. 24, the turning radius Rf of the center point $P_F$ of the front-wheel side portion and the turning radius Rr of the center point $P_R$ of the rear-wheel side portion can be obtained also based on a turning radius Rg of the center G of gravity of the vehicle, a distance $L_W f$ between the center G of gravity and the center point $P_F$ of the front-wheel side portion and a distance $L_W r$ between the center G of gravity and the center point $P_R$ of the rear-wheel side portion, in accordance with the following expressions:

$$Rf = \sqrt{(Rg^2 + L_W f^2)}$$

$$Rr = \sqrt{(Rg^2 + L_W r^2)}$$

$$L_W = L_W f + L_W r$$

In this case, the turning radius Rg of the center G of gravity can be obtained based on an absolute value $\delta$ of the steering angle of the steering wheel and the running speed V, in accordance with the following expression:

$$Rg = V/(d\delta/dt)$$

The turning radius Rg of the center G of gravity can be obtained also in accordance with the following expression:

$$Rg = L_W \cdot (1 + K \cdot V^2)/(d\delta/dt)$$

wherein "K" represents a stability factor.
The stability factor K can be obtained in accordance with the following expression:

$$K = m(L_W r \cdot Kr - L_W f \cdot Kf)/(2 \cdot L_W^2 \cdot Kf \cdot Kr)$$

where "Kf" and "Kr" represent equivalent cornering powers of the front and rear wheels, respectively, and "m" represents a weight of the vehicle.
Further, the turning radius Rg of the center G of gravity can be obtained also based on road information provided from a navigation system. The turning radius of the vehicle can be obtained based on information representing a radius of curvature of corner of road.

As shown in FIG. 13B, the overlap width $\Delta W_T$ (, which is the dimension of overlap, as measured in the vehicle lateral direction, between the portion of the road surface over which the front wheel 12F passes and a portion of the road surface over which the rear wheel 12R is supposed to pass,) is expressed by the following expression:

$$\Delta W_T = (Rr + W_T/2) - (Rf - W_T/2) \quad (6)$$
$$= W_T - (Rf - Rr)$$
$$= W_T - \Delta R$$

where "Rf", "Rr" represent the turning radius Rf of the center point $P_F$ of the front-wheel side portion and the turning radius Rr of the center point $P_R$ of the rear-wheel side portion, respectively. The overlap width $\Delta W_T$ can be obtained by subtracting a turning radius of an inside one of widthwise opposite ends of the tire of the front wheel 12F from a turning radius of an outside one of widthwise opposite ends of the tire of the rear wheel 12R. From the above expression (6), it is derived that the overlap width $\Delta W_T$ is a value that is obtained by subtracting the turning radius difference (path difference) between the front-wheel side and rear-wheel side portions, from the tire width $W_T$. From this expression (6), it is understood that the tire of each of the front and rear wheels has an overlapping portion overlapping with the tire of the other of the front and rear wheels when the turning radius difference is smaller than the tire width, and does not have the overlapping portion when the turning radius difference is not larger than the tire width. It is noted that, where the turning radius of each of the inside and outside wheels is obtained, each of the turning radius difference $\Delta Rin$ and the turning radius difference $\Delta Rout$ may substitute for the turning radius difference $\Delta R$ in the above expression (6). The overlap ratio Lap can be obtained in accordance with the following expression:

$$Lap = (W_T - \Delta R)/W_T = 1 - \Delta R/W_T$$

Figure 16:
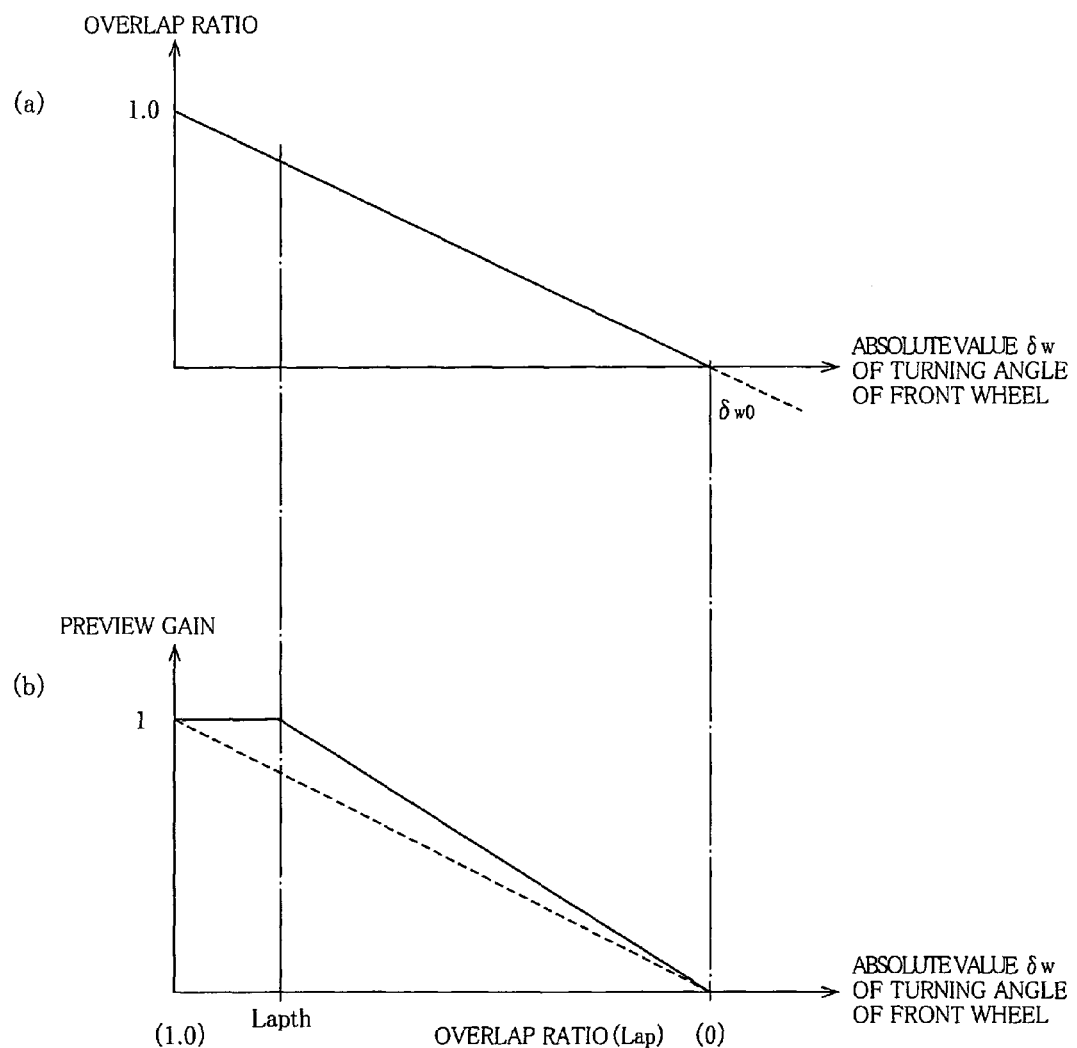
FIG. 16 is a set of graphs wherein the graph (a) shows a relationship between an absolute value of the turning angle of the front wheel and an overlap ratio, and the graph (b) shows a map indicating a turning preview-gain determining table that is stored in the storage portion of the suspension control unit.

As shown in graph (a) of FIG. 16, the overlap ratio Lap is a value that is reduced with increase of the path difference $\Delta R$, since the above-described overlap width $\Delta W_T$ is reduced with increase of the path difference $\Delta R$. When the absolute value $\delta_W$ of the turning angle of the front wheel reaches a predetermined value $\delta_{W0}$, the overlap ratio Lap becomes 0 (zero). Then, the overlap ratio Lap becomes smaller than 0 (zero) as the absolute value $\delta_W$ of the turning angle is increased to be larger than the predetermined value $\delta_{W0}$. The overlap ratio Lap being smaller than 0 (zero) means that a first portion of the road surface over which the front wheel 12F passes over and a second portion of the road surface over which the rear wheel 12R passes over do not overlap with each other at all. As described above, when the path difference $\Delta R$ between the front-wheel side and rear-wheel side portions becomes larger than the tire width $W_T$, there is no amount of overlap so that the overlap ratio Lap becomes not larger than 0 (zero). Further, as indicated by solid line in graph (b) of FIG. 16, the preview gain G is 1 (one) while the overlap ratio Lap is not smaller than a threshold value Lapth. The threshold value Lapth is a value representing a state in which the overlap amount is large enough to consider the preview control to be effectively performable even during turning of the vehicle. For example, the threshold value Lapth may be a value of approximately 0.8. When the overlap ratio Lap becomes smaller than the threshold value Lapth, the preview gain G is reduced with reduction of the overlap ratio Lap. That is, the preview gain G is reduced with reduction of the overlap amount. When the overlap ratio Lap becomes zero 0 (zero), the preview gain G is made to become 0 (zero). When the overlap ratio Lap is not lager than 0 (zero), the preview control is not carried out. This relationship between the overlap ratio Lap and the preview gain G is stored as a table.

It is noted that the preview gain may be also a value that is gradually reduced with reduction of the overlap ratio Lap as indicated by broken line in graph (b) of FIG. 16. Further, the table may represent a relationship between the absolute value $\delta_W$ of the tuning angle of the front wheel and the preview gain G.

Figure 21:
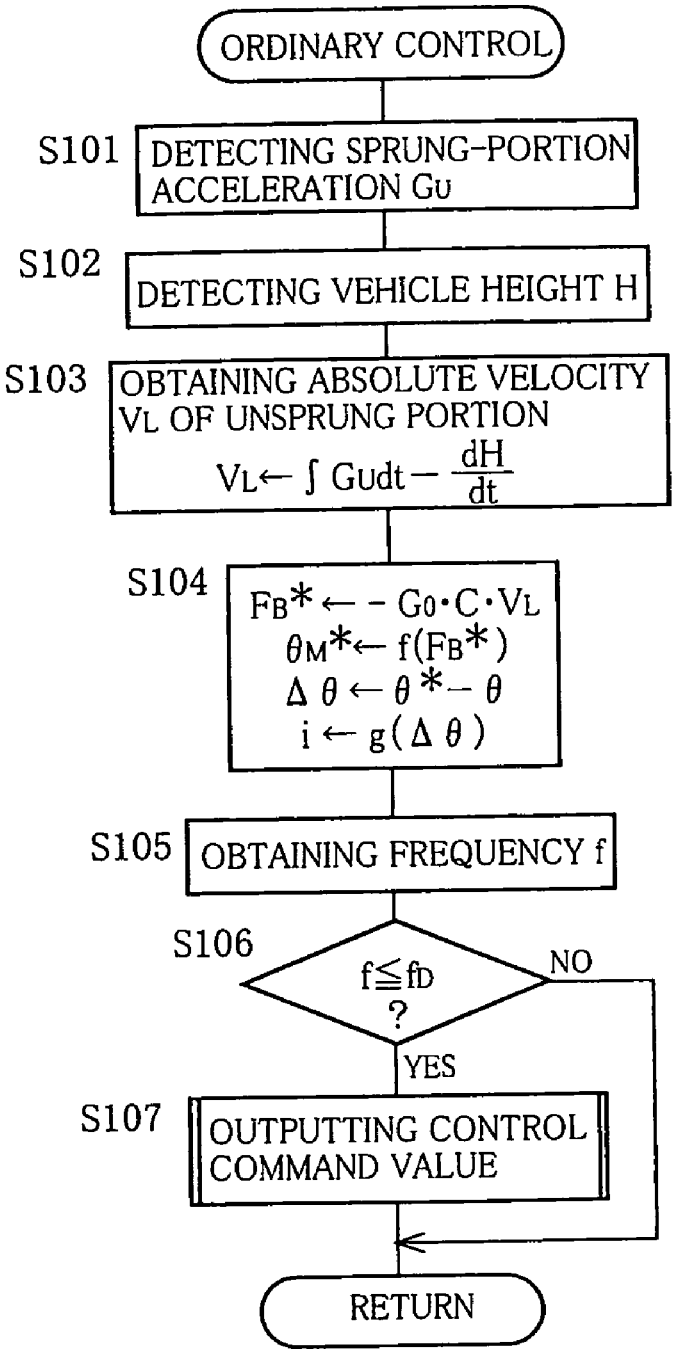
FIG. 21 is a flow chart showing an ordinary controlling routine program as another sub-routine program of the preview controlling routine program of FIG. 17.

FIG. 21 is a flow chart showing an ordinary controlling routine program that is executed for carrying out the above-described ordinary control. This routine program is executed for each of the front right and left wheels 12FR, 12FL at a predetermined time interval. In the following description as to execution of this routine program, there will be described an example in which the controlled wheel is provided by the front left wheel 12FL. The routine program is initiated with step S101 that is implemented to detect a sprung-portion acceleration $G_U$ in the form of the acceleration of a portion of the vehicle body 14 which corresponds to the front left wheel 12FL as the controlled wheel. Step S101 is followed by step S102 that is implemented to detect a vehicle height H (i.e., vertical distance between the sprung and unsprung portions). Then, steps S103 and S104 are implemented to prepare the control command value for the vertical force generator 24FL provided for the front left wheel 12FL. Specifically described, a sprung-portion absolute velocity $V_U$ in the form of the absolute velocity of the above-described portion of the vehicle body 14 which corresponds to the front left wheel 12FL, is obtained as an integral of the sprung-portion acceleration $G_U$ with respect to time. A relative velocity $V_S$ of the sprung and unsprung portions (i.e., rate $\Delta H/\Delta t$ of change of the distance between the sprung and unsprung portions) is obtained as a differential of the vehicle height H with respect to time. The unsprung-portion absolute velocity $V_L$ is obtained from the sprung-portion absolute velocity $V_U$ and the relative velocity $V_S$ of the sprung and unsprung portions (hereinafter referred to as "sprung/unsprung-portions relative velocity $V_S$"). Then, the target damping force $F_B^*$ is obtained from the gain $G_0$, damping coefficient C and unsprung-portion absolute velocity $V_L$, and the target rotational angle $\theta_M^*$ is obtained, so that the supplied electric current i is obtained from the rotational angle deviation $\Delta\theta$ as a difference between the actual rotational angle $\theta$ and the target rotational angle $\theta_M^*$.

Then, step S105 is implemented to obtain the frequency f of vertical vibration of the second lower arm 46 as a part of the unsprung portion, based on the unsprung-portion absolute velocity $V_L$. The frequency f can be obtained based on a fact that an amount of displacement of the second lower arm 46 from its reference position is maximized when the unsprung-portion absolute velocity $V_L$ is 0 (zero). Step S106 is implemented to judge whether the obtained frequency f is equal to or lower than a predetermined ordinarily-controllable maximum frequency $f_D$. When the frequency of the vertical vibration of the front left wheel 12FL is small and is not higher than the ordinarily-controllable maximum frequency $f_D$, the ordinary control is effectively performable, so that the control flow goes to step S107 in which the control command value is outputted. On the other hand, when the frequency of the vertical vibration of the front left wheel 12FL is higher than the ordinarily-controllable maximum frequency $f_D$, the ordinary control is not considered to be effectively performable, so that a negative judgment (NO) is obtained in step S106. In this case, the control command value is not outputted, so that the vertical force generator 24FL is not subjected to the ordinary control.

Figure 22:
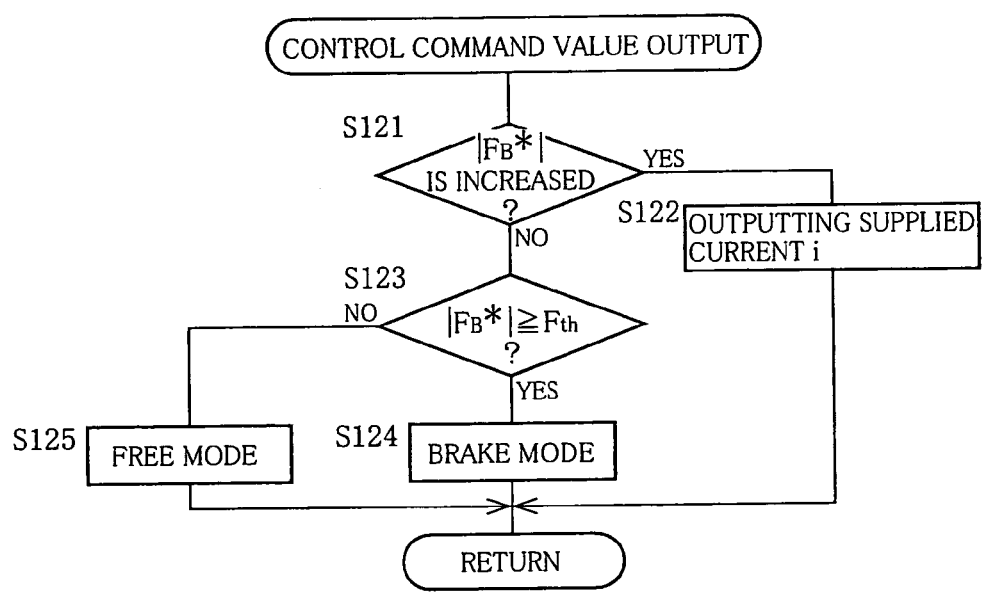
FIG. 22 is a flow chart showing a control-command-value outputting routine program as a sub-routine program of the ordinary controlling routine program of FIG. 21.
Figure 23:
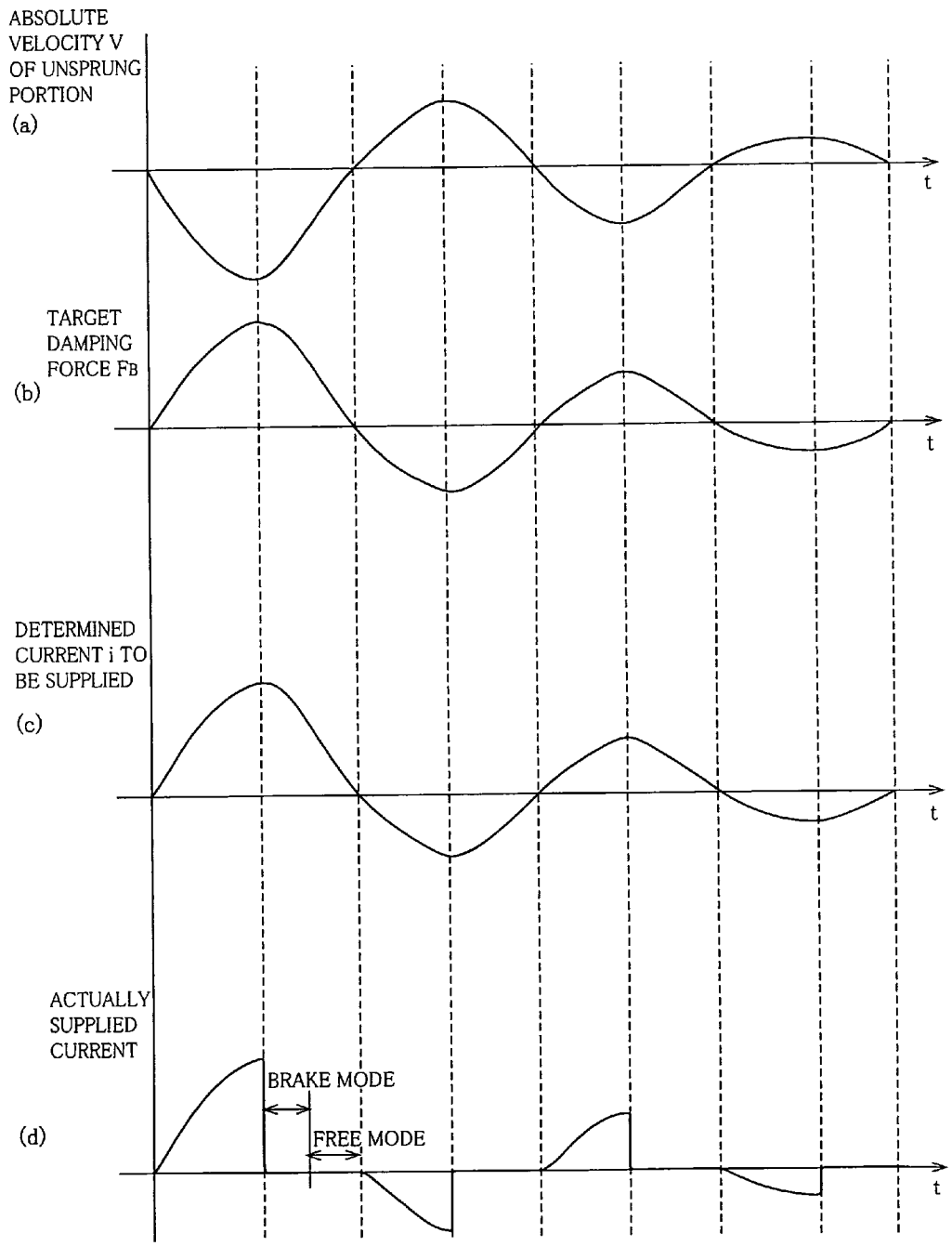
FIG. 23 is a graph showing chronological changes of absolute velocity, target damping force and electric current in an example of control performed in the suspension system.

In step S107, a control-command-value outputting routine program as a sub-routine program of the ordinary controlling routine program is executed as shown in a flow chart of FIG. 22. The control-command-value outputting routine program is initiated with step S121 that is implemented to judge whether an absolute value of the target damping force $F_B^*$ is being increased or not. When it is being increased, step S122 is implemented to output the control command value representing the supplied electric current i such that the control command value is supplied to the inverter 176FL. On the other hand, when the absolute value of the target damping force $F_B^*$ is not being increased, namely, when it is reduced or substantially held constant, step S123 is implemented to judge whether the absolute value of the target damping force $F_B^*$ is equal to or larger than a threshold value Fth. When it is not smaller than the threshold value Fth, step S124 is implemented to select the braking mode as one of the operational modes of the electric motor 140, and the control command value representing the selection of the braking mode is outputted. When it is smaller than the threshold value Fth, step S125 is implemented to select the free mode as one of the operational modes of the electric motor 140, and the control command value representing the selection of the free mode is outputted. As shown in FIG. 23, the electric current is supplied to the motor 140 when the absolute value of the damping force is to be increased, and is not supplied to the motor 140 when the absolute value of the damping force is to be reduced. A load applied to the wheel 12 constitutes a force which acts between the sprung and unsprung portions and which is applied to the actuator 124 via the second lower arm 46 and the L-shaped bar 122, whereby the motor 140 is returned to the reference angular position even without supply of the electric current the motor 140. Further, although the actuator 124 whose positive/negative efficiency product $\eta_P \cdot \eta_N$ is low is hard to be affected by influence of the external force, the motor 140 is moved by the external force so as to be returned to the reference angular state when being placed in the free mode. Thus, the supply of the electric current is stopped when the absolute value of the damping force is to be reduced, thereby making it possible to reduce consumption of the electric power. Further, since the motor 140 is placed in the braking mode when the absolute value of the target damping force $F_B^*$ is large, it is possible to avoid the absolute value of the damping force from being abruptly reduced by the external force. Still further, when the absolute value of the target damping force $F_B^*$ is reduced, it is possible to regenerate an energy and accordingly to further improve the energy efficiency. Moreover, since the motor 140 is not energized when the absolute value of the target damping force $F_B^*$ is reduced, the rotational direction of the motor 140 is changeable more quickly than in an arrangement in which the motor 140 is energized even in reduction of the absolute value of the target damping force $F_B^*$, thereby avoiding reduction of responsiveness of the motor 140.

It is noted that the frequency of the vertical vibration of the controlled wheel may be obtained also based on change of the sprung-portion absolute velocity or displacement of the sprung or unsprung portion. Further, the vibration frequency may be obtained also by using Fourier transform or the like.

Figure 17:
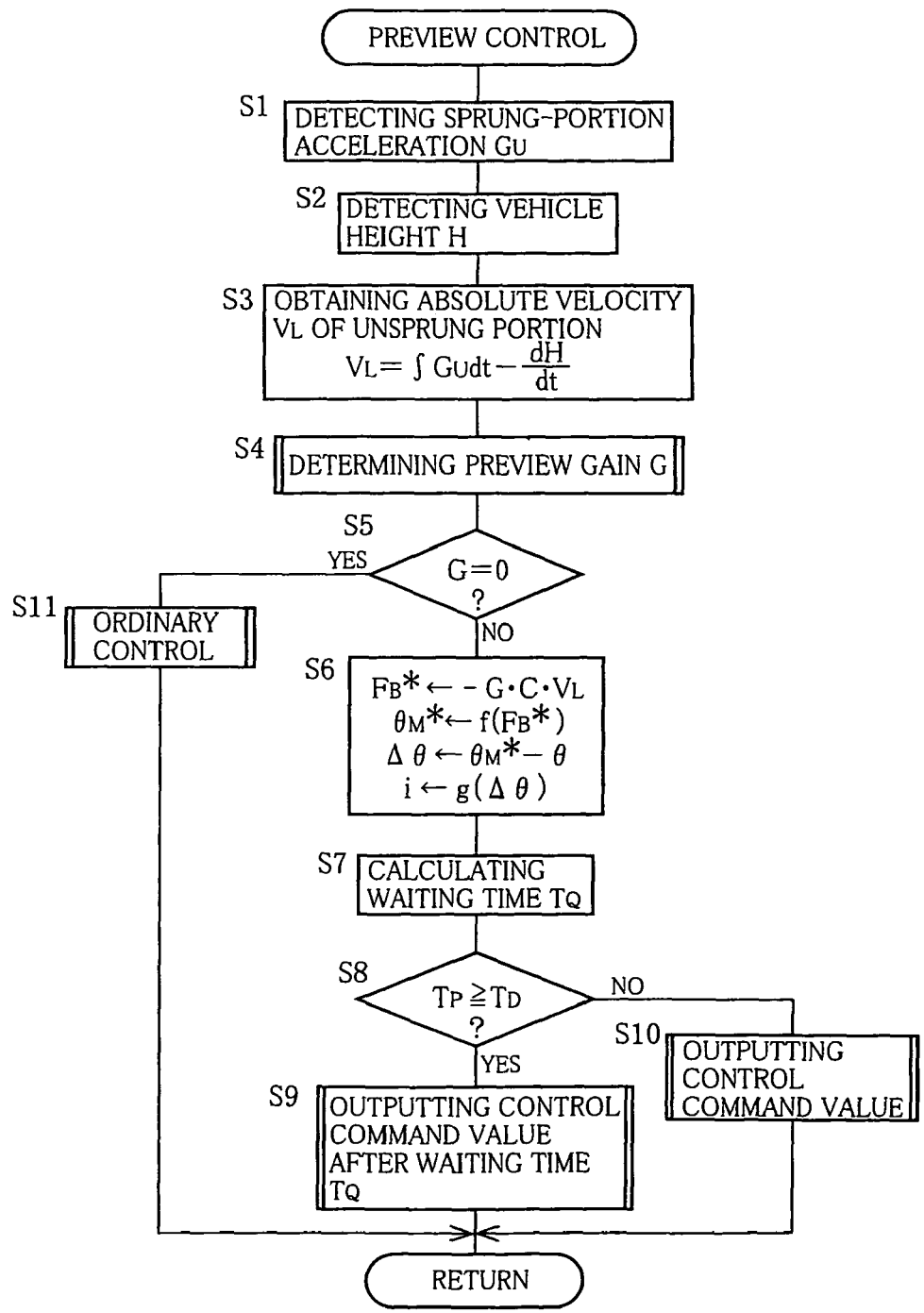
FIG. 17 is a flow chart showing a preview controlling routine program that is stored in a storage portion of a vertical-force-generator control unit that is included in the suspension system.

FIG. 17 is a flow chart showing a preview controlling routine program that is executed for carrying out the above-described preview control. This routine program is executed for each of the front right and left wheels 12FR, 12FL at a predetermined time interval. The vertical force generator 24RL provided for the rear left wheel 12RL is controlled based on the vertical behavior of the front left wheel 12FL, while the vertical force generator 24RR provided for the rear right wheel 12RR is controlled based on the vertical behavior of the front right wheel 12FR. In the following description as to execution of this routine program, there will be described an example in which the controlled wheel and the detected wheel are provided by the rear left wheel 12RL and the front left wheel 12FL, respectively. The routine program is initiated with step S1 that is implemented to detect the sprung-portion acceleration $G_U$ in the form of the acceleration of a portion of the vehicle body 14 which corresponds to the front left wheel 12FL as the detected wheel. Step S1 is followed by step S2 that is implemented to detect the vehicle height H. Then, step S3 is implemented to obtain the unsprung-portion absolute velocity $V_L$. Step S4 is implemented to determine the preview gain G. In step S5, it is judged whether the determined preview gain G is 0 (zero) or not.

When the preview gain is larger than 0 (zero), steps S6-S10 are implemented to carry out the preview control. In step S6, the target damping force $F_B^*$ is obtained based on the preview gain G, damping coefficient C and unsprung-portion absolute velocity $V_L$, then the target rotational angle $\theta_M^*$ is obtained based on the target damping force $F_B^*$, and then the supplied electric current i is obtained based on the rotational angle deviation $\Delta\theta$. In step S7, the waiting time $T_Q$ is obtained based on the previewable time $T_P$ that has been obtained in step S4. In step S8, it is judged whether the previewable time $T_P$ is equal to or longer than the response delay time $T_D$. When the previewable time $T_P$ is not shorter than the response delay time $T_D$, step S9 is implemented to store the supplied electric current i and to output the control command value upon elapse of the waiting time $T_Q$. When the previewable time $T_P$ is shorter than the response delay time $T_D$, step S10 is implemented to immediately output the control command value.

When the preview gain is 0 (zero), step S11 is implemented to carry out substantially the same control as the above-described ordinary control that is shown in the flow chart of FIG. 21. Where the controlled wheel is provided by the rear left wheel 12RL, the vertical force generator 12RL is controlled based on the vertical behavior of the rear left wheel 12RL.

In each of steps S9 and S10, the control command value is outputted in the same manner as in step S107 that is implemented as shown in the flow chart of FIG. 22. Since the electric motor 140 is not energized during tendency of reduction of the target damping force $F_B^*$, the consumption of the electric power can be reduced as compared with an arrangement in which the electric current is supplied to the motor 140 even during the reduction of the target damping force $F_B^*$.

In the present embodiment, step S9 is implemented to output, upon elapse of the waiting time $T_Q$, the control command value in the same manner as in step S107. However, the control command value may be a predetermined value so as to be stored, and the predetermined control command value is outputted upon elapse of the waiting time $T_Q$.

Figure 18:
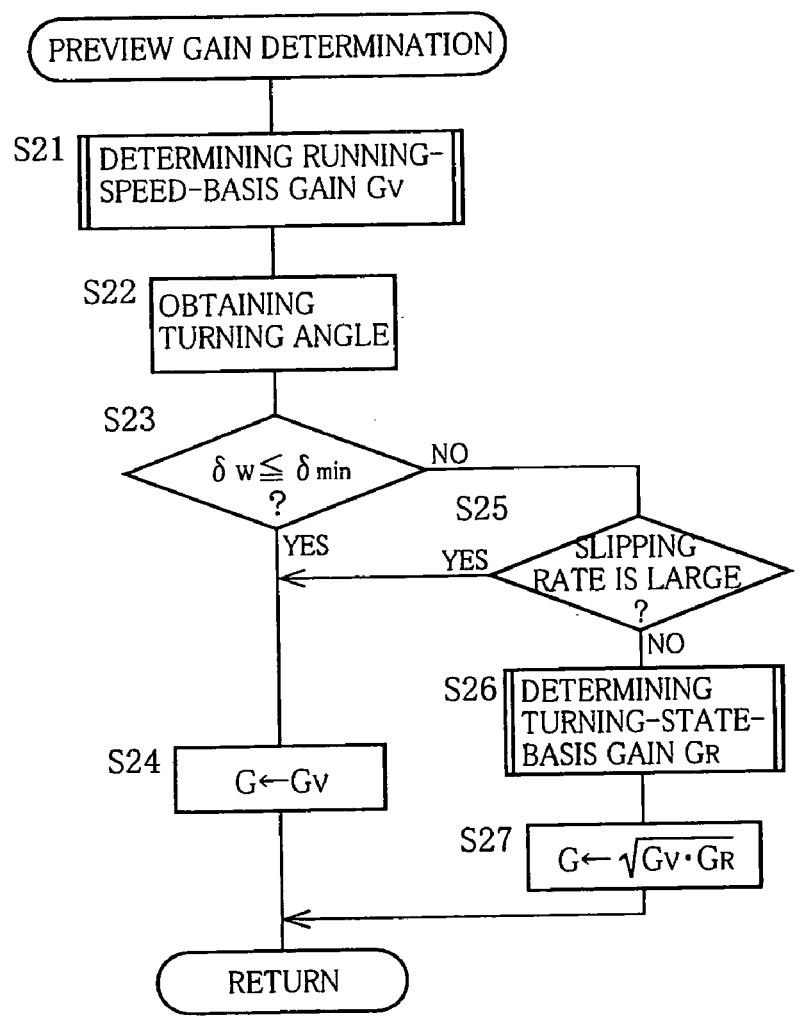
FIG. 18 is a flow chart showing a preview-gain determining routine program as a sub-routine program of the preview controlling routine program of FIG. 17.

In step S4, a preview-gain determining routine program as a sub-routine program of the preview controlling routine program is executed as shown in a flow chart of FIG. 18. In the present embodiment, in a state of straight running of the vehicle, a running-speed-basis gain $G_V$ (that may be referred to as also a preview-time-basis gain) is used as the preview gain. The running-speed-basis gain $G_V$ is determined based on the vehicle running speed or the preview time. In a state of turning (non-straight running) of the vehicle, the preview gain is provided by another value which is a geometrical mean of the running-speed-basis gain $G_V$ and a turning-state-basis gain $G_R$ (that may be referred to as also a wheel-turning-angle-basis gain) that is dependent on condition of the turning of the vehicle, namely, which is obtained as a square root [$\sqrt{(G_R \cdot G_V)}$] of product of the running-speed-basis gain $G_V$ and the turning-state-basis gain $G_R$. It is regarded that the vehicle is in the state of straight running when the absolute value $\delta_W$ of the turning angle of each front wheel 12F as the steerable wheel is not larger than a predetermined value, and that the vehicle is in the state of turning when the absolute value $\delta_W$ of the turning angle is larger than the predetermined value. It is noted that the predetermined value is a value that permits the vehicle to be regarded to run straight.

The preview-gain determining routine program shown in FIG. 18 is initiated with step S21 in which the running-speed-basis gain $G_V$ is determined. Then, in step S22, the turning angle of each front wheel 12F is detected. In step S23, it is judged whether the absolute value $\delta_W$ of the turning angle is equal to or smaller than a predetermined value $\delta_{MIN}$. When the absolute value $\delta_W$ is not larger than the predetermined value $\delta_{MIN}$, the turning condition of the vehicle does not have to be taken into consideration, so that the control flow goes to step S24 in which the running-speed-basis gain $G_V$ is set as the preview gain G ($G \leftarrow G_V$). On the other hand, when the absolute value $\delta_W$ is larger than the predetermined value $\delta_{MIN}$, the control flow goes to step S25 that is implemented to judge whether a rate of slipping of at least one of the wheels 12FR, 12FL, 12RR, 12RL is equal to or larger than a predetermined value. Specifically described, a positive judgment (YES) is obtained in step S25 when at least one of first and second conditions is satisfied, wherein the first condition is that a rate of longitudinal slipping (that is caused by braking or driving of the vehicle) of at least one of the wheels 12 is not smaller than a predetermined first value, and the second condition is that a rate of lateral slipping of at least one of the wheels 12 is not smaller than a predetermined second value. When the positive judgment (YES) is obtained in step S25, the control flow goes to step S24 in which the running-speed-basis gain $G_V$ is set as the preview gain G, without determining the turning-state-basis gain. Each of the above-described predetermined first and second values is a predetermined fixed value that makes it impossible to estimate the turning radius with a minimally required degree of accuracy. When a negative judgment (NO) is obtained in step S25, step S26 is implemented to determine the turning-state-basis gain $G_R$. Then, in step S27, the geometrical mean of the running-speed-basis gain $G_V$ and the turning-state-basis gain $G_R$ is set as the preview gain G.

Figure 19:
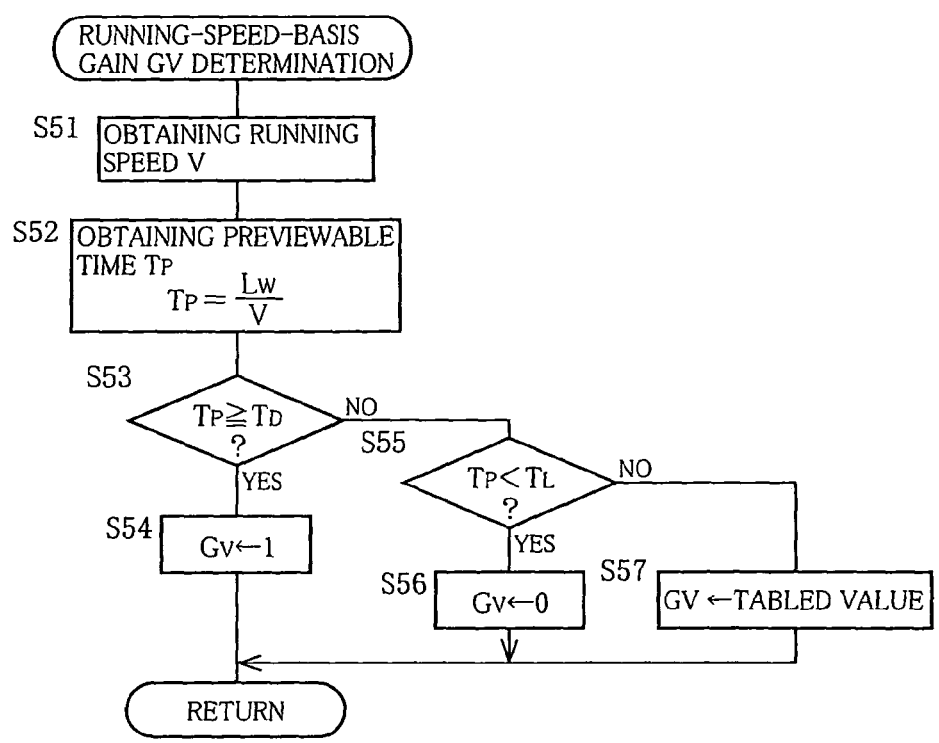
FIG. 19 is a flow chart showing a running-speed-basis gain determining routine program as a sub-routine program of the preview-gain determining routine program of FIG. 18.

In step S21, a running-speed-basis gain determining routine program as a sub-routine program of the preview-gain determining routine program is executed as shown in a flow chart of FIG. 19. This routine program is initiated with step S51 that is implemented to obtain the vehicle running speed V. Then, in step S52, the previewable time $T_P$ is obtained based on the running speed V and the wheel base $L_W$. In step S53, it is judged whether the previewable time $T_P$ is equal to or longer than the response delay time $T_D$. When the previewable time $T_P$ is not shorter than the response delay time $T_D$, the running-speed-basis gain $G_V$ is set to 1 (one) in step S54. On the other hand, when the previewable time $T_P$ is shorter than the response delay time $T_D$, step S55 is implemented to judge whether the previewable time $T_P$ is still shorter than the limit time $T_L$. When the previewable time $T_P$ is shorter than the limit time $T_L$, the running-speed-basis gain $G_V$ is set to 0 (zero) in step S56. When the previewable time $T_P$ is shorter than the response delay time $T_D$ and is not shorter than the limit time $T_L$, the running-speed-basis gain $G_V$ is set to a tabled value, which is reduced with reduction of the previewable time $T_P$. It is noted that the running-speed-basis gain $G_V$ for the rear right wheel 12RR and the running-speed-basis gain $G_V$ for the rear left wheel 12RL are values that are the same to each other.

Figure 20:
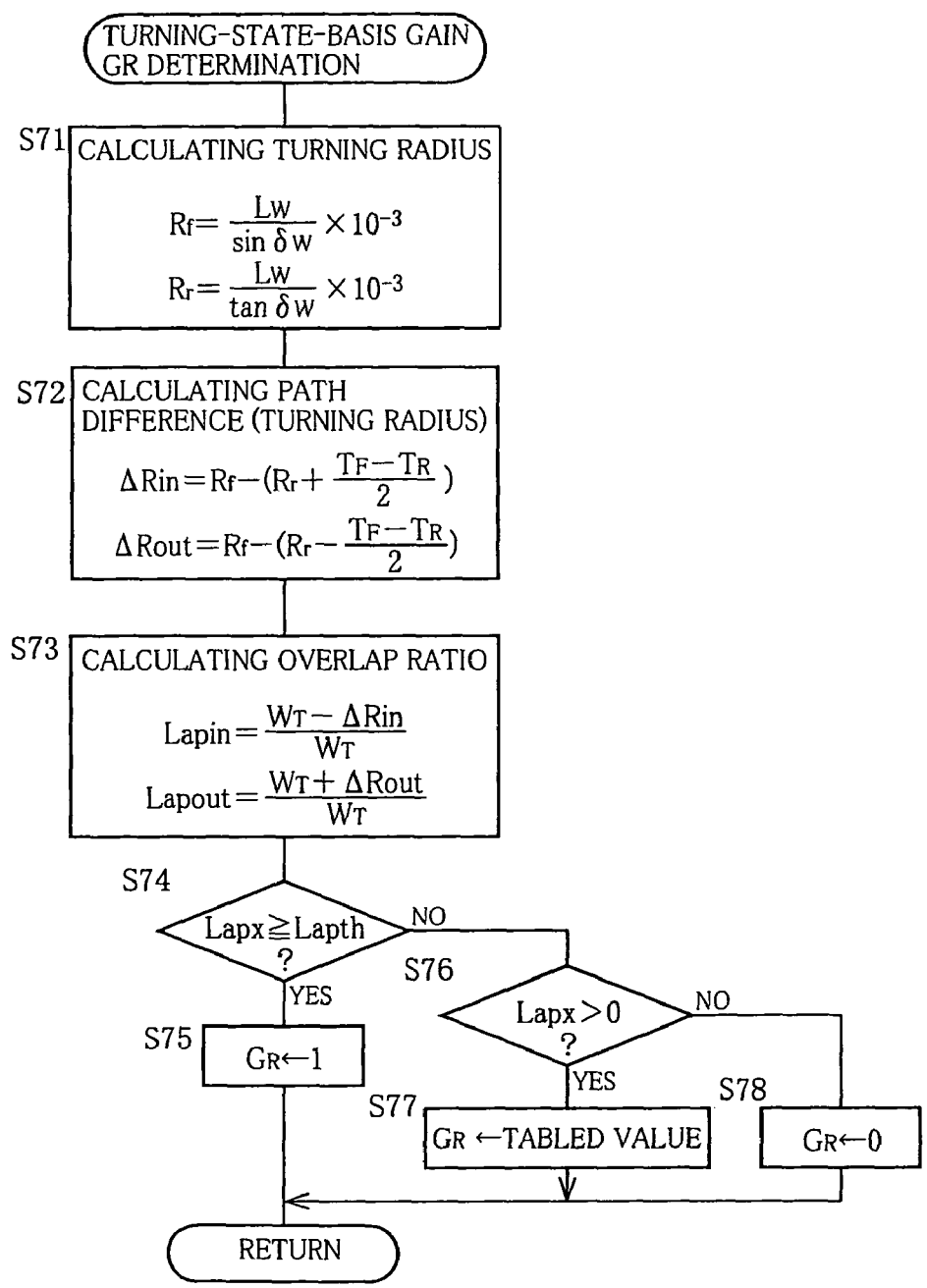
FIG. 20 is a flow chart showing a turning-sate gain determining routine program as another sub-routine program of the preview-gain determining routine program of FIG. 18.

In step S26, a turning-sate gain determining routine program as another sub-routine program of the preview-gain determining routine program is executed as shown in a flow chart of FIG. 20. This routine program is initiated with step S71 that is implemented to obtain the turning radius Rf of the center point $P_F$ of the front-wheel side portion and the turning radius Rr of the center point $P_R$ of the rear-wheel side portion. Step S71 is followed by step S72 that is implemented to obtain the turning radius difference (i.e., path difference). In this step S72, the turning radius difference ΔRout is obtained when the rear left wheel 12RL as the controlled wheel serves as the outside wheel, and the turning radius difference ΔRin is obtained when the rear left wheel 12RL as the controlled wheel serves as the inside wheel. Then, in step S73, the overlap ratio Lap is obtained. The turning-state-basis gain is obtained based on the overlap ratio Lap in steps S74-S78. Step S74 is implemented to judge if the overlap ratio Lap is equal to or larger than the above-described threshold value Lapth. When the overlap ratio Lap is not smaller than the threshold value Lapth, the turning-state-basis gain $G_R$ is set to 1 (one) in step S75. When the overlap ratio Lap is smaller than the threshold value Lapth, the control flow goes to step S76 that is implemented to judge whether the overlap ratio Lap is larger than 0 (zero) or not. When the overlap ratio Lap is larger than 0, the turning-state-basis gain $G_R$ is set to a table value in step S77. When the overlap ratio Lap is not larger than 0, the turning-state-basis gain $G_R$ is set to 0 (zero) in step S78.

The overlap ratio Lap is obtained for each of the rear right and left wheels 12RR, 12RL, namely, for each of the inside and outside wheels. The turning-state-basis gain $G_R$ for each of the inside and outside wheels may be obtained by using either a corresponding one of the obtained overlap ratio Lap or an average value of the overlap ration Lap of the inside wheel and the overlap ration Lap of the outside wheel. In the former case, the preview gains for the respective rear right and left wheels could be different from each other.

In the present embodiment in which each of the vertical force generators 24R provided for the rear wheels 12R is subjected to the preview control, the vertical force generators 24R can be controlled without delay or with reduced delay even if the length of response delay time of the actuator 124R is large, so that the vertical vibration of the rear-wheel side portion of the vehicle can be satisfactorily suppressed. Further, when the previewable time $T_P$ is shorter than the response delay time $T_D$, or when the rear wheel 12R is passes over a portion of the road surface which little overlaps with a portion of the road surface over which the front wheel 12F has passed, there is a risk that a ride comfort could be made worse by carrying out the preview control. However, in the present embodiment, the preview gain G is set to a value smaller than 1 (one) in such cases, thereby making it possible to avoid the ride comfort from being deteriorated by carrying out the preview control, and to satisfactorily suppress the vertical vibration of each of the rear-wheel side portion of the vehicle. The ordinary control is carried upon generation of vibration having frequency lower than frequency of vibration whose one-eighth (⅛) cycle corresponds to the response delay time $T_D$ of the actuator 124, i.e., vibration having frequency so low that its one-eighth (⅛) cycle is longer than the response delay time $T_D$ of the actuator 124. The ordinary control is not carried out upon generation of vibration having frequency not lower than frequency of the vibration whose one-eighth (⅛) cycle corresponds to the response delay time $T_D$ of the actuator 124, i.e., the vibration having frequency so high that its one-eighth (⅛) cycle is not longer than the response delay time $T_D$ of the actuator 124. However, the preview control is carried out upon generation of vibration as long as the generated vibration having frequency not higher than a preview-controllable maximum frequency that is dependent on responsiveness of the actuator 124. Consequently, the preview control enables the actuator 124 to suppress vibration having higher frequency. Further, during working of the vertical force generator 24, the high frequency vibration can be absorbed by elastic deformation of the L-shaped bar 122.

In the present embodiment, the vertical-force-generator control unit 170 included in the suspension ECU 168 includes portions which are assigned to store and execute the preview controlling routine program shown in the flow chart of FIG. 17 and the ordinary controlling routine program shown in the flow chart of FIG. 21 and which cooperate with the sprung-portion acceleration sensors 196 and the vehicle height sensors 198 to constitute a vertical force controller that functions as a damping-force controlling portion. The vertical force generator 24 functions as a damping force generator. The damping-force controlling portion serves also as a sprung-portion-basis controlling portion of the vertical force controller. The vertical force controller includes portions which are assigned to store and implement step S4 of the preview controlling routine program shown in the flow chart of FIG. 17 and to store a table represented by the map shown in the graph (b) of FIG. 12A and a table represented by the map shown in the graph (b) of FIG. 16, and which constitutes a gain determiner. The gain determiner includes portions which are assigned to store a table represented by solid line or broken line in the graph (b) of FIG. 12A and to store and implement steps S56 and S57 of the flow chart of FIG. 19, and which constitute a reduced-value setting portion of the gain determiner. The gain determiner includes portions which are assigned to store the table represented in the graph (b) of FIG. 12A and to store and implement step S56 of the flow chart of FIG. 19, and which constitute a zero setting portion that is described in mode (4) of the present invention. The gain determiner includes portions which are assigned to store the table represented by the map shown in the graph (b) of FIG. 16 and to store and implement step S26 of the flow chart of FIG. 18, and which constitute a wheel-turning-angle-basis determining portion of the gain determiner. It is noted that a zero setting portion described in mode (5) of the present invention is constituted by portions of the gain determiner which are assigned to store a table represented by one-dot chain line in the graph (b) of FIG. 12A and to store and implement step S57 of the flow chart of FIG. 19.

Further, the gain determiner includes portions which are assigned to store and implement steps S71, S72, S73 of the flow chart of FIG. 20 and which constitute a path-basis overlap-amount obtaining portion that serves also as an overlap ratio obtaining portion. The path-basis overlap-amount obtaining portion includes portions which are assigned to store and implement step S71 and which constitute a turning-radius obtaining portion. The gain determiner further includes portions which are assigned to store the table shown in the graph (b) of FIG. 16 and to store and implement step S77 of the flow chart of FIG. 20 and which constitute a reduced-value setting portion.

It is noted that the previewable time $T_P$ does not necessarily have to be obtained for obtaining the running-speed-basis gain $G_V$ and that the running-speed-basis gain $G_V$ may be obtained based on the running speed V. As described above, it is possible to prepare a table representing a relationship between the running speed and the gain. Similarly, for obtaining the turning-state-basis gain $G_R$, it is not essential to obtain the overlap ratio. The turning-state-basis gain $G_R$ may be obtained based on the overlap width $\Delta W_T$ or the path difference (turning radius difference). Further, in the above-described embodiment, during turning of the vehicle, the preview gain G is provided by the value of the geometrical mean of the running-speed-basis gain $G_V$ and the turning-state-basis gain $G_R$. However, the preview gain G during turning of the vehicle may be provided by another value. For example, the preview gain G during turning of the vehicle may be provided by the turning-state-basis gain $G_R$ ($G_R \rightarrow G$), while the preview gain G during straight running of the vehicle is provided by the running-speed-basis gain $G_V$ ($G_V \rightarrow G$). In this arrangement, step S27 can be eliminated in the flow chart of FIG. 18. Further, in at least one of the ordinary control and the preview control, the damping force $F_B^*$ may be controlled in accordance with so-called "skyhook damper theory". Moreover, the target damping force $F_B^*$ may be provided by a value ($F_B^* = G_0 \cdot C \cdot V_U$) dependent on the sprung-portion absolute velocity $V_U$ or a value ($F_B^* = -G_0 \cdot C \cdot V_S$) dependent on the sprung/unsprung-portions relative velocity $V_S$. In this arrangement, the target damping force $F_B^*$ may be obtained in accordance with a rule different from that used in the arrangement in which the control is executed based on the unsprung-portion absolute velocity $V_L$.

Further, in the above-described embodiment, the damping force is generated by controlling the vertical force generator 24. However, it is possible to generate an elastic force (vertical force) dependent on a displacement $X_L$ of the second lower arm 46 as the unsprung portion. A target value of the vertical force (target elastic force) $F_B^*$ can be obtained in accordance with the following expression:

$$F_B^* = G \cdot K \cdot X_L$$

In the above expression, "K" represents a spring constant of the L-shaped bar 122, which is a fixed value that is dependent on share modulus and geometrical moment of inertia of the shaft portion 130 and flexural rigidity of the arm portion 132. When the displacement $X_L$ of the second lower arm 46 (hereinafter simply referred to as "unsprung-portion displacement") is a displacement by which the second lower arm 46 is positioned on a lower side of its reference position (in which the second lower arm 46 is positioned when the electric motor 140 is in the above-described reference angular position), the target elastic force $F_B^*$ is to act in the downward direction. The elastic force generated by the coil spring 20 is reduced with increase of the distance between the sprung and unsprung portions. The reduction of the elastic force of the coil spring 20 is compensated by the elastic force generated by the vertical force generator 24, for thereby restraining displacement of the vehicle body 14 as the spring portion that could be caused by the displacement of the second lower arm 46. The distance between the sprung and unsprung portions becomes a distance dependent on the unsprung-portion displacement $X_L$, by the pivot movement of the arm portion 132 as a result of the rotation of the electric motor 140. When the unsprung-portion displacement $X_L$ is a displacement by which the second lower arm 46 is positioned on an upper side of its reference position, the target elastic force $F_B^*$ is to act in the upward direction. The elastic force generated by the coil spring 20 is increased with reduction of the distance between the sprung and unsprung portions. The increase of the elastic force of the coil spring 20 is offset by the elastic force acting in the opposite direction (i.e., direction opposite to a direction of the elastic force of the coil spring 20) and generated by the vertical force generator 24, for thereby restraining displacement of the vehicle body 14 that could be caused by the displacement of the second lower arm 46.

The unsprung-portion displacement $X_L$ may be obtained as an integral of the unsprung-portion absolute velocity $V_L$ with respect to time, or may be obtained based on a double integral of the sprung-portion acceleration $G_U$ and the distance H between the sprung and unsprung portions. There will be described an example of the control performed for generating the elastic force dependent on the displacement $X_L$ of the second lower arm 46 as a part of the unsprung portion, with reference to flow charts shown in FIGS. 25 and 26. The same step numerals will be used to represent steps having the same procedures as those in the flow charts of FIGS. 17 and 21, and description of these steps will be omitted.

Figure 26:
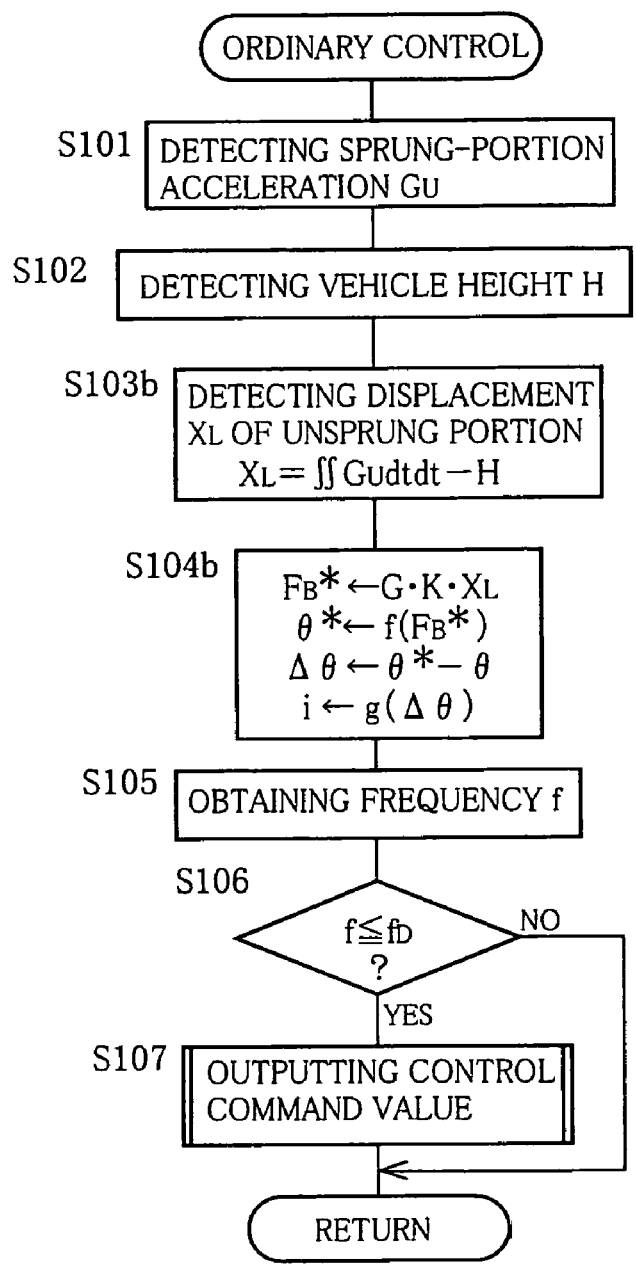
FIG. 26 is a flow chart showing an ordinary controlling routine program as a sub-routine program of the preview controlling routine program of FIG. 25.

The ordinary control is performed by executing an ordinary controlling routine program represented by the flow chart of FIG. 26. Where the controlled wheel is provided by the front left wheel 12FL, step S103b is implemented to obtain the unsprung-portion displacement $X_L$ of the front left wheel 12FL (i.e., the displacement $X_L$ of the second lower arm 46 provided for the front left wheel 12FL) based on the sprung-portion acceleration $G_U$ (in the form of the acceleration of a portion of the vehicle body 14 as the sprung portion which corresponds to the front left wheel 12FL) and the vehicle height H. Then, step S104b is implemented to obtain the target elastic force $F_B^*$, then obtain the target rotational angle $\theta_M^*$ based on the target elastic force $F_B^*$, and then obtain the supplied electric current i. In step S105, the frequency f of the actual vibration caused in the second lower arm 46 provided for the front left wheel 12FL is obtained. The frequency may be obtained based on either the unsprung-portion absolute velocity or unsprung-portion displacement. In step S106, it is judged whether the obtained frequency f is equal to or lower than the above-described ordinarily-controllable maximum frequency fn. When the frequency f of the actual vibration is not higher than the ordinarily-controllable maximum frequency $f_D$, step S107 is implemented to output the control command value, as in the above-described embodiment, which are dependent on the supplied electric current i and the target elastic force $F_B^*$.

Figure 25:
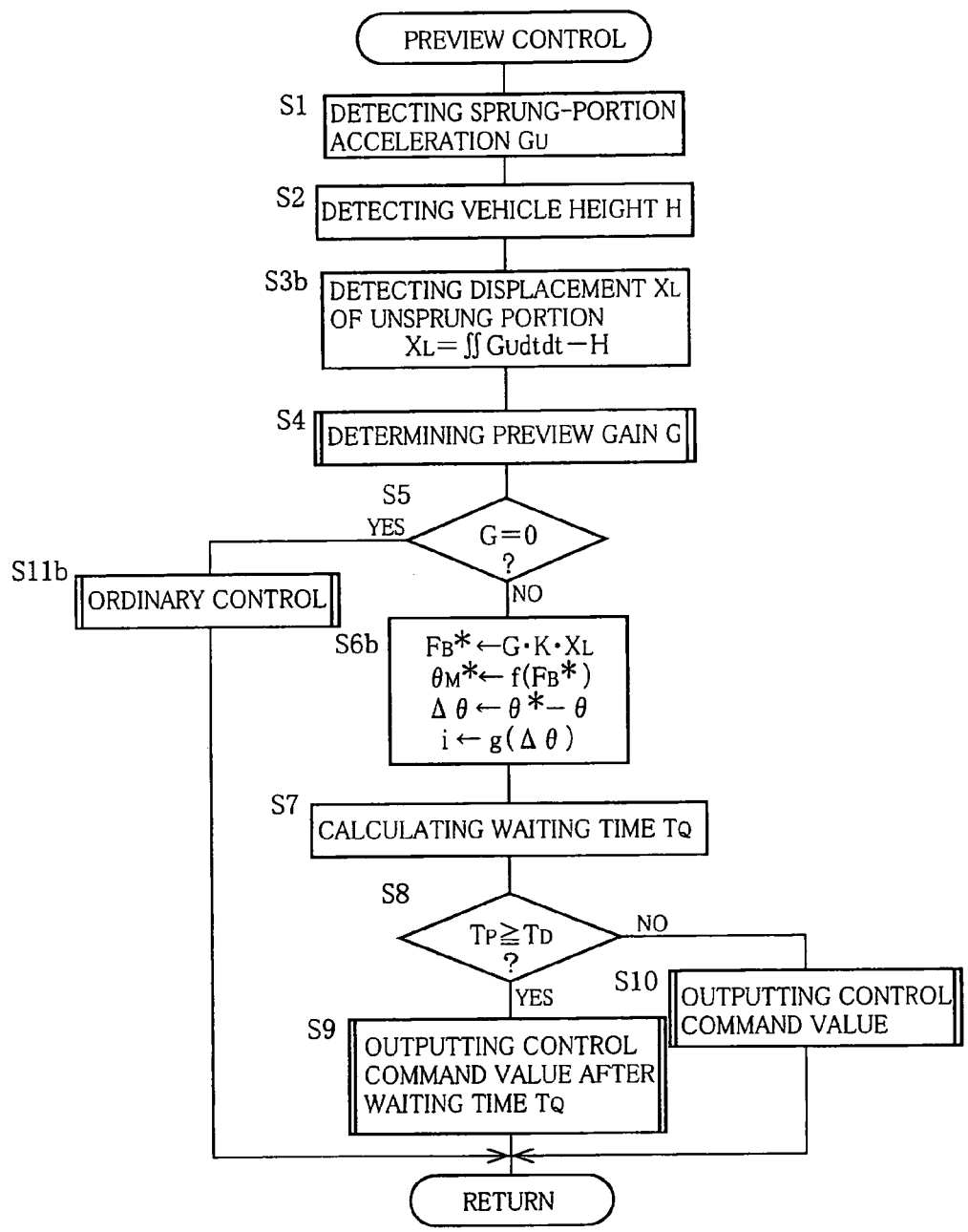
FIG. 25 is a flow chart showing a preview controlling routine program that is different from the above-described preview controlling routine program of FIG. 17.

The preview control is performed by executing a preview controlling routine program represented by the flow chart of FIG. 25. Where the controlled wheel is provided by the rear left wheel 12RL, step S3b is implemented to obtain the unsprung-portion displacement $X_L$ of the front left wheel 12FL (i.e., the displacement $X_L$ of the second lower arm 46 provided for the front left wheel 12FL) based on the detected value detected by the sprung-portion acceleration sensor 196 (provided for the portion of the vehicle body 14 which corresponds to the front left wheel 12FL) and the vehicle height H. When the preview gain G is larger than 0 (zero), step S6b is implemented to obtain the target elastic force (target vertical force) $F_B^*$ based on the unsprung-portion displacement $X_L$, the elastic modulus K and the preview gain G, then obtain the target rotational angle $\theta_M^*$ based on the target elastic force $F_B^*$, and then obtain the supplied electric current i based on the target rotational angle $\theta_M^*$. When the previewable time $T_P$ is not shorter than the response delay time $T_D$, the control command value is supplied to the inverter 178 of the vertical force generator 24 provided for the rear left wheel 12RL upon elapse of the waiting time $T_Q$. When the previewable time $T_P$ is shorter than the response delay time $T_D$, the control command value is immediately outputted. When the preview gain G is 0 (zero), step S11b is implemented to carry out the ordinary control. Thus, the preview control is applicable to not only control of the damping force but also control of the elastic force. In the present embodiment, the vertical force generator functions as an elastic force generator and the vertical force controller functions as an elastic-force controlling portion.

The target elastic force $F_B^*$ may be provided by a value dependent on the displacement $X_U$ ($F_B^*=G\cdot K\cdot X_U$) or a value dependent on the relative displacement Xs of the sprung and unsprung portions, i.e., the vehicle height ($F_B^*=G\cdot K\cdot Xs$). The preview control can be carried out substantially in the same manner as in the above-described embodiment.

In the above-described embodiments, the vertical force is controlled by controlling the vertical force generator 24. However, the damping force can be controlled by controlling the shock absorber 22. In the present embodiment, the damping force is controlled in accordance with the skyhook damper theory. An example of the control will be described with reference to flow charts of FIGS. 27 and 28. The same step numerals will be used to represent steps having the same procedures as those in the flow charts of FIGS. 17 and 21, and description of these steps will be omitted. In the present embodiment, it is judged whether the frequency of vibration of the vehicle body 14 as the sprung portion is equal to or lower than the ordinarily-controllable maximum frequency. In the ordinary control represented in the flow chart of FIG. 28, where the controlled wheel is provided by the front left wheel 12FL, the sprung-portion acceleration $G_U$ in the form of the acceleration of the portion of the vehicle body 14 that corresponds to the front left wheel 12FL and the distance H between the sprung and unsprung portions are obtained. Then, the frequency f of the vehicle body 14 is obtained in step S105b, and it is judged whether the obtained frequency f is equal to or lower than the ordinarily-controllable maximum frequency $f_D$. The frequency f may be obtained based on either the sprung-portion acceleration or the sprung-portion absolute velocity. For example, as described above, the frequency f can be obtained based on the fact that the vehicle body 14 is positioned in a position that maximizes an absolute value of the amplitude when the sprung-portion absolute velocity is 0 (zero), or can be obtained by using Fourier transform. When the obtained frequency f is equal to or lower than the ordinarily-controllable maximum frequency $f_D$, a positive judgment (YES) is obtained in step S106b and the control flow goes to step S103d that is implemented to obtain the sprung-portion absolute velocity $V_U$ and the sprung/unsprung-portions relative velocity $V_S$. Then, in steps S104d-104f, the target damping coefficient C* is obtained. Specifically described, step S104d is implemented to judge whether a product of the sprung-portion absolute velocity $V_U$ and the sprung/unsprung-portions relative velocity $V_S$ is a positive value or not. When the product is a positive value ($V_U\cdot V_S>0$), the target damping coefficient C* is set to a value ($G_0\cdot C\cdot V_U/V_S$) in step S104e, wherein "$G_0$" represents the gain used for the ordinary control, and "C" is a constant value. When the product is a negative value ($V_U\cdot V_S<0$), the target damping coefficient C* is set to a small value $C_{MIN}$ in step S104f. Then, step S104g is implemented to obtain the supplied electric current i that establishes the target damping coefficient C*, and step S107 is implemented to output the control command value. In the present embodiment, the electric current is supplied to the electric motor 90 irrespective of increase and reduction of the damping coefficient. Therefore, the supplied electric current i corresponds to the control command value, and the control command value is outputted to the inverter 222. The electric power consumed by the electric motor 90 is small.

Figure 27:
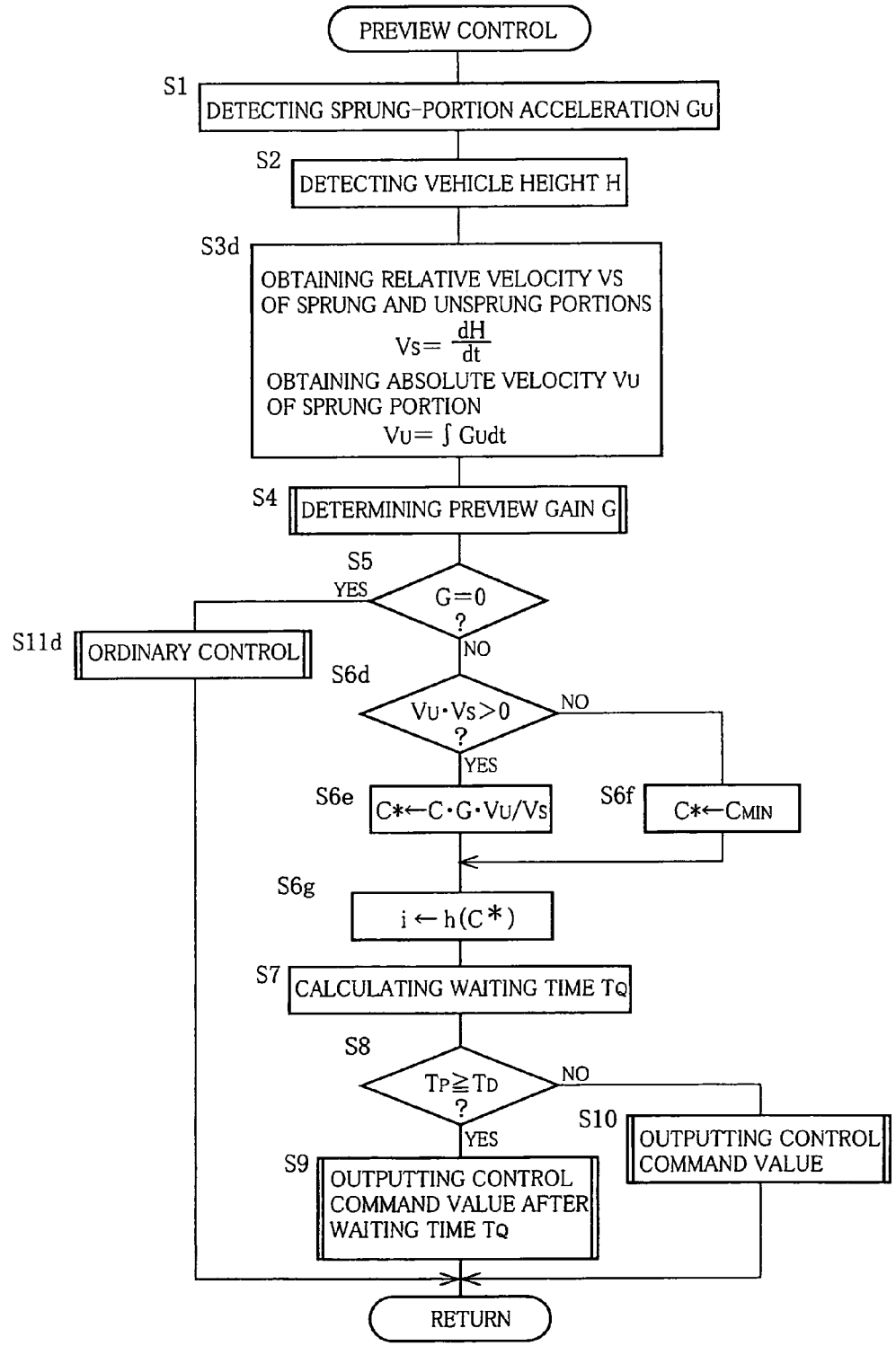
FIG. 27 is a flow chart showing a preview controlling routine program that is stored in a storage portion of an absorber control unit that is included in the suspension system.
Figure 28:
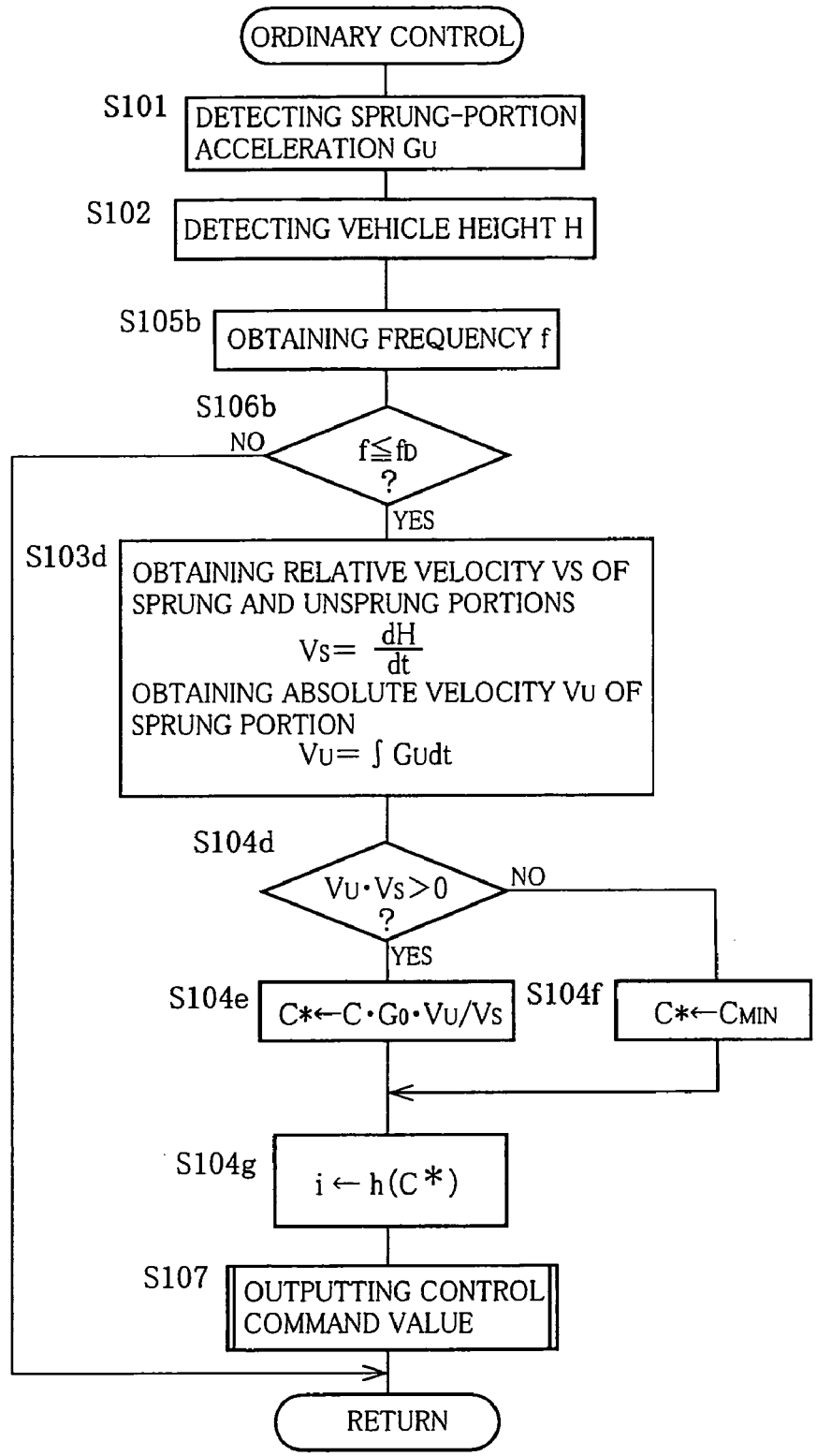
FIG. 28 is a flow chart showing an ordinary controlling routine program as a sub-routine program of the preview controlling routine program of FIG. 27.

In the preview control represented by the flow chart of FIG. 27, where the controlled wheel is provided by the rear left wheel 12RL, the sprung-portion acceleration $G_U$ in the form of the acceleration of the portion of the vehicle body 14 that corresponds to the front left wheel 12FL and the distance H between the portion of the portion of the vehicle body 14 that corresponds to the front left wheel 12FL and the second lower arm 46 provided for the front left wheel 12FL are obtained. After the sprung-portion absolute velocity $V_U$ and the sprung/unsprung-portions relative velocity $V_S$ are obtained in step S3d, step S4 is implemented to determine the preview gain G. When the determined preview gain G is not 0 (zero), steps S6d-S6h are implemented to determine the damping coefficient. When the product of the sprung-portion absolute velocity $V_U$ and the sprung/unsprung-portions relative velocity $V_S$ is a positive value, the target damping coefficient C* is set to a value ($G\cdot C\cdot V_U/V_S$). When the product is a negative value, the target damping coefficient C* is set to a value $C_{MIN}$. Then, step S6g is implemented to determine the supplied electric current i based on the target damping coefficient C*. When the previewable time $T_P$ is not shorter than the response delay time $T_D$, the control command value i is outputted upon elapse of the waiting time $T_Q$. When the previewable time $T_P$ is shorter than the response delay time $T_D$, the control command value i is outputted immediately. On the other hand, when the determined preview gain G is 0 (zero), the control flow goes to step S11d that is implemented to carry out the ordinary control, so that the damping-characteristic controlling device 56 provided for the rear left wheel 12RL is controlled based on the vertical behavior of the rear left wheel 12RL in accordance with the flow chart of FIG. 28. The target damping coefficient C* is set to a value dependent on the sprung-portion absolute velocity $V_U$ in the form of the absolute velocity of the portion of the vehicle body 14 that corresponds to the rear left wheel 12RL and the sprung/unsprung-portions relative velocity $V_S$ in the form of the relative velocity of the portion of the vehicle body 14 that corresponds to the rear left wheel 12RL and the second lower arm 46 provided for the rear left wheel 12RL.

As compared with the above-described embodiments in which the vertical force generator 24 as a controllable device is controlled, a controllable maximum frequency is higher in the present embodiment in which the damping-characteristic controlling device 56 as a controllable device is controlled, because the response delay time of the damping-characteristic controlling device 56 is shorter than that of the vertical force generator 24. That is, in the present embodiment, the ordinarily-controllable maximum frequency $f_D$ is relatively high, and the response delay time. $T_D$ and the limit time $T_L$ are relatively short. Therefore, the ordinary control is performed even in case of vibration of higher frequency in the control of the damping-characteristic controlling device 56, than in the control of the vertical force generator 24. In other words, the suspension is effectively controllable by the ordinary control over a wider range of vibration frequency, namely, a positive judgment (YES) is more probably or more frequently obtained in step S106b in the flow chart of FIG. 28. Further, the preview gain G is set to 1 (one) even in case of higher running speed of the vehicle in the control of the damping-characteristic controlling device 56, than in the control of the vertical force generator 24. Thus, the preview control is effectively performable over a wider range of running speed of the vehicle. Further, the preview control is performed even in case of higher running speed of the vehicle in the control of the damping-characteristic controlling device 56, than in the control of the vertical force generator 24, namely, a positive judgment (YES) is less probably or less frequently obtained in step S55 in the flow chart of FIG. 27.

The preview control is performed for the shock absorber 22 even when the running speed V is so high that the preview control cannot be performed for the vertical force generator 24, so that the vertical vibration of the rear-wheel side portion can be satisfactorily suppressed by the control of the shock absorber 22 even during running of the vehicle at the high speed V. Further, the preview control is performed for the shock absorber 22 even when the vibration frequency is so high that the preview control cannot be performed for the vertical force generator 24, so that the vertical vibration can be satisfactorily suppressed by the control of the shock absorber 22 even in presence of the vibration of high frequency.

Figure 29:
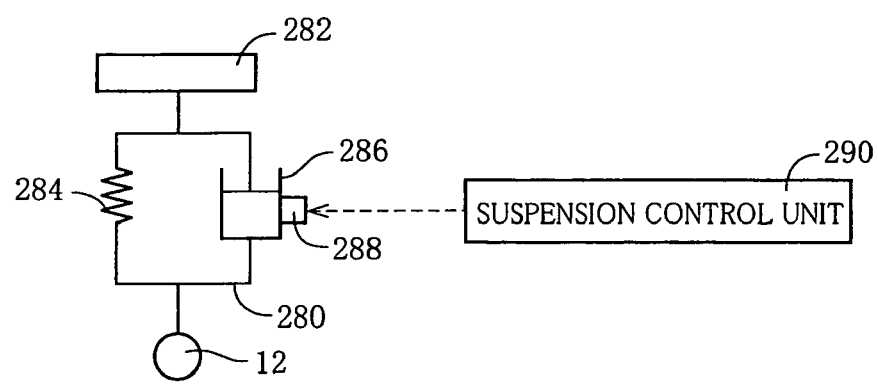
FIG. 29 is a view conceptually showing another suspension included in the suspension system.

The control of the shock absorber is applicable also to a suspension that is conceptually shown in FIG. 29, in which a coil spring 284 and a shock absorber 286 are provided in parallel with each other between an unsprung portion 280 (that holds the wheel 12) and a sprung portion 282 without provision of the vertical force generator 24. The shock absorber 286 includes a damping-characteristic controlling device 288 that is controlled in accordance with commands supplied from a suspension control unit 290, in substantially the same manner as in the above-described embodiment.

Figure 30:
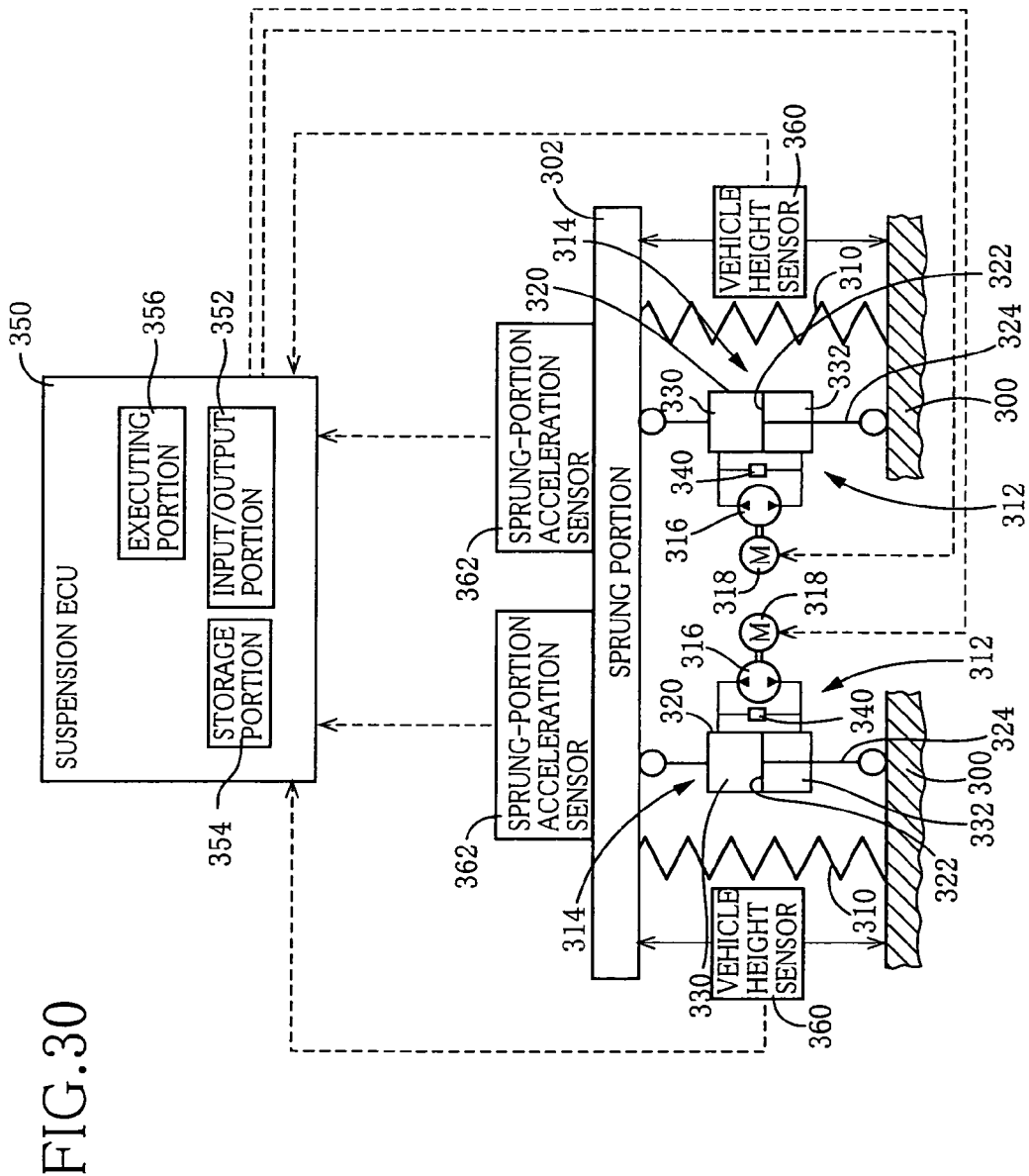
FIG. 30 is a view conceptually showing still another suspension included in the suspension system.

Further, the present invention is also applicable to a suspension, as shown in FIG. 30, in which a coil spring 310 and a hydraulic cylinder device 312 are provided in parallel with each other between an unsprung portion 300 and a sprung portion 302. The hydraulic cylinder device 312 includes a hydraulic cylinder 314, a pump 316 and an electric motor 318. The hydraulic cylinder 314 includes a housing 320, a piston 322 that is fluid-tightly and slidably fitted in the housing 320 and a piston rod 324 connected to the piston 322. The piston rod 324 is rockably connected to the unsprung portion 300 while the housing 320 is rockably connected to the sprung portion 302. An inner space of the housing 320 is partitioned, by the piston 322, into two fluid chambers 330, 332 that are connected to the pump 316, so that a working fluid can be pumped by the pump 316 from one of the two fluid chambers 330, 332 so as to be supplied to the other, and can be pumped by the pump 316 from the other of the two fluid chambers 330, 332 so as to be supplied to the one, whereby fluid pressures within the respective fluid chambers 330, 332 and stroke of the piston 322 are controllable. A working-fluid compensator 340 is provided in parallel with the hydraulic cylinder 314.

The electric motor 318 is controlled in accordance with commands supplied from a suspension ECU 350 including a controller that is principally constituted by a computer having an input/output portion 352, a storage portion 354 and an executing portion 356. To the input/output portion 352, there are connected vehicle height sensors (vertical stroke sensors) 360, sprung-portion acceleration sensors 362 and pump motors 318. The vehicle height sensors 360 and the sprung-portion acceleration sensors 362 are provided for the respective wheels 12FR, 12FL, 12RR, 12RL. The pump motors 318 are provided for the respective wheels 12FR, 12FL, 12RR, 12RL, and are connected to the input/output portion 352 via respective drive circuits (not shown). The storage portion 354 stores therein, for example, a plurality of tables and programs.

In the present embodiment, the electric motor 318 of the hydraulic cylinder device 312 is controlled to generate a vertical force as a sum of an elastic force dependent on the unsprung-portion absolute velocity and a damping force based on skyhook damper theory. The vertical force corresponds to the hydraulic pressure generated by the hydraulic cylinder device 312. As in the above-described embodiment, since the load applied to the wheel is received by the coil spring 310 and the hydraulic cylinder device 312, there is a certain relationship between the hydraulic pressure generated by the hydraulic cylinder device 312 and an amount of displacement of the piston 322 from its reference position (in which the piston 322 is positioned when the electric motor 318 is placed in a free state). Therefore, upon determination of the target value of the vertical force, the pump motor 318 is activated for establishing the amount of displacement of the piston 322 corresponding to the target vertical force. In the present embodiment, the target vertical force $F_B^*$ is adapted to be equal to a sum of the elastic force dependent on displacement of the unsprung portion 300 and the damping force dependent of absolute velocity of the sprung portion 302.

Figure 31:
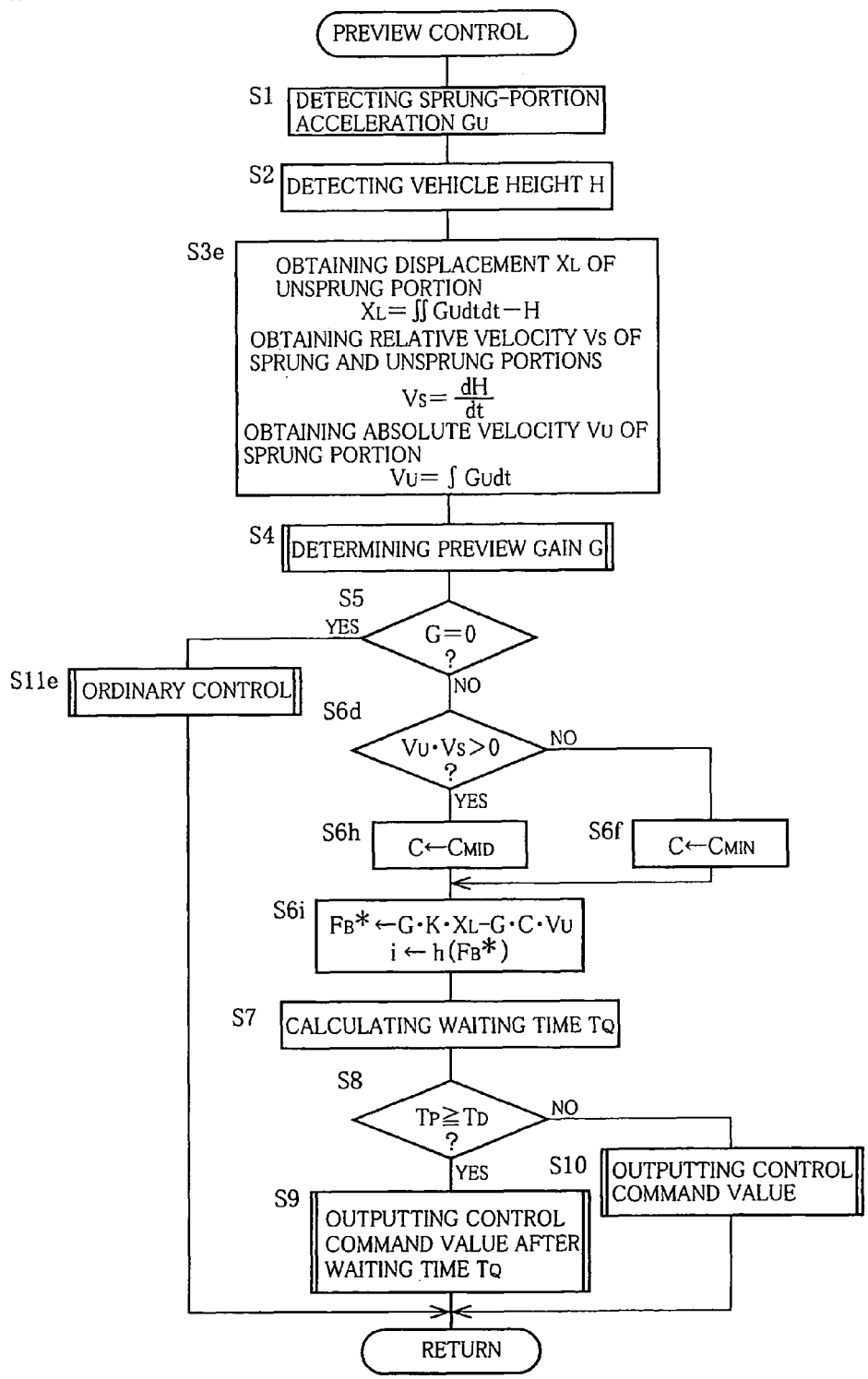
FIG. 31 is a flow chart showing a preview controlling routine program that is stored in the storage portion of the suspension control unit that is included in the suspension system.

An example of the control of the electric motor 318 of the hydraulic cylinder device 312 will be described with reference to flow charts of FIGS. 31 and 32. The same step numerals will be used to represent steps having the same procedures as those the above-described embodiments (in the flow charts of FIGS. 17 and 21 and the flow charts of FIGS. 27 and 28), and description of these steps will be omitted. FIG. 31 is a flow chart showing a preview controlling routine program that is to be executed. Where the controlled wheel is provided by the rear left wheel 12RL, step S1 is implemented to obtain the sprung-portion acceleration GU in the form of acceleration of a portion of the vehicle body 14 which corresponds to the front left wheel 12FL. In step S2, the distance H between the portion of the vehicle body 14 which corresponds to the front left wheel 12FL and the second lower arm 46 provided for the front left wheel 12FL is obtained. Then, step S3e is implemented to obtain the sprung-portion absolute velocity $V_U$, sprung/unsprung-portions relative velocity $V_S$ and sprung-portion absolute velocity $V_L$, so that the preview gain G is determined in step S4 in substantially the same manner as in the above-described embodiments. When the preview gain G is not 0 (zero), step S6d is implemented to judge whether a product of the sprung-portion absolute velocity $V_U$ and sprung/unsprung-portions relative velocity $V_S$ is a positive value or a negative value. When the product is a positive value, the damping coefficient C is set to a predetermined value $C_{MID}$ in step S6h. When the product is a negative value, damping coefficient C is set to a predetermined value $C_{MIN}$ in step S6f. Then, in step S6i, the target vertical force $F_B^*$ is determined in accordance with the following expression:

$$F_B^* = (G \cdot K \cdot X_L) + (-G \cdot C \cdot V_U),$$

where "K" represents a spring constant of the coil spring 310. Then, in this step S6i, the electric current i that is to be supplied to the electric motor 318RL is determined. As in the above-described embodiments, when the previewable time $T_P$ is not shorter than the response delay time $T_D$, the control command value is outputted upon elapse of the waiting time $T_Q$. When the previewable time $T_P$ is shorter than the response delay time $T_D$, the control command value is immediately outputted. In the present embodiment, since the electric power consumed by the electric motor 318 is large, it is preferable that the electric current is not supplied to the motor 318 when the absolute value of the target vertical force $F_B^*$ is held unchanged or reduced, as in the control of the vertical force generator 24.

Figure 32:
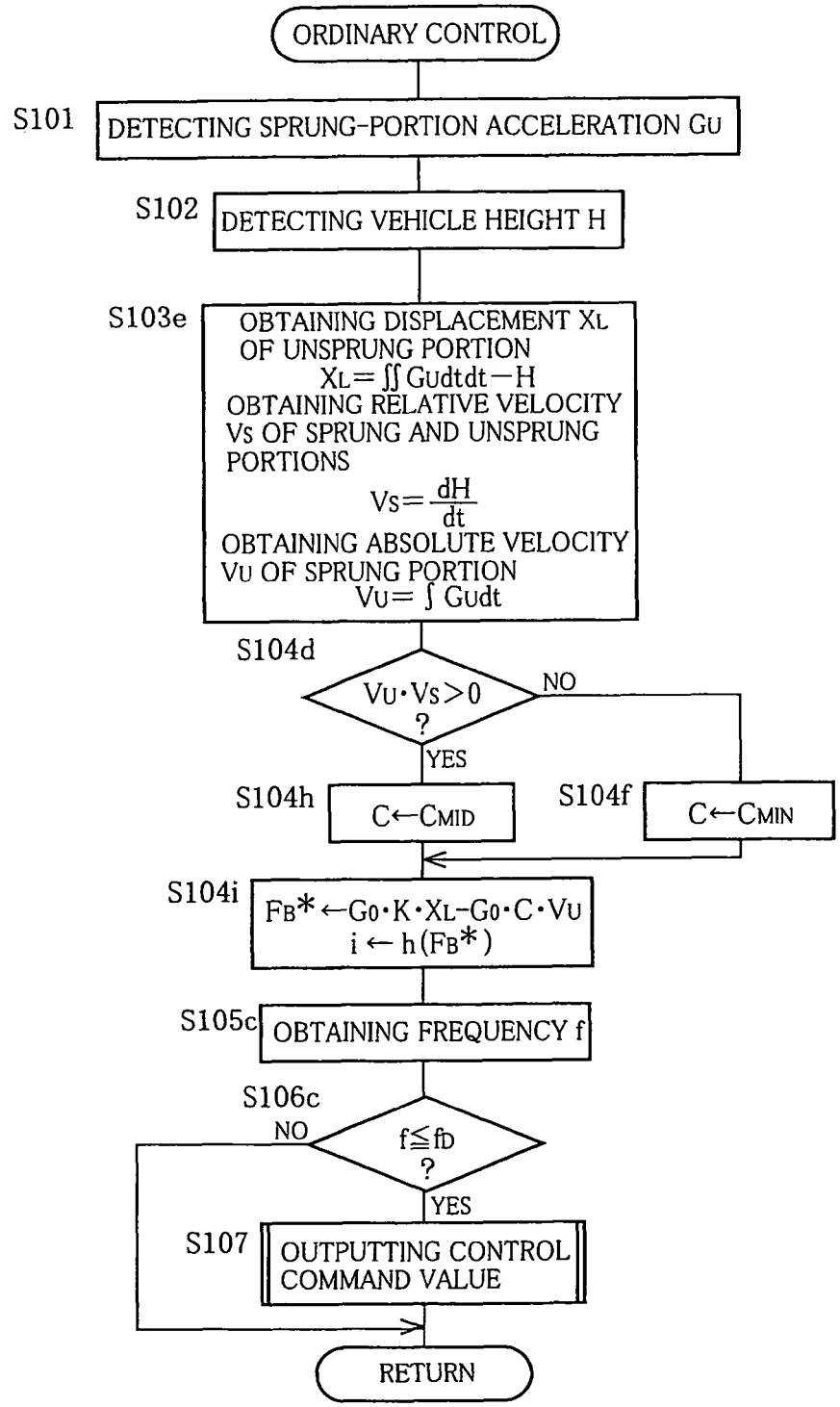
FIG. 32 is a flow chart showing an ordinary controlling routine program as a sub-routine program of the preview controlling routine program of FIG. 31.

On the other hand, when the preview gain G is 0 (zero), the control flow goes to step S11e that is implemented to control the electric motor 318RL of the hydraulic cylinder device 312RL provided for the rear left wheel 12RL, based on the vertical behavior of the rear left wheel 12RL, so as to carry out the ordinary control according to the flow chart of FIG. 32. In step S103e, the unsprung-portion displacement $X_L$ and the sprung-portion absolute velocity $V_U$ are obtained based on the sprung-portion acceleration and the vehicle height. In steps S104d, 104f, 104h, the damping coefficient is determined. In step S104i, the target vertical force $F_B^*$ is determined in accordance with the expression:

$$F_B^* = (-G_0 \cdot K \cdot X_L) + (-G \cdot C \cdot V_U),$$

where "$G_0$" represents the gain as a fixed value used for the ordinary control.

Further, in this step S104i, the supplied electric current i is determined based on the target vertical force $F_B^*$. Then, in step S105c, the vibration frequency is calculated based on the unsprung-portion absolute velocity $V_L$, and is calculated also based on the sprung-portion absolute velocity $V_U$, namely, a value of the vibration frequency based on the unsprung-portion absolute velocity $V_L$ and a value of the vibration frequency based on the sprung-portion absolute velocity $V_U$ are both obtained. In step S106c, it is judged whether a higher one of the two values of the vibration frequency is equal to or lower than the ordinarily-controllable maximum frequency fn. When the higher one of the values of the vibration frequency is not higher than the ordinarily-controllable maximum frequency $f_D$, the control command value is immediately outputted. It is noted that, in step S105c, the two values of the vibration frequency do not necessarily have to be obtained, and the vibration frequency may be calculated based on either the unsprung-portion absolute velocity $V_L$ or the sprung-portion absolute velocity $V_U$.

In the present embodiment, the vertical force, which is to be generated, corresponds to the sum of the elastic force dependent on the unsprung-portion displacement and the damping force dependent on the sprung-portion absolute velocity. Thus, it is possible to perform both of the unsprung-portion vibration suppressing control and the skyhook control, leading to satisfactory suppressing of the vertical vibration and improvement of the ride comfort of the vehicle. Further, since the preview control is performed for the hydraulic cylinder device 312R provided for each rear wheel 12R, the response delay time can be made small or zeroed thereby making it possible to satisfactorily suppress the vertical vibration of the rear-wheel side portion.

The target vertical force $F_B^*$ does not necessarily have to be the above-described sum of the elastic force and the damping force, but may be a value determined in accordance with either one of the following expressions:

$$F_B^* = G \cdot K \cdot X_L$$

$$F_B^* = -G \cdot C \cdot V_U$$

Further, the target vertical force $F_B^*$ may be a value determined also in accordance with the any one of the following expressions:

$$F_B^* = G \cdot C \cdot V_L$$

$$F_B^* = G \cdot K \cdot X_U$$

$$F_B^* = G \cdot C \cdot V_S$$

Moreover, the target vertical force $F_B^*$ may be a sum of two or more values determined in accordance with two or more of the above expressions.

Figure 33:
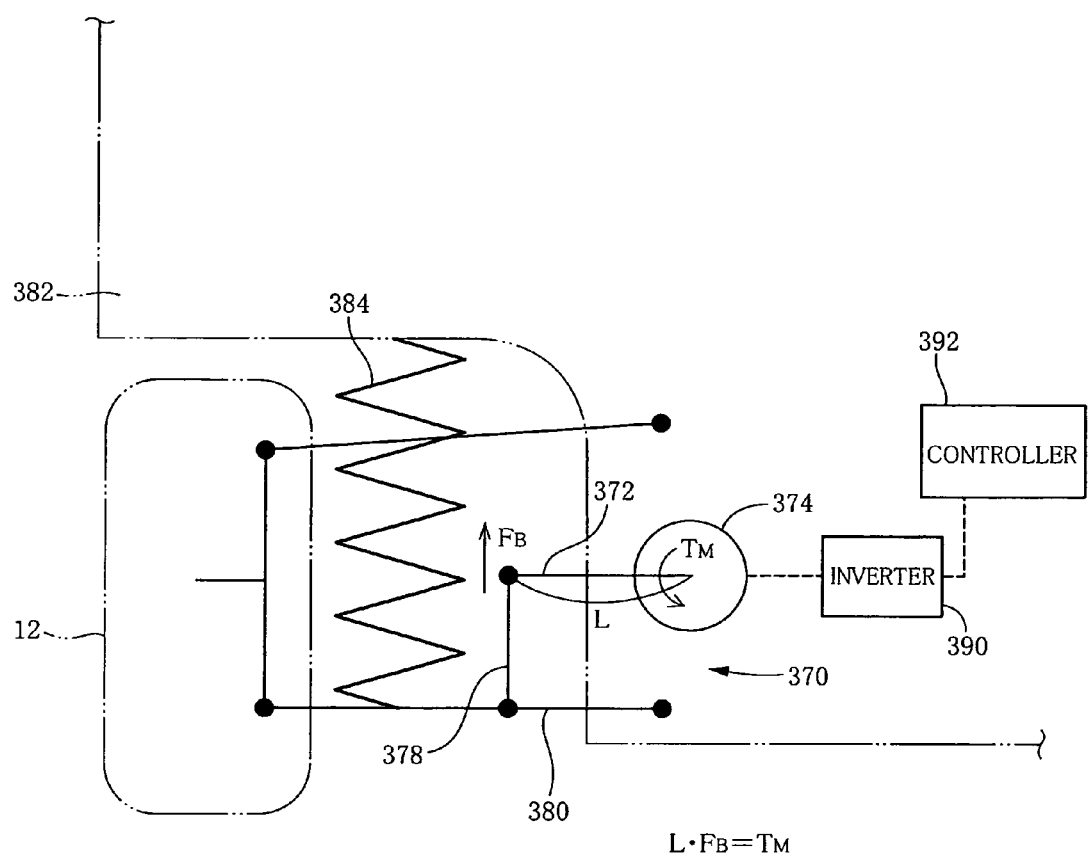
FIG. 33 is view conceptually showing another suspension included in the suspension system.

Further, the present invention is applicable also to control of a suspension shown in FIG. 33. In the present embodiment, a vertical force generator 370 includes a straight rod 372 in placed of the L-shaped bar. The straight rod 372 is connected at one of its opposite end portions to an actuator 374, and is connected at the other of its opposite end portions to an unsprung portion 380 via a linkage member 378. The actuator 374 is attached to a sprung portion 382 in the form of the vehicle body. The straight rod 372 is disposed between the sprung portion 382 and the unsprung portion 380. A coil spring 384 also is disposed between the sprung portion 382 and the unsprung portion 380 so that the coil spring 384 and the straight rod 372 as an elastic member are disposed in parallel with each other. The actuator 374 includes an electric motor and a speed reducer, such that the rod 372 is connected to an output shaft of the electric motor via the speed reducer so as to receive a motor torque $T_M$ that is applied by activation of the electric motor. Further, since a bending movement $L \cdot F_B^*$ applied to the straight rod 372 becomes equal to the motor torque $T_M$ applied to the rod 372, a reaction force $F_B^*$ can be obtained in accordance with the following expression:

$$F_B^* = T_M / L$$

The reaction force $F_B^*$ is a force acting against the force $F_B^*$ that is applied to the unsprung portion 380 by the vertical force generator 370. The actuator 374 is connected, via an inverter 390, to a controller 392 that is principally constituted by a computer. As in the above-described embodiments, for example, the sprung-portion acceleration sensors, vehicle height sensors, wheel-turning amount sensors, operating-amount sensor and brake ECU are connected to the controller 392. The inverter 390 is controlled based on commands supplied from the controller 392, so as to control an output torque of the electric motor 374. In the present embodiment, a suspension control unit is constituted by the controller 392 and the inverter 390. As in the above-described embodiments, the target vertical force $F_B^*$ may be determined as needed, and the vertical force can be controlled by controlling the torque $T_M$ of the electric motor 374.

Figure 34:
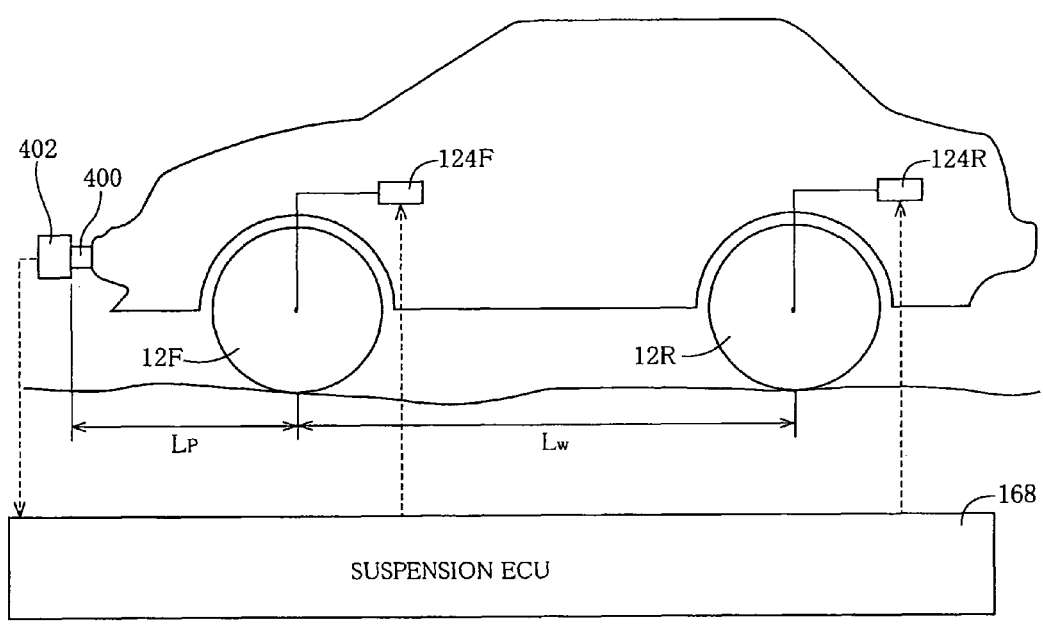
FIG. 34 is a view conceptually showing an entirety of a vehicle equipped with a suspension controller that is constructed according to another embodiment of the invention.
Figure 35:
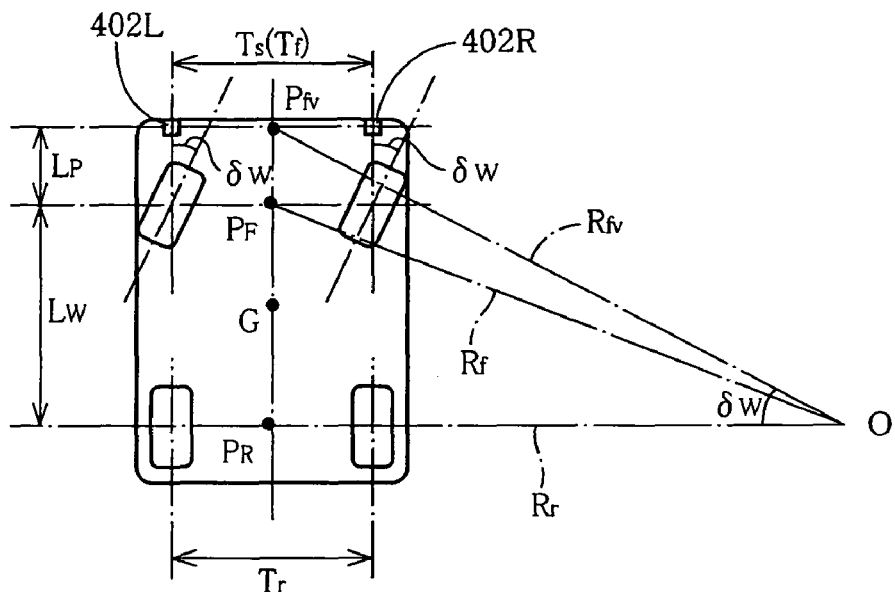
FIG. 35 is a view showing a relationship between a turning radius of each wheel of the vehicle, a turning angle of each front wheel of the vehicle and a wheel base of the vehicle.

In the above-described embodiments, the preview control is performed for the suspension provided for the rear wheel 12R, based on the detected values provided by the sensors 196F, 198F configured to detect the vertical behavior of the front-wheel side portion. However, the present invention is applicable also to an arrangement, as shown in FIG. 34, in which the suspension provided for the front wheel 12F and the suspension provided for the rear wheel 12R are subjected to the preview control that is performed based on a detected value or values supplied from a road surface sensor 402 that is provided in a front bumper 400 of the vehicle. The road surface sensor 402 may be configured to detect projections and recesses on a road surface, for example, by supersonic wave. Specifically described, the supersonic wave is first transmitted by the sensor 402 toward the road surface, and the supersonic wave reflected from the road surface is then received, so that a distance to the road surface can be obtained based on a length of time from transmission of the supersonic wave to reception of the returned supersonic wave. The projections and recesses on the road surface are obtained based on the obtained distance. As shown in FIG. 35, the road surface sensor 402 is provided in each of two portions of the bumper 400, one (402R) of which is located on a front side of the front right wheel 12FR and the other (402L) of which is located on a front side of the front left wheel 12FL. A detected portion of the road surface detected by each of the road surface sensors 402R, 402L is located substantially right below position of a corresponding one of the road surface sensors 402R, 402L during standstill of the vehicle. Therefore, when the preview gain is to be obtained, it is necessary to take account of a distance from the position of the road surface sensor 402 to the controlled wheel, the preview time dependent on the vehicle running speed and the overlap of the detected portion and a portion of the road surface over which the controlled wheel passes. It is noted that the above-described distance is represented by a distance $L_P$ where the controlled wheel is provided by the front wheel, and is represented by a distance ($L_P+L_W$) where the controlled wheel is provided by the rear wheel, as shown in FIG. 34.

Where the controlled wheel is provided by each front wheel 12F, a distance, as measured in the longitudinal direction of the vehicle, between each of the road surface sensors 402R, 402L and a corresponding one of the front right and left wheels 12FR, 12FL is the above-described distance $L_P$, as measured in the longitudinal direction, between a line extending in the lateral direction of the vehicle and passing through the pair of road surface sensors 402 and an axis of axle of the corresponding one of the front right and left wheels 12FR, 12FL. The previewable time $T_P$ can be obtained by dividing the distance $L_P$ by the running speed V ($T_P=L_P/V$). Where the controlled wheel is provided by each rear wheel 12R, a sum of the above-described distance $L_P$ and wheel base $L_W$ corresponds to a distance between each of the road surface sensors 402R, 402L and a corresponding one of the rear right and left wheels 12RR, 12RL. Consequently, the previewable time $T_P$ is expressed by the following expression:

$$T_P=(L_P+L_W)/V$$

Then, the running-speed-basis gain $G_V$ can be obtained through substantially the same procedures as in the above-described embodiments.

The turning radius of the front-wheel side portion, the turning radius of the rear-wheel side portion, the turning radius of each front wheel as the inside or outside wheel and the turning radius of each rear wheel as the inside or outside wheel can be obtained substantially in the same manner as in the above-described embodiments. The path of the detected portion can be considered to be the same to the path of a corresponding one of the road surface sensors 402R, 402L. The path of the road surface sensor 402 may be provided by a path of a certain point of each of the road surface sensors 402R, 402L, a path of a point intermediate between the road surface sensors 402R, 402L and a path of a center point Pfv of a front portion of the vehicle. The center point Pfv is an intersection Pfv of a vertical surface and a line passing through the pair of road surface sensors 402R, 402L during standstill of the vehicle on a horizontal road surface, wherein the vertical surface contains a line passing through the center G of gravity of the vehicle and extending in the longitudinal direction. Where the path is considered as succession of points on the road surface, the path of the center point Pfv may be defined by succession of points on the road surface, onto each of which the center point Pfv is projected. In the following description, the path (turning radius) of the center point Pfv is referred to as path (turning radius) of a sensor-side portion. As shown in FIG. 35, the turning radius of the sensor-side portion can be obtained according to the following expression:

$$Pfv=(L_P+L_W)/\sin \delta w \cdot 10^{-3}$$

Since the distance $L_P$ is considerably small relative to the turning radius Rfv, a central angle (Pfv-O-PR) can be regarded to be the same to the absolute value $\delta_W$ of the turning angle of the steerable wheel.

Where the controlled wheel is provided by each front wheel 12F, the turning radius difference (path difference) between the road surface sensor 402 provided in an inside-wheel side portion of the vehicle and the front wheel 12F as the inside wheel can be obtained in accordance with the following expression:

$$\Delta Rfin=(Rfv-Ts/2)-(Rf-Tf/2)=Rfv-Rf$$

The turning radius difference (path difference) between the road surface sensor 402 provided in an outside-wheel side portion of the vehicle and the front wheel 12F as the outside wheel can be obtained in accordance with the following expression:

$$\Delta Rfout=(Rfv+Ts/2)-(Rf+Tf/2)=Rfv-Rf$$

Figure 36A:
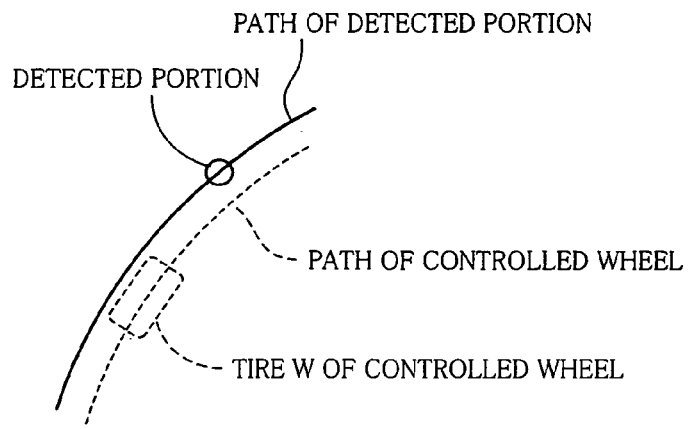
FIG. 36A is a view showing a path of a detected portion (as a portion of a road surface) and a path of wheel of the vehicle.
Figure 36B:
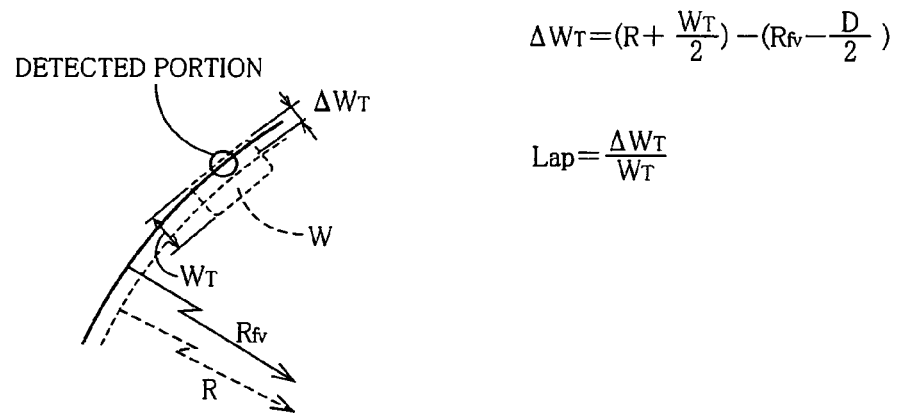
FIG. 36B is a view showing overlap of the detected portion and a portion of the road surface over which the wheel is supposed to pass.

In the above expressions, "Ts" is a distance between the pair of road surface sensors 402, and is equal to the wheel tread Tf of the front wheels 12F in the present embodiment. Where the detected portion detected by the road surface sensor 402 is defined by a circle having a diameter D, as shown in FIGS. 36A and 36B, the overlap width $\Delta W_T$ can be obtained in accordance with the following expression (7):

$$\Delta W_T=(Rf+W_T/2)-(Rfv-D/2)=(W_T/2+D/2)-\Delta R \quad (7)$$

The overlap ratio Lap can be obtained in accordance with the expression (Lap=$\Delta W_T/W_T$).

Where the controlled wheel is provided by each rear wheel 12R, the turning radius difference (path difference) between the road surface sensor 402 provided in the inside-wheel side portion of the vehicle and the rear wheel 12R as the inside wheel can be obtained in accordance with the following expression:

$$\Delta R^{Rrin}=(Rfv-Ts/2)-(Rr-Tr/2)=Rfv-[Rr+(Ts-Tr)/2]$$

The turning radius difference (path difference) between the road surface sensor 402 provided in the outside-wheel side portion of the vehicle and the rear wheel 12R as the outside wheel can be obtained in accordance with the following expression:

$$\Delta Rrout=(Rfv+Ts/2)-(Rr+Tr/2)=Rfv-[Rr(Ts-Tr)/2]$$

The overlap width $\Delta W_T$ can be obtained in accordance with the following expression (8):

$$\Delta W_T=(Rr+W_T/2)-(Rfv-D/2)=(W_T/2+D/2)-\Delta R \quad (8)$$

The overlap ratio Lap can be obtained in accordance with the expression (Lap=$\Delta W_T/W_T$). As in the above-described embodiments, the turning-state-basis gain $G_R$ is obtained based on the overlap ratio Lap, and then the preview gain G is obtained.

Where a region of the detected portion is considerably small so as to be regarded almost as a point, 0 (zero) may be substituted for the diameter D in the above expressions (7), (8). In such a case, it is known from the expressions (7), (8) that the overlap does not exist when the path difference AR is larger than one half (½) of the tire width $W_T$ and that the overlap exists when the path difference $\Delta R$ is not larger than one half (½) of the tire width $W_T$. Further, the overlap width $\Delta W_T$ represents a position of the detected portion relative to a portion of the road surface over which the tire of the wheel passes, i.e., a distance from the position of the detected portion to an outside end of the portion of the road surface (over which an outside one of widthwise opposite ends of the tire of the wheel passes over). When the overlap width $\Delta W_T$ is equal to one half of the tire width $W_T$ (i.e., $\Delta W_T=W_T/2$), the turning radius difference $\Delta R$ is equal to 0 (zero) (i.e., $\Delta R=0$) so that a widthwise central portion of the tire passes over the detected portion. When the overlap width $\Delta W_T$ is close to 0 (zero) (i.e., $\Delta W_T\approx 0$), the turning radius difference $\Delta R$ is equal to one half of the tire width $W_T$ (i.e., $\Delta R=W_T/2$) so that the outside one of the widthwise opposite ends of the tire passes over the detected portion. When the overlap width $\Delta W_T$ is close to the tire width $W_T$ (i.e., $\Delta W_T\approx W_T$), the turning radius difference $\Delta R$ is equal to negative one half of the tire width. $W_T$ (i.e., $\Delta R=W_T/2$) so that an inside one of the widthwise opposite ends of the tire passes over the detected portion. In other words, it is considered that the tire has a larger overlap portion overlapping with the projections and recesses on a portion around the detected portion detected by the road surface sensor 402 when the central portion of the tire passes over the detected portion, than when either one of the widthwise opposite ends of the tire passes over the detected portion. Therefore, the overlap ratio as the ratio of the overlap width $\Delta W_T$ to the tire width $W_T$ can be employed as in the above-described embodiments. That is, also in the present embodiment, it is appropriate that the gain is made larger when the overlap ratio is high than when the overlap ratio is low.

The preview gain can be obtained based on the values as described above in substantially the same manner as in the above-described embodiments. It can be considered that the projections and recesses on the road surface detected by the road surface sensor 402 cause displacement of the unsprung portion that is provided for the controlled wheel. Therefore, based on condition of the projections and recesses, the vertical force generator 24F provided for each front wheel 12F and the vertical force generator 24R provided for each rear wheel 12R can be controlled whereby not only each rear wheel 12R but also each front wheel 12F can be subjected to the preview control. Thus, the vertical vibration of the front-wheel side portion as well as the vertical vibration of the rear-wheel side portion can be satisfactorily suppressed.

In the present embodiment, each of the road surface sensors 402 is configured to sense the projections and recesses on, as the detected portion, a portion of the road surface which is located substantially right below the position of the road surface sensor 402. However, the road surface sensor 402 may be modified to sense the projection and recesses on, as the detected portion, a portion of the road surface which is located on a front or rear side of the position of the road surface sensor 402. In such a modified case, the previewable time is obtained based on the running speed and a distance between the detected portion of the road surface and the axis of the axle of the controlled wheel. Further, values such as the sprung-portion displacement XL, sprung-portion absolute velocity $V_U$ and sprung/unsprung-portions relative velocity $V_S$ can be obtained based on the projections and recesses (causing the unsprung-portion displacement) in a conceptual model, so that the preview control is performed based on the obtained values. Still further, the present embodiment can be carried out also with the suspensions shown in FIGS. 29, 30 and 33.

While the presently preferred embodiments of the invention have been described above in detail by reference to the accompanying drawings, for illustrative purpose only, it is to be understand that the construction of the suspension and the control of the suspension are not limited to the details described above and that that the present invention may be embodied with various other changes, modifications and improvements, such as those described in the SUMMARY OF THE INVENTION, which may occur to those skilled in the art.

The invention claimed is:

1. A suspension controller for controlling, based on at least one value detected by at least one sensor which is provided in a vehicle and which is configured to detect a detected portion, a suspension provided for a wheel of the vehicle which is located on a rear side of the detected portion and which is distant from the detected portion by a longitudinal distance in a longitudinal direction of the vehicle, such that the suspension works in accordance with a control command value that is prepared based on the at least one value detected by the at least one sensor, said suspension controller comprising a gain determiner configured to determine a gain, for controlling the suspension based on the determined gain, wherein said gain determiner is configured to determine the gain such that the determined gain is smaller when a previewable time is shorter than a first threshold length of time, than when the previewable time is not shorter than the first threshold length of time, the previewable time being dependent on the longitudinal distance and a running speed of the vehicle, the first threshold length of time being dependent on a response delay time by which initiation of working of the suspension in accordance with the control command value is to be retarded after output of the control command value supplied to the suspension, wherein said gain determiner includes a constant-value setting portion by which the gain is set to a predetermined constant value when the previewable time is not shorter than the first threshold length of time, wherein said gain determiner includes a reduced-value setting portion by which the gain is set to a value that is reduced with reduction of the previewable time when the previewable time is shorter than the first threshold length of time, and wherein said gain determiner includes a zero setting portion by which the gain is set to zero when the previewable time is not longer than a second threshold length of time that is shorter than the first threshold length of time.

2. The suspension controller according to claim 1, comprising a preview controlling portion configured, when the previewable time is not shorter than the first threshold length of time, to output the control command value, upon elapse of a given time from a point of time at which the at least one detected value is obtained, the given time being a length of time obtained by subtracting the response delay time from the previewable time.

3. The suspension controller according to claim 1, wherein said gain determiner includes a wheel-turning-angle-basis determining portion configured to determine the gain, such that the determined gain is smaller when an absolute value of a turning angle of a steerable wheel of the vehicle is large, than when the absolute value of the turning angle of the steerable wheel is small.

4. The suspension controller according to claim 1, wherein the suspension is disposed between a sprung portion of the vehicle and an unsprung portion of the vehicle that holds the wheel, and which includes a vertical force generator configured to generate a vertical force, said suspension controller comprising a vertical force controller configured to control said vertical force generator based on the at least one value detected by said at least one sensor and the gain determined by said gain determiner.

5. The suspension controller according to claim 4, wherein the vertical force generator includes a damping force generator configured to generate a damping force, wherein said vertical force controller includes a target-damping-force determining portion and a damping-force controlling portion, wherein said target-damping-force determining portion is configured to estimate, based on the at least one detected value, at least one of an absolute vertical velocity of the sprung portion, an absolute vertical velocity of the unsprung portion and a relative vertical velocity of the sprung and unsprung portions, and to determine a target damping force based on the gain and the at least one of the vertical velocities, and wherein said damping-force controlling portion is configured to control said damping force generator such that said damping force generator outputs the target damping force determined by said target-damping-force determining portion.

6. The suspension controller according to claim 4,
wherein the vertical force generator includes an elastic force generator configured to generate an elastic force,
wherein said vertical force controller includes a target-elastic-force determining portion and an elastic-force controlling portion,
wherein said target-elastic-force determining portion is configured to estimate, based on the at least one detected value, at least one of a vertical displacement of the sprung portion, a vertical displacement of the unsprung portion and a relative vertical displacement of the sprung and unsprung portions, and to determine a target elastic force based on the gain and the at least one of the vertical displacements,
and wherein said elastic-force controlling portion is configured to control the elastic force generator such that said elastic force generator outputs the target elastic force determined by said target-elastic-force determining portion.

7. The suspension controller according to claim 4,
wherein the vertical force generator includes an elastic member having opposite end portions such that one of said opposite end portions is connected to the sprung portion while the other of said opposite end portions is connected to the unsprung portion,
wherein the vertical force generator includes a drive source configured to elastically deform the elastic member against a restoring force of the elastic member,
and wherein said vertical force controller includes an elastic-deformation-amount controlling portion configured to control an amount of elastic deformation of the elastic member by controlling the drive source, so as to control the vertical force.

8. The suspension controller according to claim 7,
wherein the elastic member is a generally L-shaped bar including a laterally extending portion extending in a lateral direction of the vehicle and a non-parallel portion that extending in a direction that is not parallel with the lateral direction,
and wherein the drive source includes an electric motor configured to rotate one of the laterally extending and non-parallel portions about an axis thereof.

9. The suspension controller according to claim 7,
wherein the elastic member is a rod extending in a lateral direction of the vehicle or in a direction that is not parallel with the lateral direction,
and wherein the drive source includes an electric motor configured to apply a bending moment to the rod.

10. The suspension controller according to claim 4,
wherein the vertical force generator includes a first elastic member disposed in parallel with a suspension spring that serves as a second elastic member,
and wherein said suspension spring as well as said first elastic member is disposed between the sprung portion and the unsprung portion.

11. The suspension controller according to claim 4,
wherein said at least one sensor includes (i) an acceleration sensor configured to detect a vertical acceleration of a portion of the sprung portion which is included in a front-wheel side portion of the vehicle located on a side of a front wheel of the vehicle, and (ii) a stroke sensor configured to detect a relative stroke of the portion of the front-wheel side portion and a portion of the unsprung portion which is included in the front-wheel side portion of the vehicle,
and wherein said vertical force controller includes a sprung-portion-basis controlling portion configured to control the vertical force generator provided for a rear wheel of the vehicle, based on the gain, the detected vertical acceleration and the detected relative stroke.

12. The suspension controller according to claim 4,
wherein said at least one sensor includes a road surface sensor configured to detect projections and recesses of a road surface, which are located on a front side of an axle of a front wheel of the vehicle during standstill of the vehicle,
and wherein said vertical force controller includes at least one of (a) a road-surface-basis front-wheel-side controlling portion configured to control, based on the gain and the detected projections and recesses of the road surface, the vertical force generator provided for the front wheel, and (b) a road-surface-basis rear-wheel-side controlling portion configured to control, based on the gain and the detected projections and recesses of the road surface, the vertical force generator provided for a rear wheel of the vehicle.

13. The suspension controller according to claim 1,
wherein the gain is set to zero by said zero setting portion when the previewable time is not longer than the second threshold length of time, the second threshold length of time being obtained by subtracting a one-eighth-cycle corresponding time from the first threshold length of time, the one-eighth-cycle corresponding time being a length of time corresponding to one-eighth cycle of vibration of an unsprung portion of the vehicle that holds the wheel.

14. A suspension controller for controlling, based on at least one value detected by at least one sensor which is provided in a vehicle and which is configured to detect a detected portion, a suspension provided for a wheel of the vehicle which is located on a rear side of the detected portion and which is distant from the detected portion by a longitudinal distance in a longitudinal direction of the vehicle, such that the suspension works in accordance with a control command value that is prepared based on the at least one value detected by the at least one sensor,
said suspension controller comprising a gain determiner configured to determine a gain, for controlling the suspension based on the determined gain,
wherein said gain determiner is configured to determine the gain such that the determined gain is smaller when a previewable time is shorter than a first threshold length of time, than when the previewable time is not shorter than the first threshold length of time, the previewable time being dependent on the longitudinal distance and a running speed of the vehicle, the first threshold length of time being dependent on a response delay time by which initiation of working of the suspension in accordance with the control command value is to be retarded after output of the control command value supplied to the suspension,
wherein said gain determiner includes a constant-value setting portion by which the gain is set to a predetermined constant value when the previewable time is not shorter than the first threshold length of time,
wherein said gain determiner includes a reduced-value setting portion by which the gain is set to a value that is reduced with reduction of the previewable time when the previewable time is shorter than the first threshold length of time, and wherein said gain determiner includes a zero setting portion by which the gain is set to zero when the previewable time is shorter than the first threshold length of time.

15. A suspension controller for controlling, based on at least one value detected by at least one sensor which is provided in a vehicle and which is configured to detect a detected portion, a suspension provided for a wheel of the vehicle which is located on a rear side of the detected portion and which is distant from the detected portion by a longitudinal distance in a longitudinal direction of the vehicle, such that the suspension works in accordance with a control command value that is prepared based on the at least one value detected by the at least one sensor, said suspension controller comprising a gain determiner configured to determine a gain, for controlling the suspension based on the determined gain, wherein said gain determiner is configured to determine the gain such that the determined gain is smaller when a previewable time is shorter than a first threshold length of time, than when the previewable time is not shorter than the first threshold length of time, the previewable time being dependent on the longitudinal distance and a running speed of the vehicle, the first threshold length of time being dependent on a response delay time by which initiation of working of the suspension in accordance with the control command value is to be retarded after output of the control command value supplied to the suspension, wherein said gain determiner includes a constant-value setting portion by which the gain is set to a predetermined constant value when the previewable time is not shorter than the first threshold length of time, wherein said gain determiner includes a reduced-value setting portion by which the gain is set to a value that is reduced with reduction of the previewable time when the previewable time is shorter than the first threshold length of time, wherein said gain determiner includes a previewable-time-basis determining portion configured to determine the gain during straight running of the vehicle, such that the determined gain is smaller when the previewable time is shorter than the first threshold length of time, than when the previewable time is longer than the first threshold length of time, and wherein said gain determiner includes a wheel-turning-angle-basis determining portion configured to determine the gain during non-straight running of the vehicle, such that the determined gain is smaller when an absolute value of a turning angle of a steerable wheel of the vehicle is large, than when the absolute value of the turning angle of the steerable wheel is small.

* * * * *